US012650171B2

(12) United States Patent
Ellisor et al.

(10) Patent No.: US 12,650,171 B2
(45) Date of Patent: Jun. 9, 2026

(54) SYSTEMS, ASSEMBLIES, APPARATUSES, AND METHODS PROVIDING ENHANCED FLUID SEAL FOR HIGH-POWER PUMPS

(71) Applicant: Vulcan Industrial Holdings, LLC, Houston, TX (US)

(72) Inventors: Kyle Ellisor, Katy, TX (US); Richard Peer, Tomball, TX (US); Akhil Alex, Houston, TX (US); Steven Newberg, Willis, TX (US); Chris Leake, Sugar Land, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 0 days.

(21) Appl. No.: 18/655,707

(22) Filed: May 6, 2024

(65) Prior Publication Data

US 2024/0376984 A1 Nov. 14, 2024

Related U.S. Application Data

(60) Provisional application No. 63/500,834, filed on May 8, 2023.

(51) Int. Cl.
F16J 15/10 (2006.01)

(52) U.S. Cl.
CPC ................................... F16J 15/106 (2013.01)

(58) Field of Classification Search
CPC .......... F16J 15/106; F16J 15/104; F16J 15/10; F16J 15/06; F16J 15/02
See application file for complete search history.

(56) References Cited

U.S. PATENT DOCUMENTS 1,316,539 A 9/1919 Ford
1,364,848 A 1/1921 Walsh
(Continued)

FOREIGN PATENT DOCUMENTS

CN 2550492 Y 5/2003
CN 2556355 Y 6/2003
(Continued)

OTHER PUBLICATIONS

Vulcan, High-Impact Replacement Parts, Fortified Valves and Seats, found at: https://www.vulcanindustrial.com/energy-products/replacement-parts.
(Continued)

*Primary Examiner* — Eugene G Byrd
(74) *Attorney, Agent, or Firm* — Womble Bond Dickinson (US) LLP

(57) ABSTRACT

Systems, assemblies, apparatuses, and methods herein may provide an enhanced fluid seal between two components. A seal may include an annular seal body having a groove face, a sealing face opposite the groove face, a first lateral face, and a second lateral face opposite the first lateral face. The groove face may have an at least partially convex groove edge, and the sealing face may have an at least partially concave sealing edge and a protrusion. The first and second lateral faces may be oblique with respect to one another, and the groove face, the sealing face, the first lateral face, and/or the second lateral face may cause the seal to deform in a groove of a first one of the two components when a second one of the two components presses against the sealing face, thereby to enhance the fluid seal between the two components.

30 Claims, 33 Drawing Sheets

(56)                 References Cited

U.S. PATENT DOCUMENTS

| | | | |
|---|---|---|---|
| 1,576,269 A | 3/1926 | Durant | |
| 1,595,459 A | 8/1926 | Durant | |
| 1,671,139 A | 5/1928 | Wilson | |
| 1,836,068 A | 12/1931 | Goldsberry | |
| 1,873,318 A | 8/1932 | Eason | |
| 1,914,737 A | 6/1933 | Elms | |
| 1,948,628 A | 2/1934 | Penick | |
| 1,963,684 A | 6/1934 | Shimer | |
| 1,963,685 A | 6/1934 | Shimer | |
| 2,004,259 A | 6/1935 | Weiger | |
| 2,011,547 A | 8/1935 | Campbell | |
| 2,069,443 A | 2/1937 | Hill | |
| 2,103,504 A | 12/1937 | White | |
| 2,143,399 A | 1/1939 | Abercrombie | |
| 2,146,709 A | 2/1939 | Bird | |
| 2,151,442 A | 3/1939 | Hardy | |
| 2,163,472 A | 6/1939 | Shimer | |
| 2,252,488 A | 8/1941 | Bierend | |
| 2,304,991 A | 12/1942 | Foster | |
| 2,506,128 A | 5/1950 | Ashton | |
| 2,539,996 A | 1/1951 | Gleitz | |
| 2,547,831 A | 4/1951 | Mueller | |
| 2,713,522 A | 7/1955 | Lorenz | |
| 2,719,737 A | 10/1955 | Fletcher | |
| 2,745,631 A | 5/1956 | Shellman | |
| 2,756,960 A | 7/1956 | Church | |
| 2,898,082 A | 8/1959 | Von Almen | |
| 2,969,951 A | 1/1961 | Walton | |
| 2,977,874 A | 4/1961 | Ritzerfeld et al. | |
| 2,982,515 A | 5/1961 | Clinton | |
| 2,983,281 A | 5/1961 | Bynum | |
| 3,049,082 A | 8/1962 | Barry | |
| 3,053,500 A | 9/1962 | Atkinson | |
| 3,063,467 A | 11/1962 | Roberts, Jr. | |
| 3,120,960 A | 2/1964 | Pippert et al. | |
| 3,166,332 A * | 1/1965 | Olson | F16J 15/106 |
| | | | 264/46.7 |
| 3,191,617 A | 6/1965 | Maddox | |
| 3,224,817 A | 12/1965 | Carter | |
| 3,276,390 A | 10/1966 | Bloudoff | |
| 3,277,837 A | 10/1966 | Pangburn | |
| 3,288,475 A | 11/1966 | Benoit | |
| 3,459,363 A | 8/1969 | Miller | |
| 3,474,808 A | 10/1969 | Elliott | |
| 3,483,885 A | 12/1969 | Leathers | |
| 3,489,098 A | 1/1970 | Roth | |
| 3,489,170 A | 1/1970 | Leman | |
| 3,512,787 A | 5/1970 | Kennedy | |
| 3,590,387 A | 6/1971 | Landis | |
| 3,640,501 A | 2/1972 | Walton | |
| 3,652,098 A | 3/1972 | Kawazu et al. | |
| 3,698,726 A | 10/1972 | Schettler | |
| 3,738,665 A | 6/1973 | Bilco | |
| 3,785,659 A | 1/1974 | Maurer et al. | |
| 3,809,508 A | 5/1974 | Uchiyama | |
| 3,837,356 A | 9/1974 | Selep et al. | |
| 3,847,511 A | 11/1974 | Cole | |
| 3,907,307 A | 9/1975 | Maurer | |
| 3,920,252 A | 11/1975 | Dechavanne | |
| 3,931,755 A | 1/1976 | Hatridge | |
| 4,035,107 A | 7/1977 | Kesten et al. | |
| 4,044,834 A | 8/1977 | Perkins | |
| 4,076,212 A | 2/1978 | Leman | |
| 4,160,627 A | 7/1979 | Cole | |
| 4,161,187 A | 7/1979 | Bauer | |
| 4,184,814 A | 1/1980 | Parker | |
| 4,219,204 A | 8/1980 | Pippert | |
| 4,277,229 A | 7/1981 | Pacht | |
| 4,306,728 A | 12/1981 | Huperz | |
| 4,331,741 A | 5/1982 | Wilson | |
| 4,395,050 A | 7/1983 | Wirz | |
| 4,398,731 A | 8/1983 | Gorman | |
| 4,399,871 A | 8/1983 | Adkins et al. | |
| 4,406,336 A | 9/1983 | Olsen | |
| 4,440,404 A | 4/1984 | Roach | |
| 4,500,267 A | 2/1985 | Birdwell | |
| 4,508,133 A | 4/1985 | Hamid | |
| 4,518,359 A | 5/1985 | Yao-Psong | |
| 4,527,806 A | 7/1985 | Ungchusri | |
| 4,565,297 A | 1/1986 | Korner | |
| 4,580,791 A | 4/1986 | DiRusso | |
| 4,586,569 A | 5/1986 | Hyde | |
| 4,662,392 A | 5/1987 | Vadasz | |
| 4,716,924 A | 1/1988 | Pacht | |
| 4,754,950 A | 7/1988 | Tada | |
| 4,763,876 A | 8/1988 | Oda | |
| 4,768,933 A | 9/1988 | Stachowiak | |
| 4,770,206 A | 9/1988 | Sjoberg | |
| 4,807,890 A | 2/1989 | Gorman | |
| 4,811,758 A | 3/1989 | Piper | |
| 4,822,058 A | 4/1989 | Butler et al. | |
| 4,856,758 A | 8/1989 | Knapp | |
| 4,861,241 A | 8/1989 | Gamboa | |
| 4,872,395 A | 10/1989 | Bennitt et al. | |
| 4,878,815 A | 11/1989 | Stachowiak | |
| 4,911,410 A | 3/1990 | Baker | |
| 4,919,719 A | 4/1990 | Abe | |
| 4,928,921 A | 5/1990 | Steele | |
| 4,951,707 A | 8/1990 | Johnson | |
| 5,020,490 A | 6/1991 | Seko | |
| 5,052,435 A | 10/1991 | Crudup | |
| 5,061,159 A | 10/1991 | Pryor | |
| 5,062,450 A | 11/1991 | Bailey | |
| 5,073,096 A | 12/1991 | King et al. | |
| 5,080,713 A | 1/1992 | Ishibashi | |
| 5,088,521 A | 2/1992 | Johnson | |
| 5,127,807 A | 7/1992 | Eslinger | |
| 5,131,666 A | 7/1992 | Hutchens | |
| 5,135,238 A | 8/1992 | Wells | |
| 5,149,107 A | 9/1992 | Maringer | |
| 5,201,491 A | 4/1993 | Domangue | |
| 5,209,495 A | 5/1993 | Palmour | |
| 5,249,600 A | 10/1993 | Blume | |
| 5,267,736 A | 12/1993 | Pietsch | |
| 5,273,570 A | 12/1993 | Sato | |
| 5,284,320 A | 2/1994 | Michael et al. | |
| 5,297,805 A | 3/1994 | Merkin | |
| 5,299,812 A | 4/1994 | Brestel | |
| 5,314,659 A | 5/1994 | Hidaka | |
| 5,316,086 A | 5/1994 | DeMoss | |
| 5,362,215 A | 11/1994 | King | |
| 5,370,362 A | 12/1994 | Kent et al. | |
| 5,382,057 A | 1/1995 | Richter | |
| 5,398,715 A | 3/1995 | Pacht | |
| 5,478,048 A | 12/1995 | Salesky | |
| 5,493,951 A | 2/1996 | Harrison | |
| 5,526,878 A | 6/1996 | Duell et al. | |
| 5,533,245 A | 7/1996 | Stanton | |
| 5,540,570 A | 7/1996 | Schuller | |
| 5,549,160 A | 8/1996 | Bownes et al. | |
| 5,572,920 A | 11/1996 | Kennedy | |
| 5,593,166 A | 1/1997 | Lovell et al. | |
| 5,622,371 A | 4/1997 | Angelo | |
| 5,626,345 A | 5/1997 | Wallace | |
| 5,636,688 A | 6/1997 | Bassinger | |
| 5,674,449 A | 10/1997 | Liang | |
| 5,806,858 A | 9/1998 | Harrelson, III | |
| 5,823,510 A | 10/1998 | Muramatsu et al. | |
| 5,834,664 A | 11/1998 | Aonuma | |
| 5,859,376 A | 1/1999 | Ishibashi | |
| 5,895,517 A | 4/1999 | Kawamura | |
| 5,924,853 A | 7/1999 | Pacht | |
| 5,949,003 A | 9/1999 | Aoki | |
| 5,957,208 A | 9/1999 | Schnatzmeyer | |
| 6,004,372 A | 12/1999 | Quets | |
| 6,070,608 A | 6/2000 | Pringle | |
| 6,125,810 A | 10/2000 | Haselkorn | |
| 6,139,599 A | 10/2000 | Takahashi | |
| 6,200,688 B1 | 3/2001 | Liang | |
| 6,209,445 B1 | 4/2001 | Roberts, Jr. | |
| 6,251,157 B1 | 6/2001 | Aoki et al. | |
| 6,328,112 B1 | 12/2001 | Malone | |
| 6,328,312 B1 | 12/2001 | Schmitz | |
| 6,340,377 B1 | 1/2002 | Kawata | |

(56) References Cited

U.S. PATENT DOCUMENTS

| | | | |
|---|---|---|---|
| 6,382,940 | B1 | 5/2002 | Blume |
| 6,386,548 | B1 | 5/2002 | Grimanis et al. |
| 6,422,317 | B1 | 7/2002 | Williamson, Jr. |
| 6,431,521 | B1 | 8/2002 | Jones |
| 6,436,338 | B1 | 8/2002 | Qiao |
| 6,446,939 | B1 | 9/2002 | Hoppe |
| 6,454,015 | B1 | 9/2002 | Armstrong et al. |
| 6,460,620 | B1 | 10/2002 | LaFleur |
| 6,464,749 | B1 | 10/2002 | Kawase |
| 6,482,275 | B1 | 11/2002 | Qiao |
| 6,485,678 | B1 | 11/2002 | Liang |
| 6,544,012 | B1 | 4/2003 | Blume |
| 6,571,684 | B1 | 6/2003 | Nov et al. |
| 6,623,259 | B1 | 9/2003 | Blume |
| 6,634,236 | B2 | 10/2003 | Mars |
| 6,641,112 | B2 | 11/2003 | Antoff |
| 6,695,007 | B2 | 2/2004 | Vicars |
| 6,702,905 | B1 | 3/2004 | Qiao |
| 6,712,871 | B2 | 3/2004 | Oh |
| 6,715,558 | B2 | 4/2004 | Williamson |
| 6,715,693 | B1 | 4/2004 | Dam et al. |
| 6,796,321 | B2 | 9/2004 | Vicars |
| 6,880,802 | B2 | 4/2005 | Hara |
| 6,910,871 | B1 | 6/2005 | Blume |
| 6,916,444 | B1 | 7/2005 | Liang |
| 6,951,165 | B2 | 10/2005 | Kuhn |
| 6,951,579 | B2 | 10/2005 | Koyama |
| 6,955,181 | B1 | 10/2005 | Blume |
| 6,959,732 | B2 | 11/2005 | Cotton, III et al. |
| 6,959,916 | B2 | 11/2005 | Chigasaki |
| 7,000,632 | B2 | 2/2006 | McIntire |
| 7,028,928 | B2 | 4/2006 | Shinogle |
| 7,036,824 | B2 | 5/2006 | Kunz |
| 7,144,440 | B2 | 12/2006 | Ando |
| 7,168,440 | B1 | 1/2007 | Blume |
| 7,186,097 | B1 | 3/2007 | Blume |
| 7,222,837 | B1 | 5/2007 | Blume |
| 7,290,560 | B2 | 11/2007 | Orr |
| 7,296,591 | B2 | 11/2007 | Moe |
| 7,335,002 | B2 | 2/2008 | Vicars |
| 7,341,435 | B2 | 3/2008 | Vicars |
| 7,398,955 | B2 | 7/2008 | Weingarten |
| 7,506,574 | B2 | 3/2009 | Jensen |
| 7,513,483 | B1 | 4/2009 | Blume |
| 7,513,759 | B1 | 4/2009 | Blume |
| 7,520,329 | B2 | 4/2009 | Reid et al. |
| 7,562,675 | B2 | 7/2009 | Nomichi et al. |
| 7,572,312 | B2 | 8/2009 | Kawata et al. |
| 7,611,590 | B2 | 11/2009 | Liang |
| 7,681,589 | B2 | 3/2010 | Schwegman |
| 7,682,471 | B2 | 3/2010 | Levin |
| 7,726,026 | B1 | 6/2010 | Blume |
| 7,748,310 | B2 | 7/2010 | Kennedy |
| 7,754,142 | B2 | 7/2010 | Liang |
| 7,754,143 | B2 | 7/2010 | Qiao |
| 7,757,396 | B2 | 7/2010 | Sawada |
| 7,789,133 | B2 | 9/2010 | McGuire |
| 7,789,161 | B2 | 9/2010 | Riley |
| 7,793,913 | B2 | 9/2010 | Hara |
| 7,828,053 | B2 | 11/2010 | McGuire |
| 7,845,413 | B2 | 12/2010 | Shampine |
| 7,861,738 | B2 | 1/2011 | Erbes |
| 7,866,346 | B1 | 1/2011 | Walters |
| 7,891,374 | B2 | 2/2011 | Vicars |
| 7,931,078 | B2 | 4/2011 | Toporowski et al. |
| 7,954,510 | B2 | 6/2011 | Schwegman |
| 7,992,635 | B2 | 8/2011 | Cherewyk |
| 8,020,638 | B2 | 9/2011 | Chellappa et al. |
| 8,069,923 | B2 | 12/2011 | Blanco |
| 8,075,000 | B2 | 12/2011 | James et al. |
| 8,075,661 | B2 | 12/2011 | Chen |
| 8,083,506 | B2 | 12/2011 | Maki |
| 8,100,407 | B2 | 1/2012 | Stanton |
| 8,141,849 | B1 | 3/2012 | Blume |
| 8,146,889 | B2 | 4/2012 | Hunter |
| 8,147,227 | B1 | 4/2012 | Blume |
| 8,181,970 | B2 | 5/2012 | Smith |
| 8,201,832 | B2 | 6/2012 | Kocurek |
| 8,261,771 | B2 | 9/2012 | Witkowski |
| 8,287,256 | B2 | 10/2012 | Shafer |
| 8,291,927 | B2 | 10/2012 | Johnson |
| 8,292,301 | B1 | 10/2012 | Gilstad et al. |
| 8,312,805 | B1 | 11/2012 | Blume |
| 8,317,498 | B2 | 11/2012 | Gambier |
| 8,328,202 | B2 | 12/2012 | Foster et al. |
| 8,375,980 | B2 | 2/2013 | Higashiyama |
| 8,376,723 | B2 | 2/2013 | Kugelev |
| 8,402,880 | B2 | 3/2013 | Patel |
| 8,430,075 | B2 | 4/2013 | Qiao |
| D687,125 | S | 7/2013 | Hawes |
| 8,479,700 | B2 | 7/2013 | Qiao |
| 8,511,218 | B2 | 8/2013 | Cordes |
| 8,522,667 | B2 | 9/2013 | Clemens |
| 8,528,585 | B2 | 9/2013 | McGuire |
| 8,529,230 | B1 | 9/2013 | Colley, III et al. |
| 8,534,691 | B2 | 9/2013 | Schaffer |
| 8,613,886 | B2 | 12/2013 | Qiao |
| D700,682 | S | 3/2014 | Bayyouk et al. |
| 8,662,864 | B2 | 3/2014 | Bayyouk |
| 8,662,865 | B2 | 3/2014 | Bayyouk |
| 8,668,012 | B2 | 3/2014 | Porter et al. |
| 8,668,470 | B2 | 3/2014 | Bayyouk |
| 8,707,853 | B1 | 4/2014 | Dille |
| 8,733,313 | B2 | 5/2014 | Sato |
| 8,784,081 | B1 | 7/2014 | Blume |
| 8,814,139 | B2 | 8/2014 | Griffin et al. |
| 8,814,432 | B2 | 8/2014 | Thoma et al. |
| 8,828,312 | B2 | 9/2014 | Yao |
| 8,870,554 | B2 | 10/2014 | Kent |
| 8,888,069 | B2 | 11/2014 | Maruno et al. |
| 8,893,806 | B2 | 11/2014 | Williamson |
| 8,894,392 | B1 | 11/2014 | Blume |
| 8,915,722 | B1 | 12/2014 | Blume |
| 8,940,110 | B2 | 1/2015 | Qiao |
| 8,955,850 | B2 | 2/2015 | Saucerman et al. |
| 8,978,695 | B2 | 3/2015 | Witkowkski |
| 8,998,593 | B2 | 4/2015 | Vicars |
| 9,010,412 | B2 | 4/2015 | McGuire |
| 9,016,693 | B2 | 4/2015 | Shek et al. |
| 9,067,346 | B2 | 6/2015 | Kohn et al. |
| 9,103,448 | B2 | 8/2015 | Witkowski |
| 9,121,503 | B2 | 9/2015 | Dietle et al. |
| 9,150,945 | B2 | 10/2015 | Bei |
| 9,157,136 | B2 | 10/2015 | Chou |
| 9,157,297 | B2 | 10/2015 | Williamson, Jr. |
| 9,157,468 | B2 | 10/2015 | Dille |
| 9,188,242 | B2 | 11/2015 | Giove et al. |
| 9,206,910 | B2 | 12/2015 | Kahn |
| D748,228 | S | 1/2016 | Bayyouk |
| 9,260,933 | B2 | 2/2016 | Artherholt |
| 9,261,195 | B2 | 2/2016 | Toynbee |
| 9,273,543 | B2 | 3/2016 | Baca |
| 9,284,631 | B2 | 3/2016 | Radon |
| 9,284,953 | B2 | 3/2016 | Blume |
| 9,285,040 | B2 | 3/2016 | Forrest |
| 9,291,274 | B1 | 3/2016 | Blume |
| 9,322,243 | B2 | 4/2016 | Baca |
| 9,334,547 | B2 | 5/2016 | Qiao |
| 9,340,856 | B2 | 5/2016 | Otobe |
| 9,341,039 | B2 | 5/2016 | Galle et al. |
| 9,341,272 | B2 | 5/2016 | Hoang |
| 9,359,921 | B2 | 6/2016 | Hashimoto |
| 9,360,115 | B2 | 6/2016 | Chaplin et al. |
| 9,365,913 | B2 | 6/2016 | Imaizumi |
| 9,371,919 | B2 | 6/2016 | Forrest |
| 9,376,930 | B2 | 6/2016 | Kim |
| 9,377,019 | B1 | 6/2016 | Blume |
| 9,382,940 | B2 | 7/2016 | Lee |
| 9,410,396 | B2 | 8/2016 | Møgedal |
| 9,416,887 | B2 | 8/2016 | Blume |
| 9,435,454 | B2 | 9/2016 | Blume |
| 9,441,776 | B2 | 9/2016 | Bryne |
| 9,458,743 | B2 | 10/2016 | Qiao |
| 9,464,730 | B2 | 10/2016 | Bihlet |

(56) References Cited

U.S. PATENT DOCUMENTS

| | | | |
|---|---|---|---|
| 9,500,195 | B2 | 11/2016 | Blume |
| 9,506,382 | B2 | 11/2016 | Yeager |
| 9,528,349 | B2 | 12/2016 | Zimmerman |
| 9,528,508 | B2 | 12/2016 | Thomeer |
| 9,528,631 | B2 | 12/2016 | McCarty |
| 9,534,473 | B2 | 1/2017 | Morris |
| 9,534,691 | B2 | 1/2017 | Miller |
| 9,556,761 | B2 | 1/2017 | Koyama |
| 9,568,138 | B2 | 2/2017 | Arizpe |
| 9,605,767 | B2 | 3/2017 | Chhabra |
| 9,631,739 | B2 | 4/2017 | Belshan |
| D787,029 | S | 5/2017 | Bayyouk |
| 9,638,075 | B2 | 5/2017 | Qiao |
| 9,638,337 | B2 | 5/2017 | Witkowski |
| 9,650,882 | B2 | 5/2017 | Zhang |
| 9,651,067 | B2 | 5/2017 | Beschorner |
| 9,677,378 | B2 | 6/2017 | Asthana et al. |
| 9,689,364 | B2 | 6/2017 | Mack |
| 9,695,812 | B2 | 7/2017 | Dille |
| 9,732,746 | B2 | 8/2017 | Chandrasekaran |
| 9,732,880 | B2 | 8/2017 | Haines |
| 9,745,968 | B2 | 8/2017 | Kotapish |
| 9,784,262 | B2 | 10/2017 | Bayyouk |
| 9,791,082 | B2 | 10/2017 | Baxter et al. |
| 9,816,348 | B2 | 11/2017 | Asthana et al. |
| 9,822,606 | B2 | 11/2017 | Williamson, Jr. |
| 9,822,894 | B2 | 11/2017 | Bayyouk |
| 9,845,801 | B1 | 12/2017 | Shek |
| 9,857,807 | B2 | 1/2018 | Baca |
| 9,915,250 | B2 | 3/2018 | Brasche |
| 9,920,615 | B2 | 3/2018 | Zhang |
| 9,927,036 | B2 | 3/2018 | Dille |
| 9,945,362 | B2 | 4/2018 | Skurdalsvold |
| 9,945,375 | B2 | 4/2018 | Zhang |
| 9,957,770 | B2 | 5/2018 | Averill et al. |
| 9,976,401 | B2 | 5/2018 | Walton et al. |
| 9,989,044 | B2 | 6/2018 | Bayyouk |
| 10,029,540 | B2 | 7/2018 | Seeger |
| D826,281 | S | 8/2018 | Mead |
| 10,041,490 | B1 | 8/2018 | Jahnke |
| 10,082,137 | B2 | 9/2018 | Graham |
| 10,094,478 | B2 | 10/2018 | Iijima |
| 10,113,679 | B2 | 10/2018 | Shuck |
| 10,145,205 | B2 | 12/2018 | Martino et al. |
| 10,180,058 | B2 | 1/2019 | Carter |
| 10,184,470 | B2 | 1/2019 | Barnett, Jr. |
| 10,190,197 | B2 | 1/2019 | Baker |
| 10,197,172 | B2 | 2/2019 | Fuller |
| 10,203,037 | B2 | 2/2019 | Hunter et al. |
| 10,215,172 | B2 | 2/2019 | Wood |
| 10,221,848 | B2 | 3/2019 | Bayyouk |
| 10,240,594 | B2 | 3/2019 | Barnhouse, Jr. |
| 10,240,597 | B2 | 3/2019 | Bayyouk |
| 10,247,182 | B2 | 4/2019 | Zhang |
| 10,247,184 | B2 | 4/2019 | Chunn |
| 10,260,634 | B2 | 4/2019 | Lenhert et al. |
| 10,273,954 | B2 | 4/2019 | Brown |
| 10,288,178 | B2 | 5/2019 | Nowell et al. |
| 10,309,182 | B2 | 6/2019 | Jones et al. |
| 10,316,832 | B2 | 6/2019 | Byrne |
| 10,330,097 | B2 | 6/2019 | Skurdalsvold |
| 10,344,757 | B1 | 7/2019 | Stark |
| 10,364,487 | B2 | 7/2019 | Park |
| D856,498 | S | 8/2019 | Bayyouk |
| 10,378,535 | B2 | 8/2019 | Mahmood |
| 10,378,538 | B2 | 8/2019 | Blume |
| 10,378,659 | B2 * | 8/2019 | Scott .................. F16K 3/0236 |
| 10,393,113 | B2 | 8/2019 | Wagner |
| 10,400,764 | B2 | 9/2019 | Wagner |
| 10,415,348 | B2 | 9/2019 | Zhang |
| 10,415,719 | B2 | 9/2019 | Leboeuf et al. |
| D861,834 | S | 10/2019 | Foster et al. |
| D864,691 | S | 10/2019 | Campos |
| 10,428,406 | B2 | 10/2019 | Yao |
| 10,428,949 | B2 | 10/2019 | Miller |
| 10,435,987 | B2 | 10/2019 | Poluchalla et al. |
| 10,436,193 | B1 | 10/2019 | Jahnke |
| 10,443,456 | B2 | 10/2019 | Hoeg |
| 10,465,680 | B1 | 11/2019 | Guerra |
| 10,472,702 | B2 | 11/2019 | Yeh |
| 10,487,528 | B2 | 11/2019 | Pozybill |
| D871,455 | S | 12/2019 | Crowsley |
| 10,519,070 | B2 | 12/2019 | Sanders |
| 10,519,950 | B2 | 12/2019 | Foster |
| 10,526,862 | B2 | 1/2020 | Witkowski |
| 10,527,036 | B2 | 1/2020 | Blume |
| 10,533,240 | B2 | 1/2020 | Veliz et al. |
| 10,557,446 | B2 | 2/2020 | Stecklein |
| 10,557,576 | B2 | 2/2020 | Witkowski |
| 10,557,580 | B2 | 2/2020 | Mendyk |
| 10,563,494 | B2 | 2/2020 | Graham |
| 10,563,649 | B2 | 2/2020 | Zhang |
| 10,570,491 | B2 | 2/2020 | Hong |
| 10,576,538 | B2 | 3/2020 | Kato |
| 10,577,580 | B2 | 3/2020 | Abbas |
| 10,577,850 | B2 | 3/2020 | Ozkan |
| 10,591,070 | B2 | 3/2020 | Nowell et al. |
| 10,605,374 | B2 | 3/2020 | Takaki |
| D880,661 | S | 4/2020 | Foster et al. |
| D881,958 | S | 4/2020 | Han |
| 10,626,856 | B2 | 4/2020 | Coldren |
| 10,628,744 | B2 | 4/2020 | Surjaatmadja et al. |
| 10,633,925 | B2 | 4/2020 | Panda |
| 10,634,260 | B2 | 4/2020 | Said |
| 10,640,854 | B2 | 5/2020 | Hu |
| 10,655,623 | B2 | 5/2020 | Blume |
| 10,655,743 | B2 | 5/2020 | Hagen |
| 10,663,071 | B2 | 5/2020 | Bayyouk |
| 10,670,013 | B2 | 6/2020 | Foster |
| 10,670,153 | B2 | 6/2020 | Filipow |
| 10,670,176 | B2 | 6/2020 | Byrne |
| 10,677,109 | B2 | 6/2020 | Qiao |
| 10,677,240 | B2 | 6/2020 | Graham |
| 10,677,365 | B2 | 6/2020 | Said |
| 10,711,567 | B2 | 7/2020 | Buckley |
| 10,711,754 | B2 | 7/2020 | Nelson |
| 10,711,778 | B2 | 7/2020 | Buckley |
| 10,718,441 | B2 | 7/2020 | Myers |
| D893,684 | S | 8/2020 | Matthys |
| 10,731,523 | B2 | 8/2020 | Qu |
| 10,731,643 | B2 | 8/2020 | DeLeon |
| 10,738,928 | B2 | 8/2020 | Arizpe |
| 10,753,490 | B2 | 8/2020 | Fuller |
| 10,753,495 | B2 | 8/2020 | Bayyouk |
| D895,777 | S | 9/2020 | Chase |
| 10,760,567 | B2 | 9/2020 | Salih et al. |
| 10,767,520 | B1 | 9/2020 | Hattiangadi |
| 10,771,567 | B2 | 9/2020 | Sundaresan |
| 10,774,828 | B1 | 9/2020 | Smith |
| 10,781,803 | B2 | 9/2020 | Kumar |
| 10,787,725 | B2 | 9/2020 | Fujieda |
| 10,801,627 | B2 | 10/2020 | Warbey |
| 10,808,488 | B2 | 10/2020 | Witkowski |
| 10,808,851 | B1 | 10/2020 | Surjaatmadja et al. |
| 10,815,988 | B2 | 10/2020 | Buckley |
| 10,815,989 | B2 | 10/2020 | Naedler et al. |
| 10,830,360 | B2 | 11/2020 | Frank |
| 10,837,556 | B2 | 11/2020 | Chase et al. |
| 10,851,775 | B2 | 12/2020 | Stark |
| 10,865,325 | B2 | 12/2020 | Nakao |
| 10,895,325 | B2 | 1/2021 | Nowell et al. |
| D910,820 | S | 2/2021 | Grassl |
| 10,907,738 | B2 | 2/2021 | Nowell |
| 10,914,171 | B2 | 2/2021 | Foster |
| 10,914,383 | B2 | 2/2021 | Kustermans et al. |
| 10,934,899 | B2 | 3/2021 | Hattiangadi |
| 10,941,765 | B2 | 3/2021 | Nowell |
| 10,941,866 | B2 | 3/2021 | Nowell |
| 10,954,938 | B2 | 3/2021 | Stark |
| 10,961,607 | B2 | 3/2021 | Oshima |
| 10,962,001 | B2 | 3/2021 | Nowell |
| D915,197 | S | 4/2021 | Katano |
| D916,240 | S | 4/2021 | Nowell |
| 10,968,717 | B2 | 4/2021 | Tran |

(56)  References Cited

U.S. PATENT DOCUMENTS

| | | | |
|---|---|---|---|
| 10,988,834 B2 | 4/2021 | Lee |
| 10,989,321 B2 | 4/2021 | Hattiangadi |
| 10,995,738 B2 | 5/2021 | Blume |
| 11,002,120 B1 | 5/2021 | Surjaatmadja |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,149,856 B2 | 10/2021 | Mattoni et al. |
| 11,156,221 B2 | 10/2021 | Stark et al. |
| 11,162,479 B2 | 11/2021 | Thomas et al. |
| 11,162,859 B2 | 11/2021 | Lei |
| 11,173,590 B2 | 11/2021 | Tyler |
| 11,181,101 B2 | 11/2021 | Byrne |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| 11,286,737 B2 | 3/2022 | Gunasekaran |
| D949,202 S | 4/2022 | Sharpstone |
| 11,300,111 B2 | 4/2022 | Thomas et al. |
| 11,313,189 B2 | 4/2022 | Dawsey et al. |
| 11,333,249 B2 | 5/2022 | Jones et al. |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,714 B2 | 9/2022 | Machocki |
| 11,434,900 B1 | 9/2022 | Alex |
| 11,441,683 B2 | 9/2022 | Mullins et al. |
| 11,454,083 B2 | 9/2022 | Asthana et al. |
| 11,454,321 B2 | 9/2022 | Mullins et al. |
| 11,473,395 B2 | 10/2022 | Yeldell et al. |
| 11,473,686 B2 | 10/2022 | Bayyouk |
| 11,512,545 B2 | 11/2022 | Yuan et al. |
| 11,519,225 B2 | 12/2022 | Winslow et al. |
| 11,566,481 B2 | 1/2023 | Chambers et al. |
| 11,566,713 B2 | 1/2023 | Poremski |
| 11,566,718 B2 | 1/2023 | Singley et al. |
| D980,876 S | 3/2023 | Smith |
| 11,608,896 B2 | 3/2023 | Al-Darra |
| D986,928 S | 5/2023 | Smith et al. |
| 11,644,106 B2 | 5/2023 | Williams et al. |
| 11,668,163 B2 | 6/2023 | Asthana et al. |
| 11,692,544 B2 | 7/2023 | Chase |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,840,453 B2 | 12/2023 | Vlassoff et al. |
| 11,846,356 B1 | 12/2023 | Ellisor |
| 11,859,723 B2 | 1/2024 | Surjaatmadja et al. |
| 11,891,988 B2 | 2/2024 | Mullins et al. |
| 11,898,408 B2 | 2/2024 | Jamison et al. |
| 11,913,447 B1 | 2/2024 | Wiegand et al. |
| 11,920,684 B1 | 3/2024 | Xu et al. |
| 11,938,592 B2 | 3/2024 | Dearborn et al. |
| D1,022,145 S | 4/2024 | Meyers |
| 11,952,865 B2 | 4/2024 | Fripp et al. |
| 11,988,294 B2 | 5/2024 | Qiao et al. |
| D1,031,952 S | 6/2024 | Huntley |
| 12,018,759 B1 | 6/2024 | Patel et al. |
| D1,036,632 S | 7/2024 | Suzuki |
| 12,038,086 B2 | 7/2024 | Shuck |
| 12,049,889 B2 | 7/2024 | Ellisor et al. |
| D1,039,657 S | 8/2024 | Cox |
| 12,055,221 B2 | 8/2024 | Ellisor et al. |
| 12,092,226 B2 | 9/2024 | Elliott et al. |
| 12,092,227 B1 | 9/2024 | Belshan |
| 12,140,005 B2 | 11/2024 | Brown et al. |
| 12,140,240 B1 | 11/2024 | Xu |
| D1,061,623 S | 2/2025 | Newberg et al. |
| D1,063,005 S | 2/2025 | Lorkowski |
| 12,247,557 B2 | 3/2025 | Avey et al. |
| 12,247,561 B2 | 3/2025 | Avey et al. |
| 12,263,503 B2 | 4/2025 | Mittag et al. |
| 12,263,549 B2 | 4/2025 | Noreiga et al. |
| 12,270,394 B2 | 4/2025 | Ellisor et al. |
| 12,270,477 B2 | 4/2025 | Pauchet et al. |
| 12,292,120 B1 | 5/2025 | Mullins et al. |
| 12,292,121 B1 | 5/2025 | Berryhill |
| 12,297,922 B1 | 5/2025 | Xu |
| 12,345,253 B2 | 7/2025 | Mullins et al. |
| 12,345,332 B2 | 7/2025 | Ellisor |
| 12,366,244 B2 | 7/2025 | Alex et al. |
| 12,366,245 B1 | 7/2025 | Ellisor et al. |
| 12,404,931 B2 | 9/2025 | Ellisor et al. |
| 12,404,942 B2 | 9/2025 | Hurst et al. |
| 12,460,488 B2 | 11/2025 | Uddin et al. |
| 12,473,910 B2 | 11/2025 | Foster et al. |
| 12,480,489 B2 | 11/2025 | Ellisor et al. |
| 12,486,901 B1 | 12/2025 | Naedler |
| 12,498,051 B2 | 12/2025 | Xu et al. |
| 12,510,164 B1 | 12/2025 | Mullins et al. |
| D1,113,987 S | 2/2026 | Mullins et al. |
| 12,540,673 B2 | 2/2026 | Ellisor |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0108116 A1 | 6/2004 | McLoughlin et al. |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0098963 A1 | 5/2005 | Olsen |
| 2005/0126638 A1 | 6/2005 | Gilbert |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0042369 A1 | 2/2008 | Krywitsky et al. |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0166980 A1 | 7/2009 | Miller et al. |
| 2009/0261575 A1 | 10/2009 | Bull |
| 2009/0278069 A1 | 11/2009 | Blanco |
| 2009/0289209 A1 | 11/2009 | Comeaux et al. |
| 2010/0143163 A1 | 6/2010 | Patel et al. |
| 2010/0230628 A1 | 9/2010 | Stefina |
| 2010/0242720 A1 | 9/2010 | Matzner |
| 2010/0272597 A1 | 10/2010 | Qiao |
| 2011/0079302 A1 | 4/2011 | Hawes |
| 2011/0142701 A1 | 6/2011 | Small |
| 2011/0173814 A1 | 7/2011 | Patel |

(56) References Cited

U.S. PATENT DOCUMENTS

| | | |
|---|---|---|
| 2011/0189040 A1 | 8/2011 | Vicars |
| 2011/0255993 A1 | 10/2011 | Ochoa |
| 2011/0266752 A1* | 11/2011 | Kocurek ............... F16J 15/024 |
| | | 277/650 |
| 2011/0296982 A1 | 12/2011 | Dille et al. |
| 2012/0141308 A1 | 6/2012 | Saini |
| 2012/0157786 A1 | 6/2012 | Pribanic |
| 2012/0163969 A1 | 6/2012 | Ongole |
| 2012/0259593 A1 | 10/2012 | El-Zein |
| 2012/0292550 A1 | 11/2012 | Meek |
| 2012/0304821 A1 | 12/2012 | Ando |
| 2013/0020521 A1 | 1/2013 | Byrne |
| 2013/0037739 A1 | 2/2013 | Millard |
| 2013/0202457 A1 | 8/2013 | Bayyouk |
| 2013/0202458 A1 | 8/2013 | Byrne |
| 2013/0263932 A1* | 10/2013 | Baxter ............... E21B 43/2607 |
| | | 137/15.01 |
| 2013/0319220 A1 | 12/2013 | Luharuka |
| 2014/0083541 A1 | 3/2014 | Chandrasekaran |
| 2014/0083547 A1 | 3/2014 | Hwang |
| 2014/0196883 A1 | 7/2014 | Artherholt |
| 2014/0260954 A1 | 9/2014 | Young |
| 2014/0264134 A1 | 9/2014 | Butler et al. |
| 2014/0286805 A1 | 9/2014 | Dyer |
| 2014/0319780 A1 | 10/2014 | Vertenten |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0060715 A1 | 3/2015 | Hoang |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0353856 A1 | 12/2015 | Kleyman et al. |
| 2015/0368775 A1 | 12/2015 | Baker |
| 2016/0097459 A1 | 4/2016 | Veliz et al. |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0051738 A1 | 2/2017 | Horning |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0102101 A1* | 4/2017 | Duval-Arnould .... F16J 15/3232 |
| 2017/0122055 A1 | 5/2017 | Embury |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0211708 A1 | 7/2017 | Kim |
| 2017/0218951 A1 | 8/2017 | Graham |
| 2017/0218993 A1 | 8/2017 | Freed |
| 2017/0268674 A1 | 9/2017 | Barbera et al. |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0045318 A1 | 2/2018 | Tanida |
| 2018/0058431 A1 | 3/2018 | Blume |
| 2018/0073653 A1 | 3/2018 | Bayyouk |
| 2018/0073654 A1 | 3/2018 | Nowell et al. |
| 2018/0202434 A1 | 7/2018 | Barnhouse, Jr. |
| 2018/0238459 A1 | 8/2018 | Nowell et al. |
| 2018/0258721 A1 | 9/2018 | Pawar et al. |
| 2018/0298481 A1 | 10/2018 | Kleyman et al. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2018/0363642 A1 | 12/2018 | Salih et al. |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0040966 A1 | 2/2019 | Myers et al. |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0368614 A1* | 12/2019 | Hurst ................... F16J 15/3456 |
| 2019/0368619 A1 | 12/2019 | Barnett et al. |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowkski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0132195 A1* | 4/2020 | Coombs ................ F16J 15/106 |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0300367 A1 | 9/2020 | Caglio et al. |
| 2020/0308683 A1 | 10/2020 | Xue |
| 2020/0340314 A1 | 10/2020 | Yeldell et al. |
| 2020/0347843 A1 | 11/2020 | Mullins |
| 2020/0355182 A1 | 11/2020 | DeLeon |
| 2020/0362970 A1 | 11/2020 | Hurst |
| 2020/0362975 A1 | 11/2020 | Hurst et al. |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |

(56)  References Cited

U.S. PATENT DOCUMENTS

| | | | |
|---|---|---|---|
| 2020/0400132 A1 | 12/2020 | Kumar | |
| 2020/0400140 A1 | 12/2020 | Bayyouk | |
| 2020/0400234 A1 | 12/2020 | Mullins et al. | |
| 2020/0400242 A1 | 12/2020 | Spencer | |
| 2021/0010113 A1 | 1/2021 | Qiao | |
| 2021/0010470 A1 | 1/2021 | Blume | |
| 2021/0017830 A1 | 1/2021 | Witkowski | |
| 2021/0017982 A1 | 1/2021 | Bayyouk | |
| 2021/0017983 A1 | 1/2021 | Myers | |
| 2021/0025497 A1* | 1/2021 | Tsuji | F16J 15/104 |
| 2021/0040836 A1 | 2/2021 | Baskin | |
| 2021/0054486 A1 | 2/2021 | Kim | |
| 2021/0062944 A1* | 3/2021 | Lee | F16L 19/08 |
| 2021/0102630 A1 | 4/2021 | Nowell | |
| 2021/0108734 A1 | 4/2021 | Nowell | |
| 2021/0130936 A1 | 5/2021 | Wu | |
| 2021/0146397 A1 | 5/2021 | Mittag et al. | |
| 2021/0148471 A1 | 5/2021 | Murugesan | |
| 2021/0180156 A1 | 6/2021 | Kim | |
| 2021/0190053 A1 | 6/2021 | Wagner | |
| 2021/0190223 A1 | 6/2021 | Bayyouk | |
| 2021/0197524 A1 | 7/2021 | Maroli | |
| 2021/0215071 A1 | 7/2021 | Oikawa | |
| 2021/0215154 A1 | 7/2021 | Nowell | |
| 2021/0222690 A1 | 7/2021 | Beisel | |
| 2021/0230987 A1 | 7/2021 | Tanner | |
| 2021/0239111 A1 | 8/2021 | Zitting | |
| 2021/0246537 A1 | 8/2021 | Maroli | |
| 2021/0260704 A1 | 8/2021 | Hu | |
| 2021/0270261 A1 | 9/2021 | Zhang | |
| 2021/0285551 A1 | 9/2021 | Renollett | |
| 2021/0310484 A1 | 10/2021 | Myers | |
| 2021/0381504 A1 | 12/2021 | Wagner | |
| 2021/0381615 A1 | 12/2021 | Riedel | |
| 2021/0388832 A1 | 12/2021 | Byrne | |
| 2022/0026326 A1 | 1/2022 | Wang | |
| 2022/0034402 A1 | 2/2022 | Kiani | |
| 2022/0056906 A1 | 2/2022 | Lawson et al. | |
| 2022/0065063 A1 | 3/2022 | Xu et al. | |
| 2022/0145934 A1 | 5/2022 | Prevost et al. | |
| 2022/0163031 A1 | 5/2022 | Chase | |
| 2022/0163032 A1 | 5/2022 | Chase | |
| 2022/0163118 A1 | 5/2022 | Maffezzoli et al. | |
| 2022/0186718 A1 | 6/2022 | Peer | |
| 2022/0205470 A1 | 6/2022 | Asthana et al. | |
| 2022/0243723 A1 | 8/2022 | Herold et al. | |
| 2022/0282719 A1 | 9/2022 | Barnhouse | |
| 2022/0320790 A1* | 10/2022 | Demaratos | F16J 15/028 |
| 2022/0333707 A1 | 10/2022 | Ting et al. | |
| 2022/0349472 A1 | 11/2022 | Ellisor | |
| 2022/0390055 A1 | 12/2022 | Ellisor | |
| 2022/0403839 A1 | 12/2022 | Mullins | |
| 2023/0041201 A1 | 2/2023 | Myers et al. | |
| 2023/0129538 A1 | 4/2023 | Miller et al. | |
| 2023/0130824 A1 | 4/2023 | Belshan et al. | |
| 2023/0138338 A1 | 5/2023 | Barnhouse et al. | |
| 2023/0184241 A1 | 6/2023 | Avey et al. | |
| 2023/0220840 A1* | 7/2023 | Avey | F04B 37/12 |
| | | | 277/306 |
| 2023/0258175 A1 | 8/2023 | Figgs et al. | |
| 2023/0279991 A1 | 9/2023 | Avey et al. | |
| 2023/0313890 A1 | 10/2023 | Foster et al. | |
| 2023/0332596 A1 | 10/2023 | Chase | |
| 2023/0383743 A1 | 11/2023 | Brock et al. | |
| 2023/0383859 A1 | 11/2023 | Wiegand et al. | |
| 2023/0399961 A1 | 12/2023 | Nogami | |
| 2023/0407864 A1 | 12/2023 | Alex et al. | |
| 2024/0042627 A1 | 2/2024 | Wang et al. | |
| 2024/0102460 A1 | 3/2024 | Kachovskiy et al. | |
| 2024/0117882 A1 | 4/2024 | Ellisor | |
| 2024/0133277 A1 | 4/2024 | Brown et al. | |
| 2024/0200656 A1 | 6/2024 | Avey | |
| 2024/0200666 A1 | 6/2024 | Leake | |
| 2024/0209945 A1 | 6/2024 | Prate et al. | |
| 2024/0262067 A1 | 8/2024 | Iversen et al. | |
| 2024/0309724 A1 | 9/2024 | Miller et al. | |
| 2024/0369139 A1 | 11/2024 | Ellisor | |
| 2024/0369141 A1 | 11/2024 | Patel et al. | |
| 2024/0376892 A1 | 11/2024 | Ellisor | |
| 2024/0376984 A1* | 11/2024 | Ellisor | F16J 15/104 |
| 2024/0384795 A1 | 11/2024 | Barnett et al. | |
| 2024/0418164 A1 | 12/2024 | Peer | |
| 2024/0418282 A1 | 12/2024 | Featherstone et al. | |
| 2025/0027486 A1 | 1/2025 | Alex et al. | |
| 2025/0052325 A1 | 2/2025 | Berryhill | |
| 2025/0075818 A1 | 3/2025 | Xu | |
| 2025/0207574 A1 | 6/2025 | Foster et al. | |
| 2025/0237308 A1 | 7/2025 | Ellisor | |
| 2025/0251044 A1 | 8/2025 | Berryhill | |
| 2025/0257798 A1 | 8/2025 | Zitting | |
| 2025/0277487 A1 | 9/2025 | Ellisor et al. | |
| 2025/0283463 A1 | 9/2025 | Mullins et al. | |
| 2025/0283464 A1 | 9/2025 | Ellisor et al. | |
| 2025/0305586 A1 | 10/2025 | Mullins et al. | |
| 2025/0320866 A1 | 10/2025 | Barnett et al. | |
| 2026/0002531 A1 | 1/2026 | Peer et al. | |
| 2026/0043491 A1 | 2/2026 | Xu et al. | |
| 2026/0078474 A1 | 3/2026 | Verma et al. | |
| 2026/0078754 A1 | 3/2026 | Verma et al. | |

FOREIGN PATENT DOCUMENTS

| | | | |
|---|---|---|---|
| CN | 2637843 | Y | 9/2004 |
| CN | 200971972 | Y | 11/2007 |
| CN | 101169190 | A | 4/2008 |
| CN | 201149099 | | 11/2008 |
| CN | 201401518 | Y | 2/2010 |
| CN | 201412533 | Y | 2/2010 |
| CN | 201610950 | U | 10/2010 |
| CN | 201621317 | U | 11/2010 |
| CN | 201687978 | U | 12/2010 |
| CN | 201705964 | U | 1/2011 |
| CN | 201705982 | U | 1/2011 |
| CN | 102212776 | A | 10/2011 |
| CN | 202182204 | U | 4/2012 |
| CN | 102537510 | A | 7/2012 |
| CN | 102748483 | | 10/2012 |
| CN | 202545162 | U | 11/2012 |
| CN | 102828141 | A | 12/2012 |
| CN | 202790585 | U | 3/2013 |
| CN | 202852048 | U | 4/2013 |
| CN | 202884071 | U | 4/2013 |
| CN | 202914795 | U | 5/2013 |
| CN | 103147718 | A | 6/2013 |
| CN | 203098370 | U | 7/2013 |
| CN | 203257342 | U | 10/2013 |
| CN | 203604686 | U | 5/2014 |
| CN | 204040978 | U | 12/2014 |
| CN | 104329464 | A | 2/2015 |
| CN | 104455529 | A | 3/2015 |
| CN | 104550926 | A | 4/2015 |
| CN | 204253915 | U | 4/2015 |
| CN | 204738957 | U | 11/2015 |
| CN | 204805591 | U | 11/2015 |
| CN | 205136660 | U | 4/2016 |
| CN | 205315253 | U | 6/2016 |
| CN | 106151558 | A | 11/2016 |
| CN | 205841808 | U | 12/2016 |
| CN | 106481831 | A | 3/2017 |
| CN | 206386512 | U | 8/2017 |
| CN | 206530720 | U | 9/2017 |
| CN | 206845939 | U | 1/2018 |
| CN | 107795698 | A | 3/2018 |
| CN | 108329035 | A | 7/2018 |
| CN | 208364190 | U | 1/2019 |
| CN | 208416485 | U | 1/2019 |
| CN | 208416492 | U | 1/2019 |
| CN | 109321864 | A | 2/2019 |
| CN | 109458326 | A | 3/2019 |
| CN | 109695727 | A | 4/2019 |
| CN | 209261799 | U | 8/2019 |
| CN | 209370028 | U | 9/2019 |
| CN | 110374522 | A | 10/2019 |
| CN | 209469613 | U | 10/2019 |

(56) References Cited

FOREIGN PATENT DOCUMENTS

| | | | | | |
|---|---|---|---|---|---|
| CN | 110454586 | A | 11/2019 | | |
| CN | 209725279 | U | 12/2019 | | |
| CN | 209866424 | U | 12/2019 | | |
| CN | 111005695 | A | 4/2020 | | |
| CN | 111073186 | A | 4/2020 | | |
| CN | 111455306 | A | 7/2020 | | |
| CN | 111664087 | A | 9/2020 | | |
| CN | 111690923 | A | 9/2020 | | |
| CN | 211649111 | U | 10/2020 | | |
| CN | 212080181 | U | 12/2020 | | |
| CN | 212249951 | U | 12/2020 | | |
| CN | 212718129 | U | 3/2021 | | |
| CN | 102410194 | | 4/2021 | | |
| CN | 213236168 | U | 5/2021 | | |
| CN | 113634953 | A | 11/2021 | | |
| CN | 215172271 | U | 12/2021 | | |
| CN | 114196903 | A | 3/2022 | | |
| CN | 218523056 | U | 2/2023 | | |
| CN | 220082168 | U | 11/2023 | | |
| CN | 220320353 | U | 1/2024 | | |
| CN | 223434777 | U | 10/2025 | | |
| CN | 223459920 | U | 10/2025 | | |
| DE | 3126421 | | 1/1983 | | |
| DE | 112008000977 | T5 | 2/2010 | | |
| DE | 102009001560 | A1 | 9/2010 | | |
| DE | 202012104058 | U1 | 3/2014 | | |
| DE | 102019123225 | A1 | 3/2020 | | |
| EP | 0 414 955 | | 3/1991 | | |
| EP | 0520567 | A1 | 12/1992 | | |
| EP | 3336356 | A1 | 6/2018 | | |
| EP | 3696408 | A1 | 8/2020 | | |
| GB | 387341 | A | 1/1933 | | |
| GB | 2123100 | | 1/1986 | | |
| GB | 2240592 | | 8/1991 | | |
| IN | 79MA2001 | A | 9/2007 | | |
| JP | H08291376 | A | 11/1996 | | |
| JP | 4019476 | B2 | 12/2007 | | |
| JP | 2021025560 | A | * 2/2021 | ............ | F02M 26/54 |
| WO | 2015/077001 | | 5/2015 | | |
| WO | 2016/024939 | | 2/2016 | | |
| WO | 2016/045768 | | 3/2016 | | |
| WO | 2019/169312 | | 9/2019 | | |
| WO | 2020/180716 | | 9/2020 | | |
| WO | 2021195572 | | 9/2021 | | |
| WO | 2022167341 | A1 | 8/2022 | | |
| WO | 2024026432 | | 2/2024 | | |
| WO | 2024076786 | A1 | 4/2024 | | |
| WO | 2024/119019 | | 6/2024 | | |

OTHER PUBLICATIONS

U.S. Appl. No. 16/814,267.
U.S. Appl. No. 17/120,121.
U.S. Appl. No. 62/234,483.
U.S. Appl. No. 62/315,343.
U.S. Appl. No. 62/318,542.
U.S. Appl. No. 62/346,915.
U.S. Appl. No. 62/379,462.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, GD 2500Q HDF Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
VargusUSA, "Groovex Innovative Grooving Solutions—Groove Milling," Dec. 12, 2011, http://www.youtube.com/watch?v=vrFxHJUXjvk, 68 pages.

Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.
Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC* Docket Entries, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quinuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering, Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.

(56)                References Cited

OTHER PUBLICATIONS

Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.
Declaration of Duncan Hall from Internet Archive/Wayback Machine, Feb. 3, 2021, Kerr Plunger Pump Manuals, 20 pages.
Michael Agnes, Editor, Webster's New World College Dictionary, Fourth Edition, 1999, 5 pages.
Weir SPM Oil & Gas, Grooveless Fluid End, 2008, 1 page.
Weir SPM Oil & Gas, Weir SPM General Catalog, 2009, 40 pages.
Weir SPM Oil & Gas, Well Service Pump Reference Guide, 2008, 55 pages.
*Intellectual Ventures I LLC* v *VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.
*Vulcan Industrial Holding, LLC et al.* v. *Kerr Machine Co.* Case No. 4:21-cv-433, Document 1, Complaint for Declaratory Judgment of Patent Non-Infringement, Feb. 9, 2021, 17 pages.
*Trilogy Enterprises, Inc.,* v. *Trilogy Education Services, LLC*, Case. No. 6:19-cv-199-ADA-JCM, Document 35, Fifth Amended Scheduling Order, Sep. 8, 2020, 4 pages.
*Dr. Corneliu Bolbocean* v *Baylor University*, Case No. 6:19-CV-00465-ADA-JCM, Document 34, Scheduling Order, Apr. 6, 2020, 4 pages.
*Kerr Machine Co.,* v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.
*Kerr Machine Co.,* v *Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement and Jury Demand, Jan. 19, 2021, 47 pages.
*Kerr Machine Co.,* v *Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.
*Kerr Machine Co.,* v *Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.
*Kerr Machine Co.,* v *Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.
*Kerr Machine Co.,* v. *Vulcan Industrial Holdings, LLC*, Case. No. 6:20-CV-00200-ADA, Affidavit of Service, Apr. 7, 2020, 1 page.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.
*Kerr Machine Co.,* v *Vulcan Industrial Holdings, LLC*, Case No. 6:20-CV-00200-ADA, Plaintiff's Preliminary Infringement Contentions, May 22, 2020, 50 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Preliminary Invalidity Contentions, Aug. 13, 2020, 29 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings in Civil Cases in Light of Chief Judge Garcia's 24 Amended Order, Mar. 24, 2020, 4 pages.
*Kerr Machine Co.,* v *Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co.,* v *Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co.,* v *Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et. al.,* v *Kuiper Dairy, LLC*, et. al., Case No. 6:20-CV-00250-ADA-JCM, Document 20, Scheduling Order, Jul. 22, 2020, 4 pages.
*Acquanlan Deonshay Harris* v. *Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B.,* v *Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal* v. *Roger Lee Thomas and Apple Logistics, Inc.*, Case No. 6:20-CV-00356-ADA-JCM, Document 12, Scheduling Order, Jul. 28, 2020, 4 pages.
*Tipton International, Inc.,* v. *Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc.,* v. *Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd.,* v. *3Shape Trios A/S and 3Shape A/S*, Case No. WA:19-CV-00680-ADA, Document 27, Scheduling Order, Apr. 8, 2020, 4 pages.
*Kerr Machine Co.* vs. *Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).

(56) References Cited

OTHER PUBLICATIONS

Sur-Lock Liner Retention System—Video (https://premiumoilfield.com/performance-enhancements/sur-lock/sur-lock-liner-retention-system.html) (https://www.youtube.com/watch?v=6NZGeD5NkF8) (Year: 2017).

U.S. Appl. No. 17/241,680 titled "Fluid End and Center Feed Suction Manifold", filed Apr. 27, 2021.

Karolczuk et al., "Application of the Gaussian Process for Fatigue Life Prediction Under Multiaxial Loading", Mechanical Systems and Signal Processing 167 (2022), Nov. 14, 2021.

Carraro et al. "A Damage Based Model for Crack Initiation in Unidirectional Composites Under Multiaxial Cyclic Loading", Composite Science and Technology 99 (2014), 154-163, May 16, 2014.

Albinmousa et al., "Cyclic Axial and Cyclic Torsional Behaviour of Extruded AZ31B Magnesium Alloy", International Journal of Fatigue 33 (2011), 1403-1416, 2011.

Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.

Guan et al., "Model Selection, Updating, and Averaging for Probabilistic Fatigue Damage Prognosis", Journal of Structural Safety, Mar. 11, 2011.

Frick et al., "Orientation-Independent Pseudoelasticity in Small-Scale Niti Compression Pillars", Scripta Materialia 59(12), 7-10, 2008.

Naghipour et al., "Fatigue Analysis of Notched Laminates: A Time-Efficient Macro-Mechanical Approach", Ohio Aerospace Institute, Cleveland, 2016.

International Search Report and Written Opinion for international application No. PCT/US2023/066143, mailed Aug. 28, 2023.

International Search Report and Written Opinion for international application No. PCT/US2023/073458, mailed Feb. 1, 2024.

Flowserve, "Dynamic Balance Plug Valve and Double DB Plug Valve: Installation, Operation and Maintenance," 2011, https://www.flowserve.com/sites/default/files/2016-07/NVENIM2005-00_0.pdf, 36 pages.

Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.

White Star Pump Co., "Maintenance Manual: Triplex Pump WS-1300/1600," 2005, http://www.whitestarpump.com/ES/docs/user_t.pdf, 45 pages.

KerrPumps, "Super Stainless Steel Better Than The Best," http://kerrpumps.com/superstainless?gclid=EAIaIQobChMIg47o482q6wIVilTICh2XPA-qEAAYASAAEgKrxPD_BwE, 2013, last accessed: Aug. 21, 2020, 6 pages.

KerrPumps, "Frac One Pumps—Fluid End—Fracing," http://kerrpumps.com/fracone, 2013, last accessed: Aug. 21, 2020, 3 pages.

KerrPumps, "KerrPumps—Frac Pump & Mud Pump Fluid End—Fluid End Pump," http://kerrpumps.com/fluidends, 2013, last accessed: Aug. 21, 2020, 6 pages.

Vulcan Industrial, "Vulcan," http://www.vulcanindustrial.com/, 2019, last accessed: Aug. 21, 2020, 3 pages.

Vulcan Industrial, "Vulcan," http://www.vulcanindustrial.com/fluidends/, 2019, last accessed: Aug. 21, 2020, 3 pages.

Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).

Kerr Pumps, "the most advanced fluid ends", (site visited Aug. 5, 2021), Kerrpumps.com, URL: <http://kerrpumps.com/fluidends> (Year: 2021).

Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).

John Miller, "The Reciprocating Pump, Theory, Design and Use," 1995, 2nd Edition, Krieger Publishing Company, Malabar, Florida, 1 page.

"QIH-1000 HP Quintuplex," Dixie Iron Works, 2017, https://web.archive.org/web/20171031221150/http://www.diwmsi.com/pumping/qi-1000/.

Technical Manual MSI Hybrid Well Service Pump Triplex and Quintuplex Models, Dixie Iron Works, Mar. 12, 2019, 88 pages. https://www.diwmsi.com/pumping/qi-1000/.

Carpenter, "CarTech Ferrium C61 Data Sheet," 2015, 2 pages.

The American Heritage Dictionary, Second College Edition, 1982, 6 pages.

Matthew Bultman, "Judge in West Texas Patent Hot Spot Issues Revised Guidelines," Sep. 23, 2020, Bloomberg Law News, 3 pages.

David L. Taylor, "Machine Trades Blueprint Reading: Second Edition," 2005, 3 pages.

Blume, U.S. Pat. No. 6,544,012, issued Apr. 8, 2003, Fig. 12A.

Caterpillar, "Cat Fluid Ends For Well Stimulation Pumps," 2015, 2 pages.

Claim Chart for U.S. Pat. No. 6,544,012, 23 pages.

Claim Chart for U.S. Pat. No. 7, 186,097, 22 pages.

Claim Chart for U.S. Pat. No. 7,845,413, 8 pages.

Claim Chart for U.S. Pat. No. 9,534,472, 8 pages.

Claim Chart for U.S. Pat. Pub. No. 2013/0319220, 17 pages.

Claim Chart for U.S. Pat. Pub. No. 2014/0348677, 10 pages.

Claim Chart for U.S. Pat. Pub. No. 2015/0132157, 23 pages.

Claim Chart for "GD-3000," 9 pages.

Claim Chart for "NOV-267Q," 14 pages.

Collins English Dictionary, "annular," https://www.collinsdictionary.com/us/dictionary/english/annular, 2021, 4 pages.

Collins English Dictionary, "circumference," https://www.collinsdictionary.com/us/dictionary/english/circumference, 2021, 7 pages.

Collins English Dictionary, "plug," https://www.collinsdictionary.com/us/dictionary/english/plug, 2021, 17 pages.

Collins English Dictionary, "profile," https://www.collinsdictionary.com/us/dictionary/english/profile, 2021, 10 pages.

Collins English Dictionary, "sleeve," "therethrough," "through," "tube," and "tubular," 8 pages.

Collins English Dictionary, "space," https://www.collinsdictionary.com/us/dictionary/english/space, 2021, 13 pages.

Collins English Dictionary, "stairstep," https://www.collinsdictionary.com/us/dictionary/english/stairstep, 2021, 3 pages.

Congressional Record—Extensions of Remarks, Apr. 18, 2007, pp. E773-E775.

Congressional Record, Mar. 7, 2011, 31 pages.

"Declaration of Steven M. Tipton, Ph.D., P.E., Submitted with Patent Owner's Preliminary Response," Sep. 11, 2020, 155 pages.

"Declaration of William D. Marscher, P.E.—U.S. Pat. No. 10,914,171," Feb. 11, 2021, 308 pages.

"Declaration of William D. Marscher, P.E.—U.S. Pat. No. 10,591,070," May 25, 2020, 209 pages.

Email dated Sep. 22, 2020 in PGR2020-00065, 3 pages.

Email dated Sep. 25, 2020 in *Kerr Machine* v *Vulcan Industrial Holdings*, 1 page.

U.S. Appl. No. 16/722,139.

U.S. Appl. No. 13/773,271.

U.S. Appl. No. 15/719,124.

DiaCom Corporation, "Diaphragm Design Guidebook", 28 pages, 2018.

International Search Report and Written Opinion for international application No. PCT/US2025/059804, mailed Mar. 11, 2026.

* cited by examiner

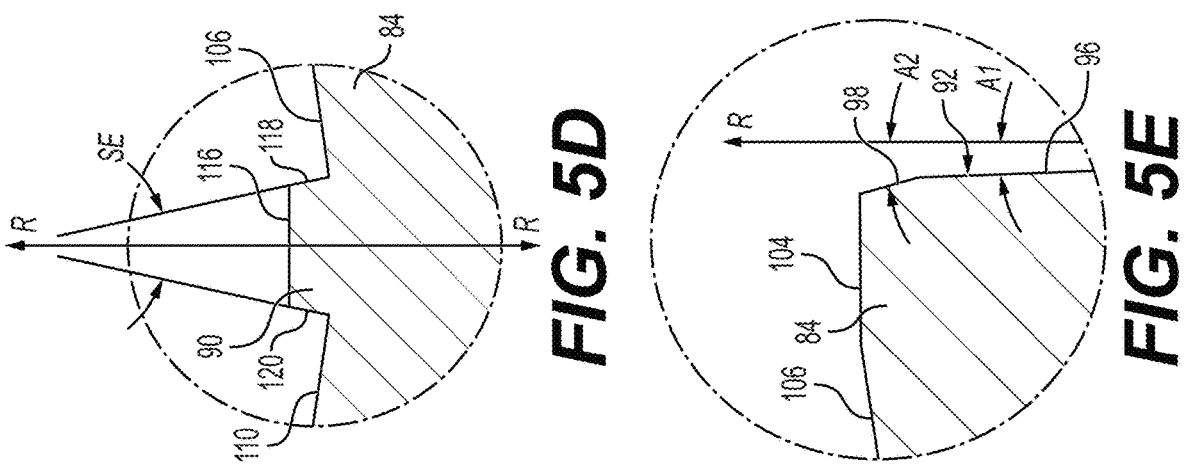
*FIG. 5D*
*FIG. 5E*
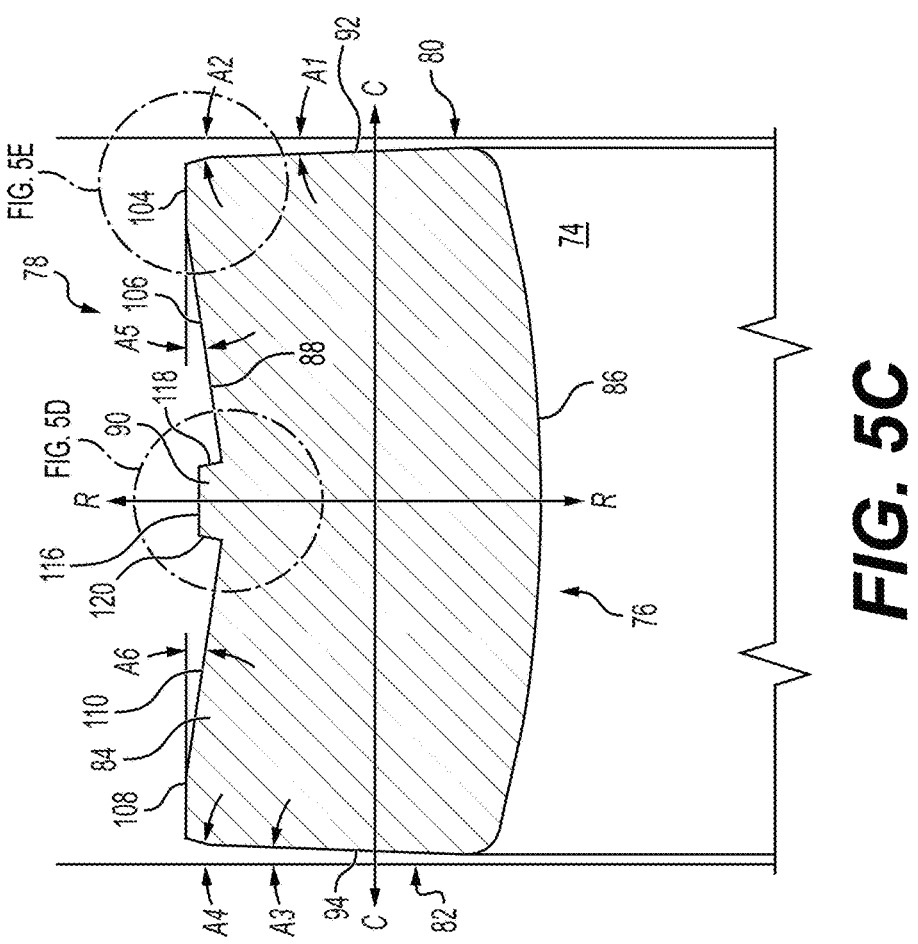
*FIG. 5C*

SYSTEMS, ASSEMBLIES, APPARATUSES, AND METHODS PROVIDING ENHANCED FLUID SEAL FOR HIGH-POWER PUMPS

TECHNICAL FIELD

The present disclosure relates to systems, assemblies, apparatuses, and methods providing an enhanced fluid seal for high-power pumps and, more particularly, to systems, assemblies, apparatuses, and methods providing an enhanced fluid seal between components in high-power pumps.

BACKGROUND

Pumps may be used to transfer a fluid having a first pressure from one location to another location at a second pressure greater than the first pressure. Some types of pumps may be subject to fluctuating interior pressure during operation. For example, a chamber in the interior of a reciprocating pump may be exposed to a relatively lower pressure as a plunger moves in a first direction, creating suction to draw fluid into the chamber via an intake port, and thereafter, may be exposed to relatively higher pressure as the plunger moves in a second direction, increasing the pressure of the fluid and discharging the fluid at the increased pressure from a discharge port.

Pumps may often include a number of fluid seals to prevent fluid from passing from one portion of the pump to another or from the interior of the pump to the exterior of the pump. An example of such a seal may be used to provide a fluid seal between mating components of the pump. For example, some types of pumps may include various ports that receive another component, and it may be important to provide a fluid seal between the port and the other component. For example, a cover or a sleeve may be received in the port, and a seal may be provided between the cover or sleeve and the port in order to provide a fluid seal between the two components. In order to help anchor the seal relative to the cover or sleeve, a gland or groove may be provided on the cover, on the sleeve, or in the port, and the seal may be at least partially received in the groove. Some types of pumps, as noted above, may experience relatively large fluctuations in pressure, which may cause the seal to deflect or compress during pressure fluctuations. Applicant has recognized that this may result in causing the seal and/or the groove to degrade relatively more quickly, for example, as fluid pumped during operation of the pump may migrate into the groove between the deflected or compressed seal and the groove. The wear may be particularly pronounced, depending on the contents of the fluid. For example, abrasive particles and/or corrosive fluids may accelerate the wear of the seal and/or the groove, potentially leading to shortened service lives of the seal and one or more of the components, as well as increased downtime, reducing the efficiency of operations using the pump.

An example high-power pump may be used to pump fracturing fluid at high pressures and high flow rates during a hydraulic fracturing operation. For example, a hydraulic fracturing operation involves pumping a fracturing fluid at high flow rates and high pressures sufficient to fracture a reservoir formation to allow hydrocarbons to more easily flow from the formation toward a wellbore for production. Such high rates of flow and high pressures may result in significant wear to components associated with the fluid flow, such as high-power pumps used to pump the fracturing fluid. In addition, the fracturing fluid may contain substances, for example, proppants and fluids having abrasive and corrosive characteristics, and thus, seals and components associated with the fracturing operation may exhibit relatively higher wear rates or failure rates. As a result, components associated with pumps, such as seals, may be particularly susceptible high wear rates and failure rates, thereby requiring relatively more frequent maintenance, repair, or replacement, which may increase downtime for the hydraulic fracturing operation and reduce efficiency and productivity. For example, the seals and related components may degrade with use in such harsh conditions, as described above, creating leakage at the seals and related components, which reduces the efficiency and capabilities of the pump.

For at least these reasons, Applicant has recognized that it may be desirable to provide seals, related assemblies, and related methods resulting in relatively longer service lives that reduce downtime associated with use in a high-power pump. At least some examples described herein may address one or more of the above-noted potential issues, as well as possibly others.

SUMMARY

As referenced above, it may be desirable to provide seals, related assemblies, and related methods that result in relatively longer service lives that reduce downtime associated with use in a high-power pump, such as, for example, seals and components used in the oil and gas industry, where the operating conditions and fluids may present a particularly harsh environment. In some embodiments, the systems, assemblies, apparatuses, and methods presented herein may provide a relatively enhanced fluid seal between pump components, such as seals and adjacent components, which may result in relatively reduced damage, deformation, wear, and/or leakage during operation of high-power pumps including the seals and components. For example, in some embodiments, the seals and associated components may be configured to reduce or prevent damage, deformation, wear, and/or leakage of the seals and associated components during operation of a high-power pump.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face, and the seal cross-section may have a groove edge at least partially defined by the groove face. The groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the one of the first component or the second component when the other of the first component or the second component presses against the protrusion in a direction toward the groove face, thereby to expand the annular seal body laterally outward from the first lateral face and the second lateral face, thereby to enhance the fluid seal between the first component and the second component.

According to some embodiments, a method to enhance a fluid seal between two components of a pump may include inserting an annular seal into an annular groove of a first component of the pump. The annular seal may include a groove face and a sealing face opposite the groove face. The groove face, in an undeformed condition, may be substantially convex, and the sealing face, in the undeformed condition, may be substantially concave. The annular groove may have a groove cross-section at least partially defined by a bottom of the annular groove, a first side wall of the annular groove, a second side wall of the annular groove opposite the first side wall, and an open portion of the annular groove opposite the bottom of the annular groove and extending between the first side wall and the second side wall. Inserting the annular seal into the annular groove may result in at least a portion of the groove face of the annular seal contacting the bottom of the annular groove and at least a portion of sealing face of the annular seal protruding beyond the open portion of the annular groove. The method further may include assembling a second component of the pump relative to the first component of the pump, and compressing, via the second component, so as to deform the annular seal when positioned in the annular groove, causing the groove face to abut and substantially fill the bottom of the annular groove and extend from the first side wall to the second side wall, so as to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body also may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. One or more of the groove face, the sealing face, the first lateral face, or the second lateral face may be positioned to cause the seal to deform in the groove of the one of the first component or the second component when the other of the first component or the second component presses against the protrusion in a direction toward the groove face, thereby to expand the annular seal body laterally outward from the first lateral face and the second lateral face and preload the seal in the groove, thereby to enhance the fluid seal between the first component and the second component.

According to some embodiments, a seal to enhance a fluid seal between a first component and a second component may include an annular seal body. The annular seal body may have a groove face positioned to face a groove of the first component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the sealing edge may meet at a first sealing edge intersection, and the second lateral edge and the sealing edge may meet at a second sealing edge intersection. The groove edge may at least partially define a groove edge apex, and the protrusion may at least partially define a protrusion apex. One or more of (a) the first sealing edge intersection or (b) the second sealing edge intersection, and the groove edge apex may at least partially define a first radial dimension, and the groove edge apex and the protrusion apex may at least partially define a second radial dimension. The first radial dimension may be greater than the second radial dimension, such that as the second component compresses the seal at the first sealing edge intersection and the second sealing edge intersection, the groove edge apex causes the protrusion to be compressed against the second component, thereby to preload the seal and enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body also may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The groove edge and the sealing edge may at least partially define a spring, such that as the other of the first component or the second component compresses the seal, the groove edge causes the protrusion to be pressed outward against the other of the first component or the second component, thereby to preload the seal and enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The seal cross-section may at least partially define a seal cross-sectional area. The groove edge may at least partially define a convex radius between the first lateral edge and the second lateral edge, and the seal cross-sectional area and the convex radius may be selected to: (a) cause the seal to expand laterally outward against side walls of the groove when the other of the first component or the second component compresses the seal, and (b) press the protrusion against the other of the first component or the second component when the other of the first component or the second component compresses the seal, thereby to enhance the fluid seal between the first component and the second component.

According to some embodiments, a cover and seal assembly for a fluid end of a high-power pump may include a cover having a substantially cylindrical cover body having an outer surface including an annular groove extending around the cover body. The cover and seal assembly further may include a seal at least partially received in the annular groove. The seal may include an annular seal body, and the annular seal body may have a groove face facing the annular groove of the cover, and a sealing face opposite the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the cover when the fluid end presses against the protrusion in a direction toward the groove face, thereby to expand the annular seal body laterally outward from the first lateral face and the second lateral face, thereby to enhance the fluid seal between the cover and the fluid end.

According to some embodiments, a fluid end for a high-power pump may include a fluid end housing at least partially defining a chamber, a suction port providing a fluid path into the chamber, a discharge port providing a fluid path from the chamber, and an access port providing access to the chamber. The fluid end further may include a cover received in the access port, and a seal between the cover and the access port providing a fluid seal between the cover and the fluid end housing. The seal may include an annular seal body having a groove face facing the annular groove of the cover, and a sealing face opposite the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the cover when the fluid end presses against the protrusion in a direction toward the groove face, thereby to expand the annular seal body laterally outward from the first lateral face and the second lateral face, thereby to enhance the fluid seal between the cover and the fluid end.

According to some embodiments, a sleeve and seal assembly for a fluid end of a high-power pump may include a sleeve having a substantially cylindrical sleeve body having an outer surface including an annular groove extending around the sleeve body. The sleeve and seal assembly further may include a seal at least partially received in the annular groove. The seal may include an annular seal body, and the annular seal body may have a groove face facing the annular groove of the sleeve, and a sealing face opposite the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the sleeve when the fluid end presses against the protrusion in a direction toward the groove face, thereby to expand the annular seal body laterally outward from the first lateral face and the second lateral face, thereby to enhance the fluid seal between the sleeve and the fluid end.

According to some embodiments, a fluid end for a high-power pump may include a fluid end housing at least partially defining a chamber, a suction port providing a fluid path into the chamber, a discharge port providing a fluid path from the chamber, and a plunger port positioned to at least partially receive therein a reciprocating plunger. The fluid end further may include a sleeve received in the plunger port, and a seal between the sleeve and the plunger port providing a fluid seal between the sleeve and the fluid end housing. The seal may include an annular seal body having a groove face facing the annular groove of the sleeve, and a sealing face opposite the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the sleeve when the fluid end presses against the protrusion in a direction toward the groove face, thereby to expand the annular seal body laterally outward from the first lateral face and the second lateral face, thereby to enhance the fluid seal between the sleeve and the fluid end.

According to some embodiments, a high-power pump may include a power end positioned to convert rotational power into reciprocating motion, a plunger connected to the power end and positioned to reciprocate, and a fluid end connected to the power end. The fluid end may include a fluid end housing at least partially defining a chamber, a suction port providing a fluid path into the chamber, a discharge port providing a fluid path from the chamber, and an access port providing access to the chamber. The fluid end further may include a cover received in the access port, and a seal between the cover and the access port providing a fluid seal between the cover and the fluid end housing. The fluid end may at least partially receive therein the plunger as the plunger reciprocates, thereby to draw-in fluid at a first pressure via the suction port during movement of the plunger in a first direction and discharge the fluid at a second pressure greater than the first pressure via the discharge port during movement of the plunger in a second direction. The seal may include an annular seal body. The annular seal body may have a groove face facing the annular groove of the sleeve, and a sealing face opposite the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the sleeve when the fluid end presses against the protrusion in a direction toward the groove face, thereby to expand the annular seal body laterally outward from the first lateral face and the second lateral face, thereby to enhance the fluid seal between the cover and the fluid end.

According to some embodiments, a high-power pump may include a power end positioned to convert rotational power into reciprocating motion, a plunger connected to the power end and positioned to reciprocate, and a fluid end connected to the power end. The fluid end may include a fluid end housing at least partially defining a chamber, a suction port providing a fluid path into the chamber, a discharge port providing a fluid path from the chamber, a plunger port, and a sleeve received in the plunger port. The sleeve may be positioned to at least partially receive therein the plunger as the plunger reciprocates, thereby to draw-in fluid at a first pressure via the suction port during movement of the plunger in a first direction and discharge the fluid at a second pressure greater than the first pressure via the discharge port during movement of the plunger in a second direction. The fluid end further may include a seal between the sleeve and the plunger port providing a fluid seal between the sleeve and the fluid end housing. The seal may include an annular seal body. The annular seal body may have a groove face facing the annular groove of the sleeve, and a sealing face opposite the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially convex. The seal cross-section further may have a sealing edge at least partially defined by the sealing face, and the sealing edge may be at least partially concave and have a protrusion between the first lateral face and the second lateral face. The seal cross-section also may have a first lateral edge at least partially defined by the first lateral face, and a second lateral edge at least partially defined by the second lateral face. The first lateral edge and the second lateral edge may be oblique with respect to one another. One or more of the groove face, the sealing face, the first lateral face, or the second lateral face may be positioned to cause the seal to deform in the groove of the sleeve when the fluid end presses against the protrusion in a direction toward the groove face, thereby to expand the annular seal body laterally outward from the first lateral face and the second lateral face, thereby to enhance the fluid seal between the sleeve and the fluid end.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may be at least partially concave. The seal cross-section further may have a sealing edge at least partially defined by the sealing face, and the sealing edge may be at least partially concave. The seal cross-section also may have a first lateral edge at least partially defined by the first lateral face, and a second lateral edge at least partially defined by the second lateral face. The groove edge and the sealing edge may form an area between the first lateral edge and the second lateral edge having a relatively reduced thickness. One or more of the groove face, the sealing face, the first lateral face, or the second lateral face may be positioned to cause the seal to deform in the groove of the one of the first component or the second component when the other of the first component or the second component presses against the sealing face in a direction toward the groove face, thereby to compress the area between the first lateral edge and the second lateral edge and expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and the groove edge may at least partially define a groove recess. The seal cross-section further may have a sealing edge at least partially defined by the sealing face, and the sealing edge may be at least partially convex. The seal cross-section also may have a first lateral edge at least partially defined by the first lateral face, and a second lateral edge at least partially defined by the second lateral face. The first lateral edge, the sealing edge, and the second lateral edge may at least partially define a substantially continuous arc. One or more of the groove face, the sealing face, the first lateral face, or the second lateral face may be positioned to cause the seal to deform in the groove of the one of the first component or the second component when the other of the first component or the second component presses against the sealing face in a direction toward the groove face, thereby to push an area of the seal between the first lateral edge and the second lateral edge against the other of the first component or the second component and expand the annular seal body laterally outward from the first lateral face and the second lateral face and press against walls of the groove, thereby to enhance the fluid seal between the first component and the second component.

According to some embodiments, a seal to enhance a fluid seal between an outer surface of a first component having a substantially circular cross-section and an inner surface of a second component, may include a first annular seal body. The first annular seal body may have a first intermediate face positioned to face toward a groove of one of the first component or the second component, and a sealing face opposite the first intermediate face and positioned to face away from the first intermediate face. The first annular seal body further may have a first lateral face extending between the first intermediate face and the sealing face, and a second lateral face opposite the first lateral face and extending between the first intermediate face and the sealing face. The first annular seal body may have a first seal cross-section at least partially defined by the first intermediate face, the sealing face, the first lateral face, and the second lateral face. The first seal cross-section may have a first intermediate edge at least partially defined by the first intermediate face, and the first intermediate edge may be oblique with respect to a circumferential axis of the seal. The first seal cross-section further may have a sealing edge at least partially defined by the sealing face, and the sealing edge may be at least partially concave. The first lateral edge may be at least partially defined by the first lateral face. The first seal cross-section also may have a second lateral edge at least partially defined by the second lateral face, and the second lateral edge may be at least partially concave. The seal further may include a second annular seal body. The second annular seal body may have a groove face positioned to face the groove of the one of the first component or the second component, and a second intermediate face opposite the groove face and positioned to face away from the groove face. The second intermediate face may be adjacent the first intermediate face. The second annular seal body further may have a third lateral face extending between the groove face and the second intermediate face, and the third lateral face may provide an extension of the first lateral face. The second annular seal body also may have a fourth lateral face opposite the third lateral face and extending between the groove face and the second intermediate face, and the fourth lateral face may provide an extension of the second lateral face. The second annular seal body may have a second seal cross-section at least partially defined by the groove face, the second intermediate face, the third lateral face, and the fourth lateral face. The second seal cross-section may have a groove edge at least partially defined by the groove face, and a second intermediate edge at least partially defined by the second intermediate face. The second seal cross-section further may have a third lateral edge at least partially defined by the third lateral face, and a fourth lateral edge at least partially defined by the fourth lateral face. One or more of the first annular seal body or the second annular seal body may be positioned to cause the seal to deform in the groove of the one of the first component or the second component when the other of the first component or the second component presses against the sealing face of the first annular seal body in a direction toward the groove face, thereby to expand the first annular seal body and the second annular seal body outward from: (a) the first lateral face and the third lateral face, and (b) the second lateral face and the fourth lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body, further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. The groove edge may at least partially define a groove edge recess between the first lateral edge and the second lateral edge. The seal further may include an O-ring received in the groove edge recess of the groove face. One or more of the groove face, the O-ring, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may include a groove face positioned to face a groove of one of the first component or the second component, and a sealing face opposite the groove face and positioned to face away from the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and the first lateral edge may at least partially define a first lateral recess between the groove edge and the sealing edge. The seal cross-section also may have a second lateral edge at least partially defined by the second lateral face, and the second lateral edge may at least partially define a second lateral recess between the groove edge and the sealing edge. The seal further may include a first O-ring at least partially received in the first lateral recess of the first lateral face, and a second O-ring at least partially received in the second lateral recess of the second lateral face. One or more of the groove face, the first O-ring, the second O-ring, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face and press the first O-ring and the second O-ring against walls of the groove, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and the first lateral edge and the groove edge may meet at a first groove edge intersection. One or more of the first lateral edge or the groove edge may at least partially define a first intersection recess at the first groove edge intersection. The seal cross-section also may have a second lateral edge at least partially defined by the second lateral face, and the second lateral edge and the groove edge may meet at a second groove edge intersection. One or more of the second lateral edge or the groove edge may at least partially define a second intersection recess at the second groove edge intersection. The seal further may include a first O-ring at least partially received in the first intersection recess, and a second O-ring at least partially received in the second intersection recess. One or more of the groove face, the first O-ring, the second O-ring, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face and press the first O-ring and the second O-ring against walls of the groove, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may include a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. The sealing edge may at least partially define a plurality of sealing edge recesses between the first lateral edge and the second lateral edge. The seal further may include a plurality of O-rings. Each of the plurality of O-rings may be received in one of the plurality of sealing edge recesses of the sealing face. One or more of the groove face, the plurality of O-rings, the sealing face, the first lateral face, or the second lateral face may be positioned to cause the seal to deform in the groove of the one of the first component or the second component when the other of the first component or the second component presses against the plurality of O-rings in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The sealing edge may have a sealing edge recess. The seal cross-section further may include a first lateral edge at least partially defined by the first lateral face, and a second lateral edge at least partially defined by the second lateral face. The seal further may include an annular stiffener at least partially received in the sealing edge recess of the annular seal body. The annular stiffener may have a first stiffener face adjacent the sealing face of the annular seal body, and a second stiffener face opposite the first stiffener face. The annular stiffener further may have a stiffener cross-section at least partially defined by the first stiffener face and the second stiffener face. The stiffener cross-section may have a first stiffener edge at least partially defined by the first stiffener face, and the first stiffener edge may be at least partially convex. The stiffener cross-section further may have a second stiffener edge at least partially defined by the second stiffener face. One or more of the groove face, the sealing face, the first lateral face, the second lateral face, the first stiffener face, or the second stiffener face may be positioned to cause the seal to deform in the groove of the one of the first component or the second component when the other of the first component or the second component presses against outer edges of the sealing face and the second stiffener face in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. The seal further may include a plurality of stiffeners extending between the first lateral face and the second lateral face of the annular seal body. The plurality of stiffeners may be circumferentially spaced around the annular seal body. One or more of the groove face, the sealing face, the first lateral face, the second lateral face, or one or more of the plurality of stiffeners may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include a first annular seal body. The first annular seal body may have a first groove face positioned to face a groove of one of the first component or the second component, and a first sealing face opposite the first groove face and positioned to face away from the first groove face. The first annular seal body further may have a first lateral face extending between the first groove face and the first sealing face, and a second lateral face opposite the first lateral face and extending between the first groove face and the first sealing face. The first annular seal body may have a first seal cross-section at least partially defined by the first groove face, the first sealing face, the first lateral face, and the second lateral face. The first seal cross-section may have a first groove edge at least partially defined by the first groove face, and a first sealing edge at least partially defined by the first sealing face. The first seal cross-section further may have a first lateral edge at least partially defined by the first lateral face, and a second lateral edge at least partially defined by the second lateral face. The seal further may include a second annular seal body. The second annular seal body may have a second groove face positioned to face the groove of the one of the first component or the second component, and a second sealing face opposite the second groove face and positioned to face away from the second groove face. The second annular seal body further may have a third lateral face extending between the second groove face and the second sealing face, and a fourth lateral face opposite the third lateral face and extending between the second groove face and the second sealing face. The second annular seal body may have a second seal cross-section at least partially defined by the second groove face, the second sealing face, the third lateral face, and the fourth lateral face. The second seal cross-section may have a second groove edge at least partially defined by the second groove face, and a second sealing edge at least partially defined by the second sealing face. The second seal cross-section also may have a third lateral edge at least partially defined by the third lateral face and facing toward the second lateral edge, and a fourth lateral edge at least partially defined by the fourth lateral face. The seal also may include an annular stiffener between the first annular seal body and the second annular seal body and extending between the second lateral face and the third lateral face. One or more of the first annular seal body, the second annular seal body, or the annular stiffener may be positioned to cause the seal to deform in the groove of the one of the first component or the second component when the other of the first component or the second component presses against the first sealing face and the second sealing face in a direction toward the first groove face and the second groove face, thereby to expand the first annular seal body laterally outward from the first lateral face and the second annular seal body outward from the fourth lateral face, thereby to enhance the fluid seal between the first component and the second component.

According to some embodiments, a seal to enhance a fluid seal between an outer surface of a first component having a substantially circular cross-section and an inner surface of a second component, may include an annular seal body including a helically-wound material coil. The annular seal body may at least partially define a groove face positioned to face a groove of one of the first component or the second component, and a sealing face opposite the groove face and positioned to face away from the groove face. The annular seal body further may include a first lateral face extending between the groove face and the sealing face, and a second lateral face opposite the first lateral face and extending between the groove face and the sealing face. the annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. One or more of the groove face, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face and press against walls of the groove, thereby to enhance the fluid seal between the first component and the second component.

According to some embodiments, a seal to enhance a fluid seal between an outer surface of a first component having a substantially circular cross-section and an inner surface of a second component, may include a first annular seal body. The first annular seal body may have a first groove face positioned to face a groove of one of the first component or the second component, and a first sealing face opposite the first groove face and positioned to face away from the first groove face. The first annular seal body further may have a first lateral face extending between the first groove face and the first sealing face, and a second lateral face opposite the first lateral face and extending between the first groove face and the first sealing face. The first annular seal body may have a first seal cross-section at least partially defined by the first groove face, the first sealing face, the first lateral face, and the second lateral face. The first seal cross-section may have a first groove edge at least partially defined by the first groove face, and a first sealing edge at least partially defined by the first sealing face. The first seal cross-section further may have a first lateral edge at least partially defined by the first lateral face, and a second lateral edge at least partially defined by the second lateral face. The seal further may include a second annular seal body. The second annular seal body may have a second groove face positioned to face the groove of the one of the first component or the second component, and a second sealing face opposite the second groove face and positioned to face away from the second groove face. The second annular seal body further may have a third lateral face extending between the second groove face and the second sealing face, and a fourth lateral face opposite the third lateral face and extending between the second groove face and the second sealing face. The second annular seal body may have a second seal cross-section at least partially defined by the second groove face, the second sealing face, the third lateral face, and the fourth lateral face. The second seal cross-section may have a second groove edge at least partially defined by the second groove face, and a second sealing edge at least partially defined by the second sealing face. The second seal cross-section further may have a third lateral edge at least partially defined by the third lateral face and facing toward the second lateral edge, and a fourth lateral edge at least partially defined by the fourth lateral face. The seal further may include an annular stiffener between the first annular seal body and the second annular seal body and extending between the second lateral face and the third lateral face. The annular stiffener may include a helically-wound material coil. The annular stiffener may at least partially define a stiffener groove face positioned to face the groove of one of the first component or the second component, and a stiffener sealing face opposite the stiffener groove face and positioned to face away from the stiffener groove face. The annular stiffener further may at least partially define a first lateral stiffener face extending between the stiffener groove face and the stiffener sealing face. The first lateral stiffener face may be adjacent the second lateral face. The annular stiffener also may at least partially define a second lateral stiffener face opposite the first lateral stiffener face and extending between the stiffener groove face and the stiffener sealing face. The second lateral stiffener face may be adjacent the third lateral face. The annular stiffener may have a stiffener cross-section at least partially defined by the stiffener groove face, the stiffener sealing face, the first lateral stiffener face, and the second lateral stiffener face. The stiffener cross-section may have a stiffener groove edge at least partially defined by the stiffener groove face, and a stiffener sealing edge at least partially defined by the stiffener sealing face. The stiffener cross-section further may have a first lateral stiffener edge at least partially defined by the first lateral stiffener face, and a second lateral stiffener edge at least partially defined by the second lateral stiffener face. One or more of the first annular seal body, the second annular seal body, or the annular stiffener may be positioned to cause the seal to deform in the groove of the one of the first component or the second component when the other of the first component or the second component presses against the first sealing face and the second sealing face in a direction toward the first groove face and the second groove face, thereby to expand the first annular seal body laterally outward from the first lateral face and the second annular seal body outward from the fourth lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face. The groove edge may be one of at least partially concave or at least partially convex. The seal cross-section further may have a sealing edge at least partially defined by the sealing face, and the sealing edge may be one of at least partially concave or at least partially convex. The seal cross-section also may have a first lateral edge at least partially defined by the first lateral face, and a second lateral edge at least partially defined by the second lateral face. One or more of the groove face, the sealing face, the first lateral face, or the second lateral face may be positioned to cause the seal to deform in the groove of the one of the first component or the second component when the other of the first component or the second component presses against the sealing face in a direction toward the groove face, thereby to compress the area between the first lateral edge and the second lateral edge and expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. the seal cross-section further may have a first lateral edge at least partially defined by the first lateral face, and a second lateral edge at least partially defined by the second lateral face. One or more of the groove face, the sealing face, the first lateral edge, or the second lateral edge at least partially define an edge recess. The seal further may include an O-ring received in the edge recess. One or more of the groove face, the O-ring, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may have a groove face positioned to face a groove of one of the first component or the second component, and a sealing face opposite the groove face and positioned to face away from the groove face. The annular seal body further may have a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. One or more of the annular seal body, the groove face, the sealing face, the first lateral face, or the second lateral face may at least partially define a recess. The seal further may include a stiffener at least partially received in the recess. One or more of the groove face, the sealing face, the first lateral face, the second lateral face, or the stiffener may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face, thereby to enhance the fluid seal between the first component and the second component.

According to some embodiments, a seal to enhance a fluid seal between an outer surface of a first component having a substantially circular cross-section and an inner surface of a second component, may include an annular seal body. The annular seal body may include a helically-wound material coil. The annular seal body may at least partially define a groove face positioned to face a groove of one of the first component or the second component, and a sealing face opposite the groove face and positioned to face away from the groove face. The annular seal body further may at least partially define a first lateral face extending between the groove face and the sealing face, and a second lateral face opposite the first lateral face and extending between the groove face and the sealing face. The annular seal body may have a seal cross-section at least partially defined by the groove face, the sealing face, the first lateral face, and the second lateral face. The seal cross-section may have a groove edge at least partially defined by the groove face, and a sealing edge at least partially defined by the sealing face. The seal cross-section further may have a first lateral edge at least partially defined by the first lateral face, and a second lateral edge at least partially defined by the second lateral face. One or more of the groove face, the sealing face, the first lateral face, or the second lateral face may be positioned to cause the seal to deform in the groove of the one of the first component or the second component when the other of the first component or the second component presses against the sealing face in a direction toward the groove face, thereby to expand the annular seal body laterally outward from the first lateral face and the second lateral face and press against walls of the groove, thereby to enhance the fluid seal between the first component and the second component.

According to some embodiments, a method of installing a seal in a pump to enhance a fluid seal between two components of the pump, may include inserting an annular seal into an annular groove of a first component of the pump. The annular seal may include a groove face and a sealing face opposite the groove face. The groove face, in an undeformed condition, may be substantially convex and the sealing face, in the undeformed condition, may be substantially concave. The inserting may result in at least a portion of the groove face of the annular seal contacting a bottom of the annular groove and at least a portion of sealing face of the annular seal protruding beyond an open portion of the annular groove. The method further may include compressing, via a second component of the pump, so as to deform the annular seal when positioned in the annular groove, thereby to cause the groove face to abut and substantially fill a bottom of the annular groove and extend from a first side wall to a second side wall of the annular groove.

Still other aspects and advantages of these exemplary embodiments and other embodiments, are discussed in detail herein. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced. According to common practice, the various features of the drawings discussed below are not necessarily drawn to scale. Dimensions of various features and elements in the drawings may be expanded or reduced to more clearly illustrate embodiments of the disclosure.

FIG. 5C is a schematic section view of the example seal shown in FIG. 5A, according to embodiments of the disclosure.

FIG. 5D is a schematic detailed section view of a portion of the example seal shown in FIG. 5A, according to embodiments of the disclosure.

FIG. 5E is a schematic detailed section view of a portion of the example seal shown in FIG. 5A, according to embodiments of the disclosure.

DETAILED DESCRIPTION

The drawings include like numerals to indicate like parts throughout the several views, the following description is provided as an enabling teaching of exemplary embodiments, and those skilled in the relevant art will recognize that many changes may be made to the embodiments described. It also will be apparent that some of the desired benefits of the embodiments described may be obtained by selecting some of the features of the embodiments without utilizing other features. Accordingly, those skilled in the art will recognize that many modifications and adaptations to the embodiments described are possible and may even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, in particular, to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

The present disclosure generally is directed to systems, assemblies, apparatuses, and methods that may provide a relatively enhanced fluid seal between pump components, such as seals and adjacent components, which may result in relatively reduced damage, deformation, wear, and/or leakage during operation of high-power pumps including the seals and components. For example, in some embodiments, the seals and associated components may be configured to reduce or prevent damage, deformation, wear, and/or leakage of the seals and associated components during operation of a high-power pump.

Figure 1:
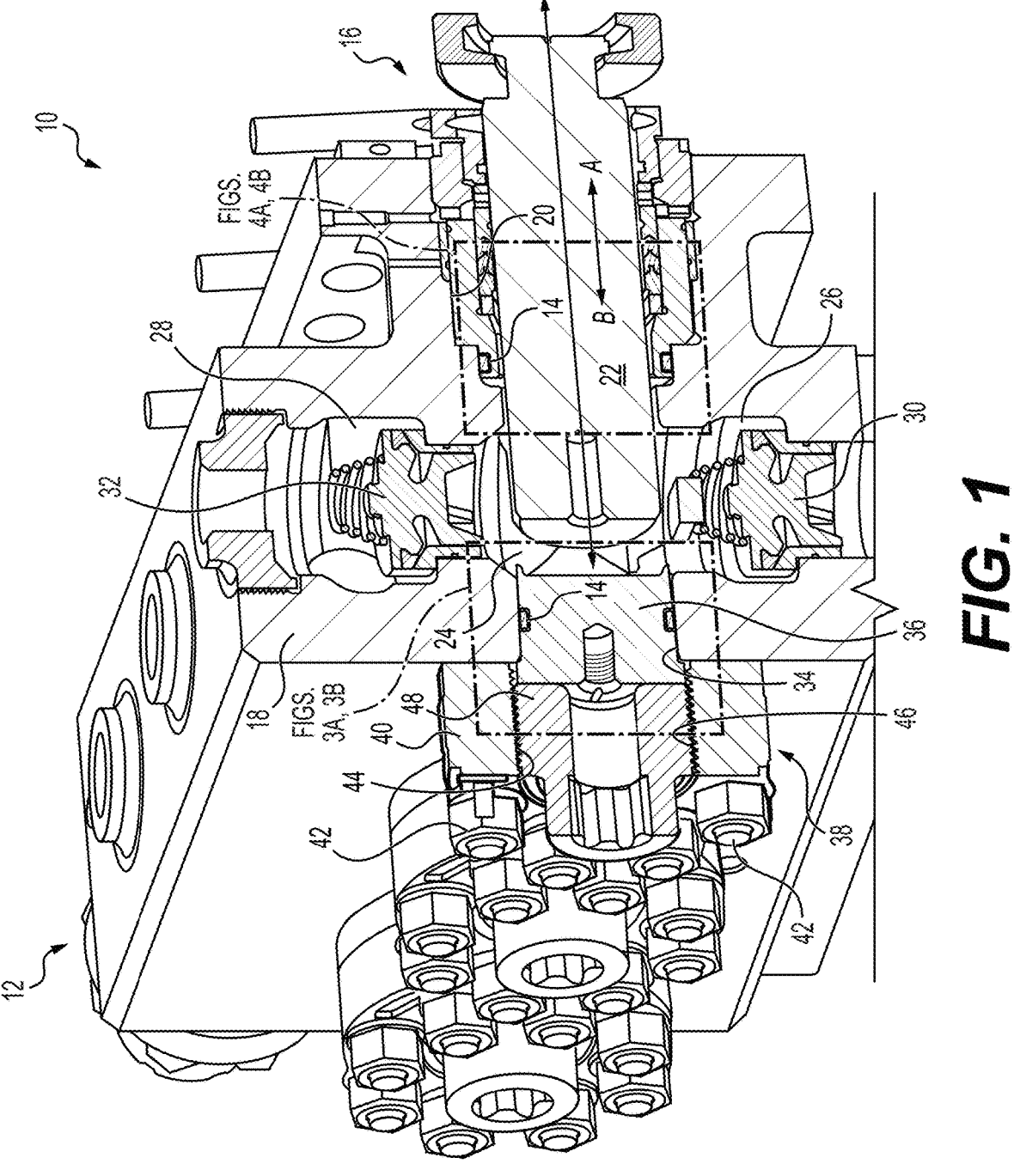
FIG. 1 is a schematic perspective section view of an example high-power pump and fluid end including example seals between example components of the high-power pump, according to embodiments of the disclosure.

For example, FIG. 1 is a schematic partial perspective section view of an example pump 10, including an example fluid end assembly 12, and example seals 14 between example components of the pump 10, according to embodiments of the disclosure. The pump 10 may be any high-power pump, high-pressure pump, reciprocating pump, and/or high-flow rate pump suitable for pumping solids, semi-solids, slurries, liquids, fluids, or combinations thereof. In some embodiments, the pump 10 may be, for example, a hydraulic fracturing pump for pumping hydraulic fracturing fluid. Although embodiments of the pump 10 are described herein as being a "hydraulic fracturing pump" for pumping hydraulic fracturing fluid for the purpose of discussion, the pump 10 may be any other type of pump, such as, for example, any type of high-power pump, high-pressure pump, reciprocating pump, and/or high-flow rate pump suitable for pumping solids, semi-solids, slurries, liquids, fluids, or combinations thereof. In some embodiments, the pump 10 may be, for example, a hydraulic fracturing pump for pumping solids, semi-solids, slurries, liquids, fluids, or combinations thereof, such as hydraulic fracturing fluid.

For example, a reciprocating plunger pump may be used to pump a fracturing fluid at high flow rates and high pressures sufficient to fracture a reservoir formation to allow hydrocarbons to more easily flow from the formation toward a wellbore for production. A hydraulic fracturing operation may include as many as six or more hydraulic fracturing units, and each of the hydraulic fracturing units may include a prime mover, such as an electric motor or internal combustion engine, either directly connected, or connected via a transmission, to the reciprocating plunger pump to supply power to drive the reciprocating plunger pump to pump the fracturing fluid into the formation to stimulate production of the well. For example, typical flow rates for a hydraulic fracturing operation may range from about 1,500 to about 4,000 gallons per minute, and typical pressures may range from about 7,500 to about 15,000 pounds per square inch. Although many examples discussed in this disclosure are explained in relation to hydraulic fracturing pumps, such as reciprocating plunger pumps for pumping fracturing fluid and related methods, other flow control-related and/or pumping-related operations, components, and methods are contemplated.

As shown in FIG. 1, the example pump 10 may be a reciprocating plunger pump and may include the fluid end assembly 12 and a power end assembly 16. The power end assembly 16 may include, for example, a housing with mechanical power transmission components, such as a crankshaft, bearings supporting the crankshaft in the housing, crossheads, reduction gears, and/or connecting rods and plungers connected to the connecting rods. As shown in FIG. 1, the fluid end assembly 12 may include, for example, a fluid end housing 18 including one or more cylinders 20 in which respective plungers 22 reciprocate, one or more chambers 24 receiving fluid, one or more suction ports 26 for drawing fluid into the one or more chambers 24, and one or more discharge ports 28 for discharging fluid from the one or more chambers 24 at a higher pressure. For example, as each plunger 22, moved via operation of the crankshaft and a respective connecting rod of the power end assembly 16, at least partially retracts into a respective cylinder 20, fluid is drawn into the chamber 24 of the fluid end assembly 12 via the suction port 26 in the fluid end housing 18 while an intake valve 30 is open and a discharge valve 32 is closed. As each plunger 20 extends back toward the chamber 24, moved via operation of the crankshaft and the respective connecting rod of the power end assembly 16, pressurized fluid is discharged from the fluid end assembly 12 via the discharge port 28 in the fluid end housing 18 while the discharge valve 32 is open and the intake valve 30 is closed. The intake valve 30 and discharge valve 32 may be one-way valves or check valves, allowing fluid to flow only in a single direction, either into the fluid end housing 18 via the intake valve 30, or from the fluid end housing 18 via the discharge valve 32. In this example manner, the fluid end assembly 12 draws fluid into the fluid end assembly 12 at a first pressure and discharges the fluid from the fluid end assembly 12 at a higher pressure. In some pump embodiments, the fluid end assembly 12 may include multiple (e.g., two, three, four, or five) sets of intake passages, cylinders, plungers, and discharge passages to pump fluid at high pressures and/or high flow rates.

Figure 2:
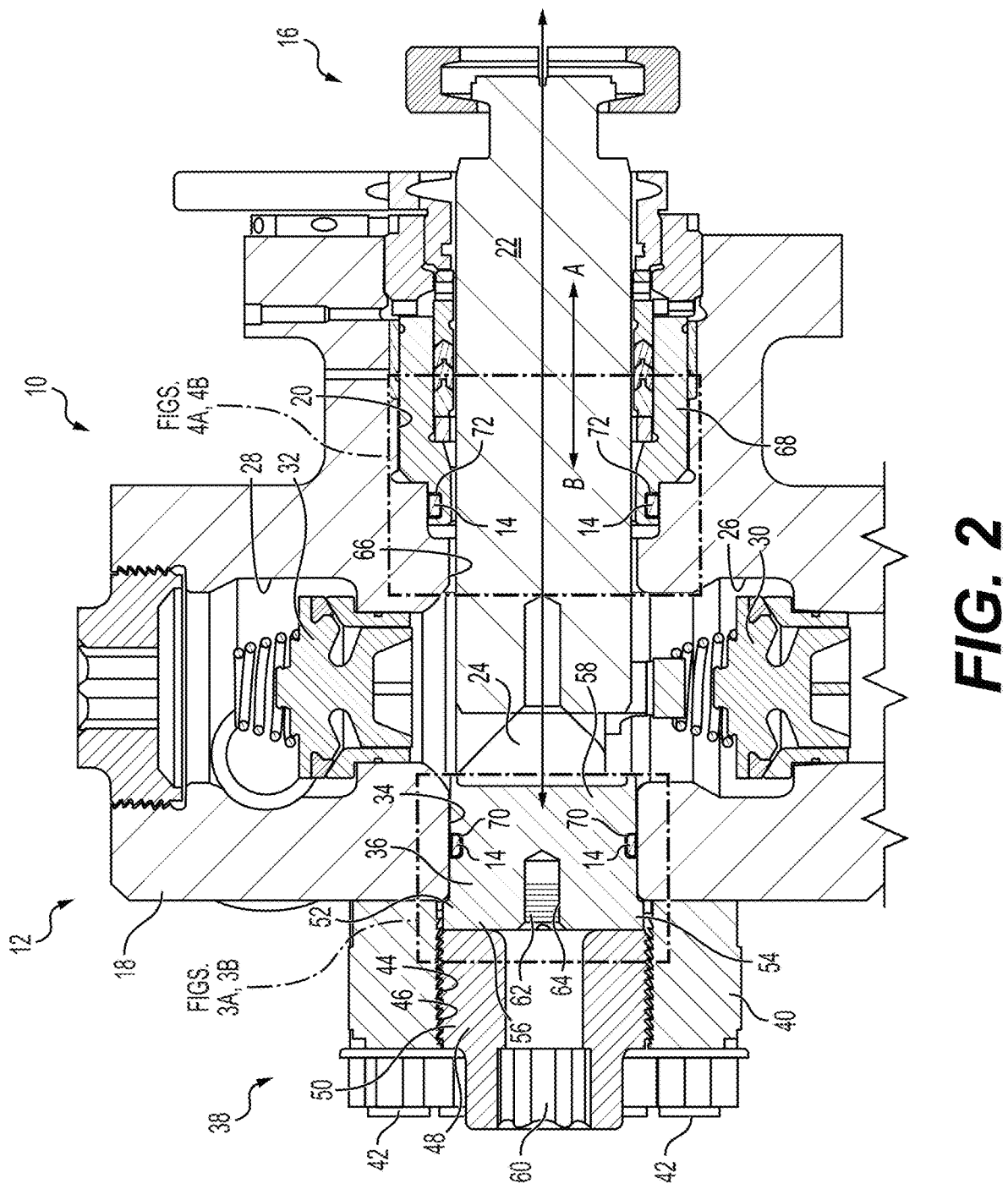
FIG. 2 is a schematic side section view of the example high-power pump shown in FIG. 1, according to embodiments of the disclosure.

FIG. 2 is a schematic side section view of the example pump 10 shown in FIG. 1, according to embodiments of the disclosure. As shown in FIGS. 1 and 2, in some embodiments, the fluid end assembly 12 may include an access port 34 providing access to the chamber 24, for example, for use during assembly and/or maintenance of the fluid end assembly 12. The access port 34 may be selectively closed via a cover 36 received in the access port 34. In some embodiments, the access port 34 may be defined in the fluid end housing 18 by a circular aperture having an interior face having a substantially cylindrical configuration, for example, as shown in FIGS. 1 and 2. In some embodiments, the cover 36 may have a substantially circular cross-section and may have a substantially cylindrical configuration sized and shaped to fit within the interior face of the access port 34, for example, as shown in FIGS. 1 and 2. In some embodiments, the cover 36 may be sized and shaped to fit snugly within the access port 34. In some embodiments, a retainer assembly 38 may be used to secure the cover 36 within the access port 34. As shown, in some embodiments, the retainer assembly 38 may include an outer housing 40 configured to be secured to an exterior surface of the fluid end housing 18 adjacent the access port 34, for example, via one of more fasteners 42 (e.g., studs and nuts), as shown. The outer housing 40 may define a receiver aperture 44 provided with interior threads 46. The retainer assembly 38 further may include a retainer 48, which may include a substantially cylindrical body having exterior threads 50 configured to threadedly engage the interior threads of the outer housing 40. In some embodiments, the cover 36 may include a shoulder 52 and a flange 54 having an exterior end 56 opposite an interior end 58 facing the chamber 24. The shoulder 52 and flange 54 may be configured to abut the exterior surface of the fluid end housing 18 adjacent the access port 34. The retainer 48 may be threaded into the outer housing 40 and abut the exterior end of the cover 36, thereby to secure the cover 36 in the access port 34. As shown, in some embodiments, the retainer 48 may include a retainer recess 60 configured to be engaged by a tool for assisting the tightening and loosening of the retainer 48 relative to the outer housing 40 and the cover 36.

As shown in FIGS. 1 and 2, some embodiments of the cover 36 may include a cover recess 62 opening outward from the center of the exterior end 56 of the cover 36 surface and having interior threads 64. The cover recess 62 may be used to assist within removal of the cover 36, for example, to provide access to the chamber 24. For example, a tool may be used to engage the cover recess 62 and assist with pulling the cover 36 from the access port 34.

As shown in FIGS. 1 and 2, in some embodiments, the fluid end housing 18 may include a plunger port 66 and a sleeve 68 received in the plunger port 66. The plunger port 66 and the sleeve 68 may be substantially cylindrical, with the plunger port 66 having a substantially circular cross-section and the sleeve 68 having a substantially cylindrical outer surface received in the plunger port 66. The sleeve 68 may be configured to at least partially receive therein the plunger 22 as the plunger 22 reciprocates, thereby to draw fluid into the chamber 24 at a first pressure via the suction port 26 during movement of the plunger 22 in a first direction A and discharge the fluid from the chamber 24 at a second pressure greater than the first pressure via the discharge port 28 during movement of the plunger 22 in a second direction B, for example, as shown in FIG. 2.

Figure 3A:
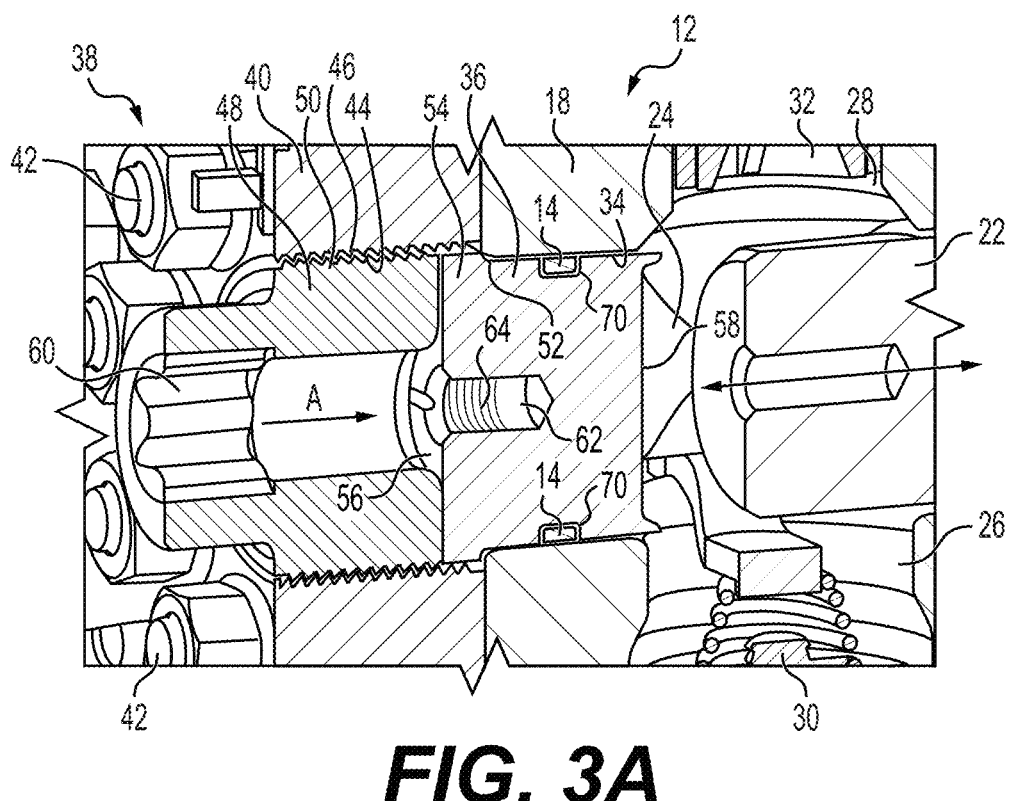
FIG. 3A is a schematic perspective view showing one of the example seals and example components shown in FIG. 1, according to embodiments of the disclosure.
Figure 3B:
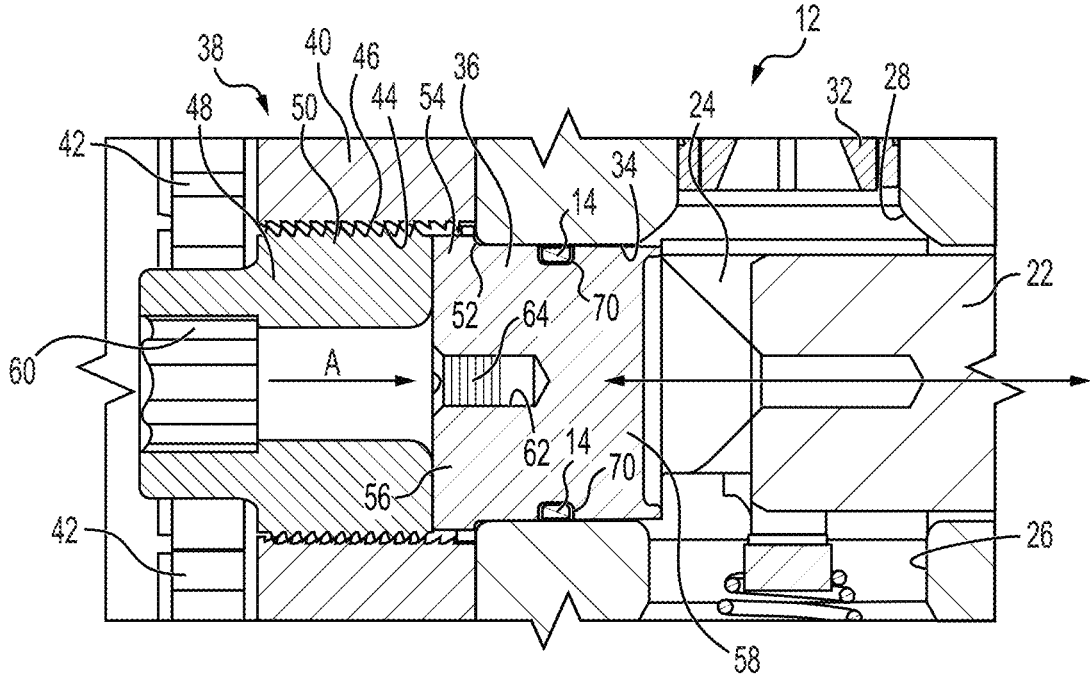
FIG. 3B is a schematic side section view of the example seals and example components shown in FIG. 3A, according to embodiments of the disclosure.

FIG. 3A is a schematic perspective view showing an example seal 14 and example components shown in FIG. 1, according to embodiments of the disclosure. FIG. 3B is a schematic side section view of the example seal 14 and example components shown in FIG. 3A, according to embodiments of the disclosure. As shown in FIGS. 3A and 3B, the example seal 14 may be provided between the interior surface of a first component (e.g., the access port 34) and an exterior surface of a second component (e.g., the cover 36), thereby to provide a fluid seal between the first and second components, for example, the access port 34 and the cover 36, when the cover 36 is placed in the access port 34. For example, as shown, the cover 36 may include on the outer cylindrical surface thereof an annular groove 70, and the seal 14 may be at least partially received in the groove 70. In some embodiments, the groove 70 may be provided in the interior surface of the access port 34 (e.g., an inner cylindrical surface), and the seal 14 may be at least partially received in the groove 70 in the interior surface of the access port 34 (see, e.g., FIG. 6C).

Figures 4A, 4B:
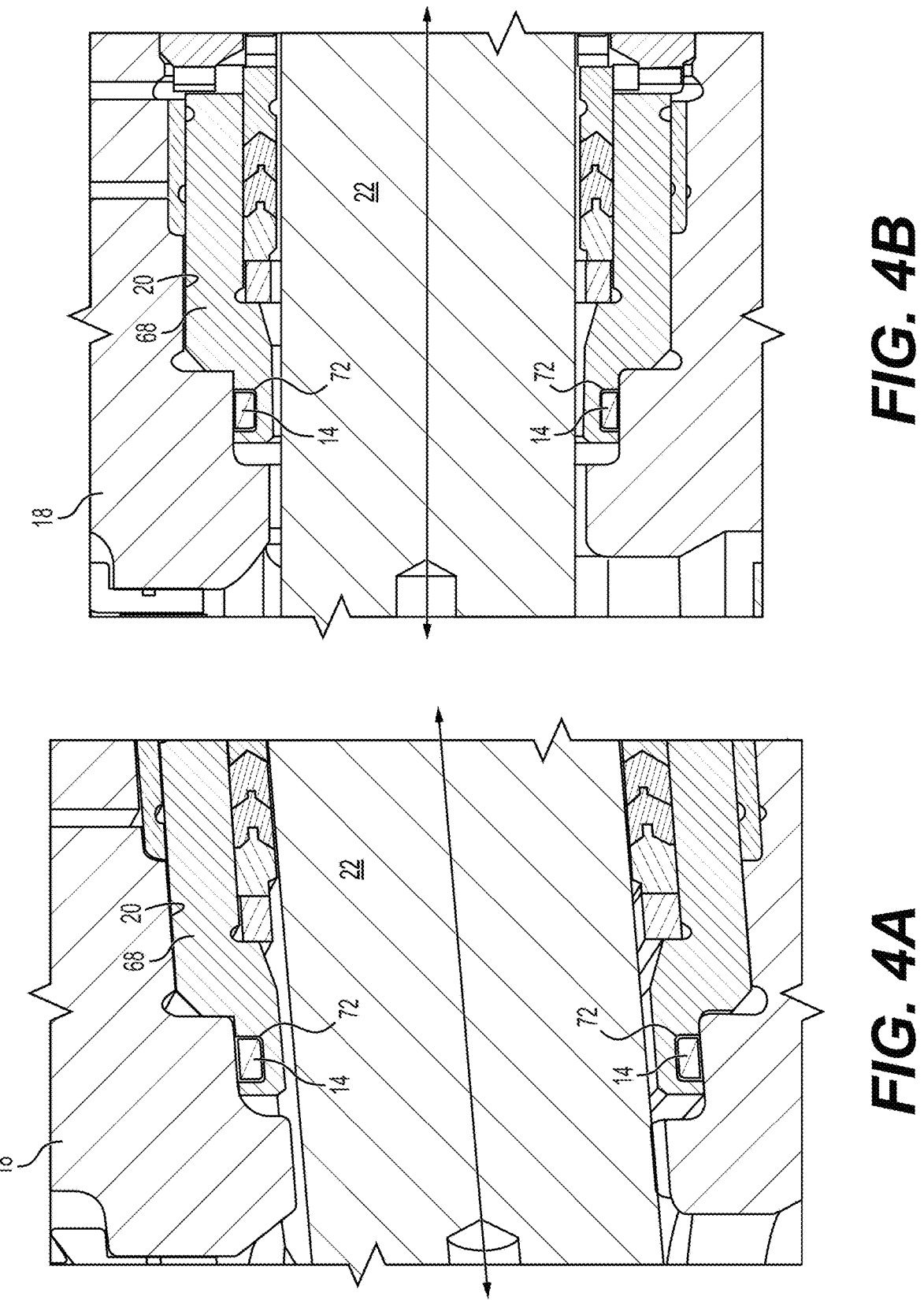
FIG. 4A is a schematic perspective view showing another one of the example seals and example components shown in FIG. 1, according to embodiments of the disclosure.
FIG. 4B is a schematic side section view of the example seals and example components shown in FIG. 4A, according to embodiments of the disclosure.

FIG. 4A is a schematic perspective view showing an example seal 14 and example components shown in FIG. 1, according to embodiments of the disclosure. FIG. 4B is a schematic side section view of the example seal 14 and example components shown in FIG. 4A, according to embodiments of the disclosure. As shown in FIGS. 4A and 4B, the example seal 14 may be provided between the interior surface of a first component (e.g., the plunger port 66) and an exterior surface of a second component (e.g., the sleeve 68), thereby to provide a fluid seal between the first and second components, for example, the plunger port 66 and the sleeve 68, when the sleeve 68 is placed in the plunger port 66. For example, as shown, the sleeve 68 may include on the outer cylindrical surface thereof an annular groove 72, and the seal 14 may be at least partially received in the groove 72. In some embodiments, the groove 72 may be provided in the interior surface of the plunger port 66 (e.g., an inner cylindrical surface), and the seal 14 may be at least partially received in the groove 72 in the interior surface of the plunger port 66 (see, e.g., FIG. 6C).

In some embodiments, the groove 70 and/or the groove 72 may be provided in the cover, in the sleeve, and/or in the port, for example, to help anchor the seal 14 relative to the corresponding cover 36 or the corresponding sleeve 68, and the seal 14 may be at least partially received in the corresponding groove. Some types of pumps, as noted above, may experience relatively large fluctuations in pressure, which may cause the seal 14 to deflect or compress in the groove during the pressure fluctuations. Applicant has recognized that this may result in causing the seal 14 and/or the corresponding groove to degrade relatively more quickly, for example, as fluid pumped during operation of the pump may migrate into the groove between the deflected or compressed seal and the corresponding groove. The wear may be particularly pronounced, for example, depending on the contents of the fluid. For example, abrasive particles and/or corrosive fluids may accelerate the wear of the seal and/or the groove, potentially leading to shortened service lives of the seal and one or more of the components, as well as increased downtime, reducing the efficiency of operations using the pump.

In some embodiments, the systems, assemblies, apparatuses, and methods presented herein may provide a relatively enhanced fluid seal between pump components, such as seals and adjacent components, which may result in relatively reduced damage, deformation, wear, and/or leakage during operation of high-power pumps including the seals and components. For example, in some embodiments, seals and associated components may be configured to reduce or prevent damage, deformation, wear, and/or leakage of the seals and associated components during operation of a high-power pump.

Figure 5A:
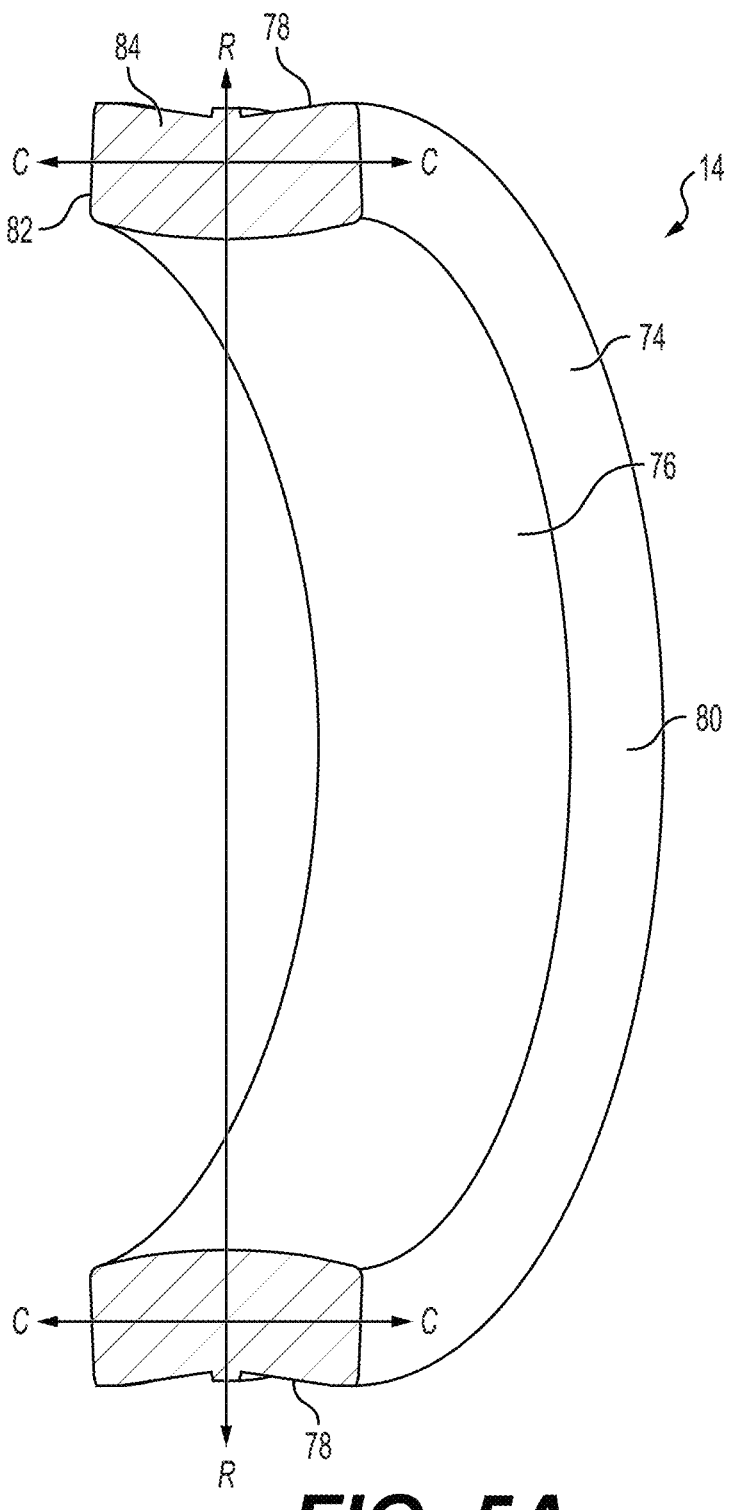
FIG. 5A is a schematic perspective section view of an example seal, according to embodiments of the disclosure.
Figure 5B:
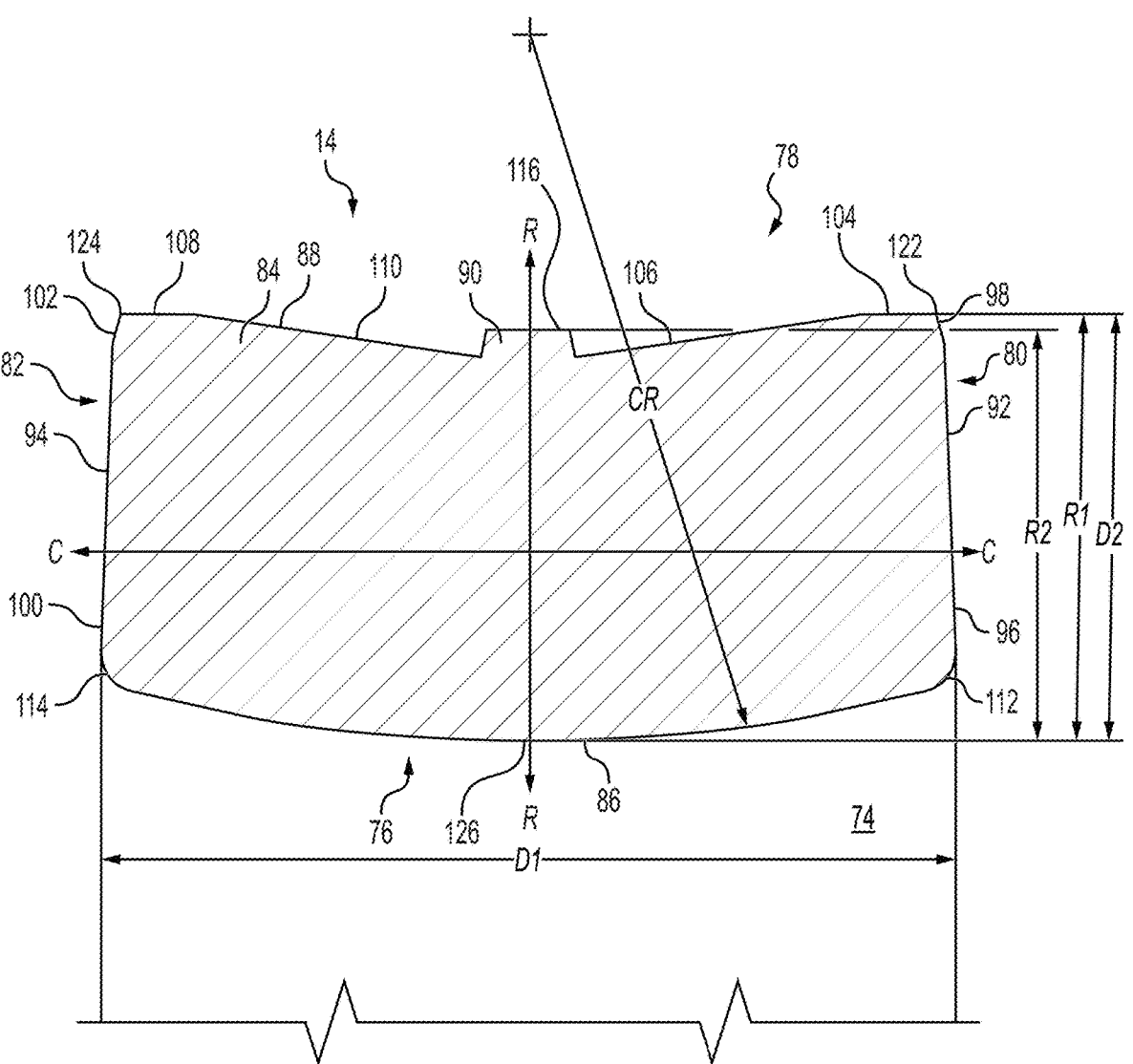
FIG. 5B is a schematic section view of the example seal shown in FIG. 5A, according to embodiments of the disclosure.

FIG. 5A is a schematic perspective section view of an example seal 14, according to embodiments of the disclosure. FIG. 5B is a schematic section view of the example seal 14 shown in FIG. 5A. FIG. 5C is a schematic section view of the example seal 14 shown in FIG. 5A. FIG. 5D is a schematic detailed section view of a portion of the example seal 14 shown in FIG. 5A, and FIG. 5E is a schematic detailed section view of another portion of the example seal 14 shown in FIG. 5A, according to embodiments of the disclosure.

As shown in FIGS. 5A and 5B, in some embodiments, the seal 14 may include an annular seal body 74. The annular seal body 74 may be formed from (or include) any compressible, resilient, and/or elastomeric materials, such as, for example, synthetic rubber, natural rubber, thermosetting polymers, and/or thermoplastic polymers, including, but not limited to: butadiene rubber (BR), butyl rubber (IIR), chlorosulfonated polyethylene (CSM), epichlorohydrin (ECH), ethylene propylene diene monomer (EPDM), ethylene propylene rubber (EPR), fluoroelastomer (FKM), nitrile rubber (NBR), perfluoroelastomer (FFKM), polyacrylate rubber (ACM), polychloroprene (neoprene), polyisoprene (IR), polysulfide rubber (PSR), polytetrafluoroethylene (PTFE), sanifluor (FEPM), silicone rubber (SiR), styrene-butadiene rubber (SBR), thermoplastic elastomer (TPE) styrenics, thermoplastic polyolefin (TPO), thermoplastic polyurethane (TPU), thermoplastic etheresterelastomer (TEEE) copolyester, thermoplastic polyamide (PEBA), melt-processible rubber (MPR), and/or thermoplastic vulcanizate (TPV).

In some embodiments, the annular seal body 74 may have a groove face 76 positioned to face a groove of one of two components between which a fluid seal is to be provided. For example, as described above, the cover 36 may include an annular groove 70 and/or the sleeve 68 may include an annular groove 72, and the seal 14 may be configured to be at least partially received in the annular groove 70 or the annular groove 72, for example, with the groove face 76 facing the bottom of the corresponding annular groove. In some embodiments, the access port 34 may include the annular groove 70 and/or the plunger port 66 may include the annular groove 72, and the groove face 76 may face the bottom of the corresponding annular groove (see, e.g., FIG. 6C).

As shown in FIGS. 5A and 5B, the seal body 74 further may have a sealing face 78 opposite the groove face 76 and positioned to face away from the groove face 76. In some embodiments, the sealing face 78 may be configured to press against the component of the two components between which the fluid seal is to be provided. For example, if the annular groove 70 is in the cover 36, the sealing face 78 may be configured to press against the interior surface of the access port 34. If the annular groove 70 is in the interior surface of the access port 34, the sealing face 78 may be configured to press against the outer surface of the cover 36. If the annular groove 72 is in the sleeve 68, the sealing face 78 may be configured to press against the interior surface of the plunger port 66. If the annular groove 72 is in the interior surface of the plunger port 66, the sealing face 78 may be configured to press against the outer surface of the sleeve 68.

As shown in FIGS. 5A and 5B, in some embodiments, the seal body 74 further may have a first lateral face 80 extending between the groove face 76 and the sealing face 78, and a second lateral face 82 opposite the first lateral face 80 and extending between the groove face 76 and the sealing face 78. The first lateral face 76 and the second lateral face 78 may be configured to press laterally outward against walls (e.g., side walls) of the annular groove 70 or the annular groove 72, for example, as described herein.

The seal body 74 may have a seal cross-section 84 (see, e.g., FIG. 5B) at least partially defined by the groove face 76, the sealing face 78, the first lateral face 80, and the second lateral face 82. The seal cross-section 84 may be a cross-section of the seal 14 viewed substantially perpendicular to a radial plane extending between the center of the seal 14

(e.g., the center of the annular seal body 74) and the radially outermost exterior surface of the seal. The radial plane may define a radial axis R, which may lie within the radial plane.

As shown in FIGS. 5A and 5B, the seal cross-section 84 may have a groove edge 86 at least partially defined by the groove face 76. In some embodiments, the groove edge 86 may be at least partially convex, for example, as shown. The seal cross-section 84 further may include a sealing edge 88 at least partially defined by the sealing face 78. The sealing edge 88 may be at least partially concave and may have, in some embodiments, a protrusion 90 between the first lateral face 80 and the second lateral face 82, for example, as shown in FIGS. 5A and 5B. The seal cross-section 84 further may have a first lateral edge 92 at least partially defined by the first lateral face 80, and a second lateral edge 94 at least partially defined by the second lateral face 82. As described herein, in some embodiments, the first lateral edge 92 and the second lateral edge 94 may include at least portions that are oblique with respect to one another, for example, as shown in FIGS. 5C and 5E.

As described herein, in some embodiments, the groove face 76, the sealing face 78, the first lateral face 80, and/or the second lateral face 82 may be positioned or configured to cause the seal 14 to deform in the annular groove 70 or the annular groove 72 of one of the two components when the other of the two components presses against the protrusion 90 in a direction toward the groove face 76, thereby to expand the seal body 74 laterally outward from the first lateral face 80 and the second lateral face 82, thereby to enhance the fluid seal between the first component and the second component.

As shown in in FIGS. 5C, 5D, and 5E, in some embodiments, the seal cross-section 84 may at least partially define the radial axis R extending between the groove edge 86 and the sealing edge 88 and a circumferential axis C extending between the first lateral edge 92 and the second lateral edge 94. In some embodiments, the circumferential axis C may be at least partially defined as an axis lying in a circumferential plane perpendicular to the radial axis R and extending through the seal cross-section 84, for example, at a radial center of the seal cross-section 84. Thus, in some embodiments, the radial axis R and the circumferential axis C may be substantially perpendicular relative to one another.

In some embodiments, the first lateral edge 92 and/or the second lateral edge 94 may extend obliquely with respect to the radial axis R, for example, such that the first lateral edge 92 and the second lateral edge 94 are closer to one another at the groove edge 86 than at the sealing edge 88, for example, as shown in FIGS. 5B and 5C. In some embodiments, the seal cross-section 84 may have bilateral symmetry with respect to the radial axis R, for example, as shown in FIGS. 5B and 5C.

As shown in FIG. 5B, the groove edge 86 may at least partially define a convex radius CR between the first lateral edge 92 and the second lateral edge 94. In some embodiments, the groove edge 86 may at least partially define a substantially continuous radius between the first lateral edge 92 and the second lateral edge 94. The groove edge 86 may at least partially define a substantially constant radius between the first lateral edge 92 and the second lateral edge 94.

As shown in FIGS. 5B and 5E, in some embodiments, the first lateral edge 92 may at least partially define a groove end portion 96 adjacent the groove edge 86, and a sealing end portion 98 adjacent the sealing edge 88. The groove end portion 96 and the sealing end portion 98 may be non-colinear, for example, as shown in FIGS. 5B and 5E. In some embodiments, the groove end portion 96 and the sealing end portion 98 may extend obliquely with respect to the radial axis R.

In some embodiments, the groove end portion 96 may extend in a first direction forming a first angle A1 with the radial axis R, and the sealing end portion 98 may extend in a second direction forming a second angle A2 with the radial axis R, with the second angle A2 being different than the first angle A1. For example, the first angle A1 may be less than the second angle A2, for example, as shown in FIG. 5E. For example, the first angle A1 may range from about 1 degree to about 10 degrees, and the second angle A2 may range from about 5 degrees to about 25 degrees.

In some embodiments, as shown in FIG. 5B, the second lateral edge 94 may at least partially define a groove end portion 100 adjacent the groove edge 86, and a sealing end portion 102 adjacent the sealing edge 88. The groove end portion 100 and the sealing end portion 102 may be non-colinear, for example, as shown in FIGS. 5B and 5C. In some embodiments, the groove end portion 100 and the sealing end portion 102 may extend obliquely with respect to the radial axis R.

In some embodiments, as shown in FIG. 5C, the groove end portion 100 may extend in a third direction forming a third angle A3 with the radial axis R, and the sealing end portion 102 may extend in a fourth direction forming a fourth angle A4 with the radial axis R, with the fourth angle A4 being different than the third angle A3. For example, the third angle A3 may be less than the fourth angle A4, for example, as shown in FIG. 5C. For example, the third angle A3 may range from about 1 degree to about 10 degrees, and the fourth angle A4 may range from about 5 degrees to about 25 degrees.

As shown in FIGS. 5C and 5E, in some embodiments, the sealing edge 88 may at least partially define a first lateral sealing edge portion 104 adjacent the first lateral edge 92, and a first intermediate sealing edge portion 106 adjacent the protrusion 90. The first lateral sealing edge portion 102 and the first intermediate sealing edge portion 106 may be non-colinear. In some embodiments, the first lateral sealing edge portion 104 may be substantially parallel to the circumferential axis C, for example, as shown in FIG. 5C. The first intermediate sealing edge portion 106 may form a fifth angle A5 ranging from about 1 degree to about 20 degrees with respect to the circumferential axis C, for example, as shown in FIG. 5C.

As shown in FIG. 5C, in some embodiments, the sealing edge 88 may at least partially define a second lateral sealing edge portion 108 adjacent the second lateral edge 94, and a second intermediate sealing edge portion 110 adjacent the protrusion 90. The second lateral sealing edge portion 108 and the second intermediate sealing edge portion 110 may be non-colinear. In some embodiments, the second lateral sealing edge portion 108 may be substantially parallel to the circumferential axis C, for example, as shown in FIG. 5C. The second intermediate sealing edge portion 110 may form a sixth angle A6 ranging from about 1 degree to about 20 degrees with respect to the circumferential axis C, for example, as shown in FIG. 5C. In some embodiments, the sealing edge 88 may include a first sealing edge segment extending between the first lateral edge 92 and the protrusion 90, and a second sealing edge segment extending between the second lateral edge 94 and the protrusion 90, for example, as shown in FIG. 5C. The first sealing edge segment may include one or more of the first lateral sealing edge portion 104 or the first intermediate sealing edge portion 106, and the second sealing edge segment may include one or more of the second lateral sealing edge portion 108 or the second intermediate sealing edge portion 110.

As shown in FIG. 5B, in some embodiments, the seal cross-section 84 may have a first rounded transition 112 between the groove edge 86 and the first lateral edge 92, and a second rounded transition 114 between the groove edge 86 and the second lateral edge 94. The first rounded transition 112 may have a first transition radius, and the second rounded transition 114 may have a second transition radius. The groove edge 86 may at least partially define a convex radius CR between the first lateral edge 92 and the second lateral edge 94, and the convex radius CR may be greater than one or more of the first transition radius or the second transition radius, for example, as shown in FIG. 5B. In some embodiments, the first transition radius may be substantially equal to the second transition radius. As shown in FIGS. 5B and 5C, the protrusion 90 may be substantially equidistant from the first lateral edge 92 and the second lateral edge 94.

In some embodiments, the protrusion 90 may extend away from the first intermediate sealing edge portion 106 and/or the second intermediate sealing edge portion 110. For example, as shown in FIG. 5D, the protrusion 90 may include a protrusion apex 116 remote from the first intermediate sealing edge portion 106 and/or the second intermediate sealing edge portion 110. The protrusion 90 further may include a first side edge 118 adjacent the first intermediate sealing edge portion 106 and extending to the protrusion apex 116, and a second side edge 120 adjacent the second intermediate sealing edge portion 110 and extending to the protrusion apex 116. In some embodiments, the first side edge 118 and the second side edge 120 may be oblique with respect to one another, for example, as shown in FIGS. 5C and 5D. For example, the first side edge 118 and the second side edge 120 may form a side edge angle SE therebetween ranging from about 5 degrees to about 60 degrees. In some embodiments, the first side edge 118 and/or the second side edge 120 may be oblique with respect to the radial axis R. For example, the radial axis R and the first side edge 118 and/or the second side edge 120 may at least partially define an axis-to-side edge angle therebetween ranging from about 1 degree to about 30 degrees. As shown in FIGS. 5C and 5D, the apex 116 may be substantially flat.

As shown in FIG. 5B, in some embodiments, the first lateral edge 92 and the second lateral edge 94 may at least partially define a first cross-section dimension D1 perpendicular to the radial axis R, and the groove edge 86 and the sealing edge 88 may at least partially define a second cross-section dimension D2 parallel to the radial axis R. In some embodiments, a ratio of the first cross-section dimension D1 to the second cross-section dimension D2 may range from about 1:1 to about 3.5:1. In some embodiments, a ratio of the groove edge radius CR to the first cross-section dimension D1 may range from about 3:1 to about 1.1:1.

In some embodiments, as shown in FIG. 5B, the first lateral edge 92 and the sealing edge 88 may meet at a first sealing edge intersection 122, and the second lateral edge 94 and the sealing edge 88 may meet at a second sealing edge intersection 124. The groove edge 86 may at least partially define a groove edge apex 126, and the protrusion 90 may at least partially define the protrusion apex 116. As shown in FIG. 5C, in some embodiments, one or more of: (a) the first sealing edge intersection 122 and the groove edge apex 126, or (b) the second sealing edge intersection 124 and the groove edge apex 126 may at least partially define a first radial dimension R1. The groove edge apex 126 and the protrusion apex 116 may at least partially define a second radial dimension R2. In some embodiments, a ratio of the first radial dimension R1 to the second radial dimension R2 may range from about 1:1 to about 1.4:1.

Figures 6A, 6B:
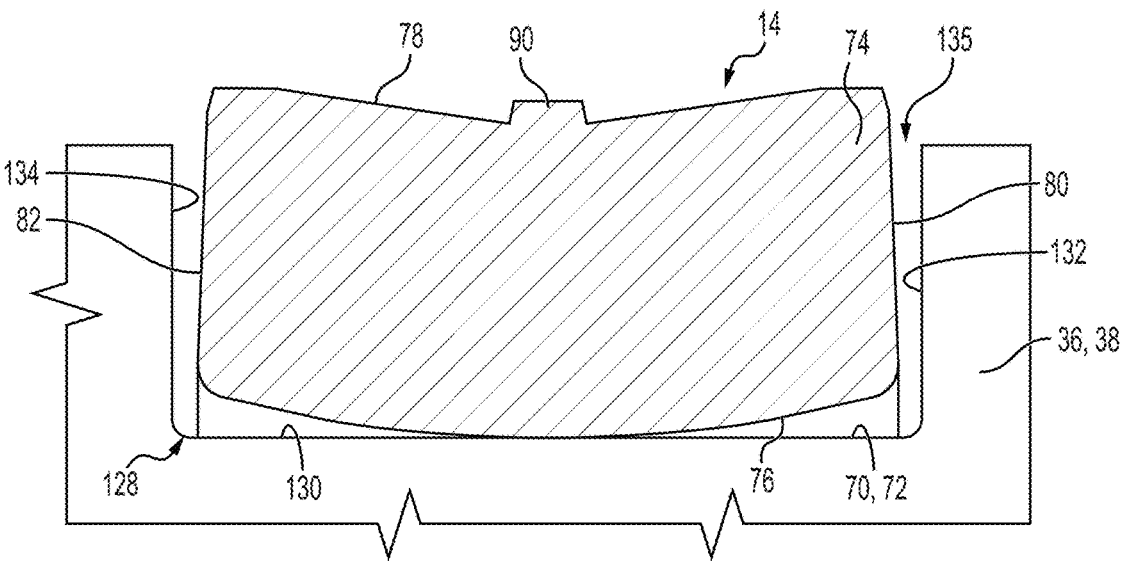
FIG. 6A is a schematic section view of the example seal shown in FIG. 5A in an uncompressed condition received in an example groove of a first example component, according to embodiments of the disclosure.
FIG. 6B is a schematic section view of the example seal shown in FIG. 5A in an example deformed and activated condition when an example second component compresses the seal received in an example groove in a substantially cylindrical outer surface of a first component, according to embodiments of the disclosure.
Figure 6C:
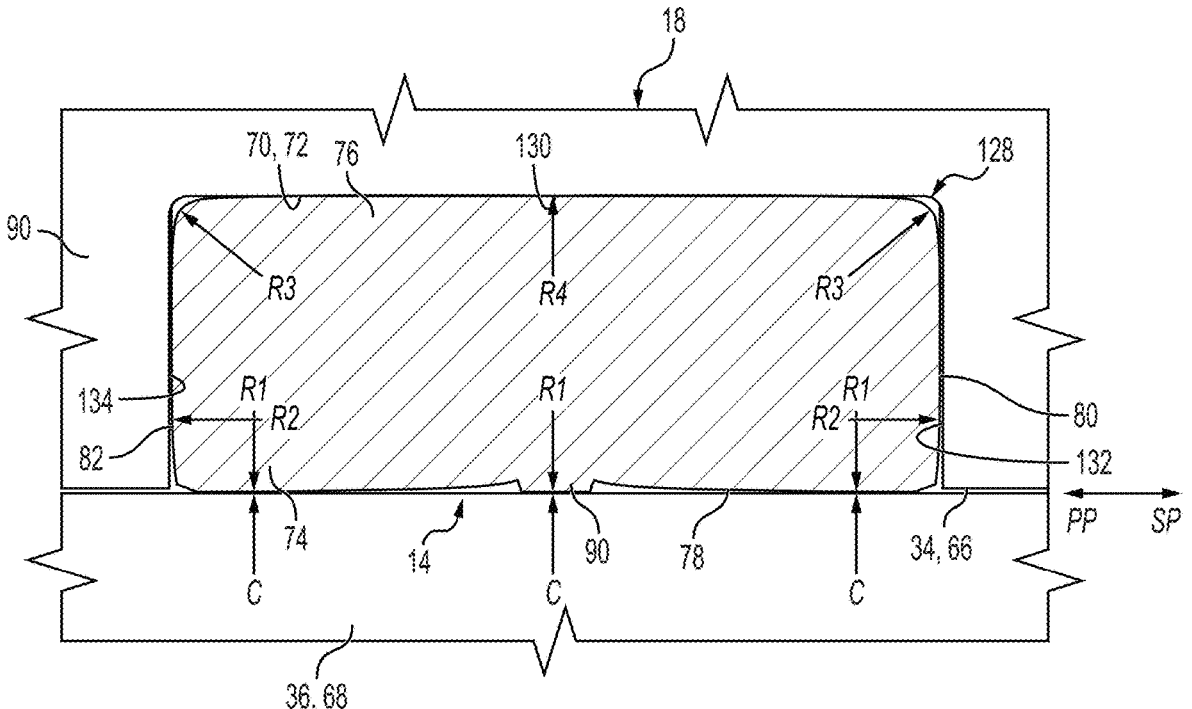
FIG. 6C is a schematic section view of the example seal shown in FIG. 5A in an example deformed and activated condition when an example second component compresses the seal received in an example groove in a substantially cylindrical inner surface of a first component, according to embodiments of the disclosure.

FIG. 6A is a schematic section view of the example seal 14 shown in FIG. 5A in an uncompressed condition received in an example groove 70 of an example first component (e.g., a cover 36 or a sleeve 68), according to embodiments of the disclosure. FIG. 6B is a schematic section view of the example seal 14 shown in FIG. 5A in a deformed and activated condition when a second example component (e.g., an access port 34 or a plunger port 66 of a fluid end housing 18) compresses the seal 14 received in the example groove 70 or 72 of the example first component (e.g., in a substantially cylindrical outer surface of the first component), according to embodiments of the disclosure. FIG. 6C is a schematic section view of the example seal 14 shown in FIG. 5A in a deformed and activated condition when a second example component (e.g., a cover 36 or a sleeve 68) compresses the seal 14 received in the example groove 70 or 72 of an example first component (e.g., in a substantially cylindrical inner surface of the first component), according to embodiments of the disclosure.

As shown in FIGS. 6A, 6B, and 6C, the grooves 70 and/or 72 may have a groove cross-section 128. In some embodiments, the groove cross-section 128 may be at least partially defined by a groove bottom 130, a first groove side wall 132, and a second groove side wall 134 opposing the first groove side wall 132, thereby forming a substantially rectangular-shaped open-topped groove cross-section 128. Groove cross-sections 128 having other shapes are contemplated, such as, for example, groove cross-sections having rounded transitions between the groove bottom 130 and groove side walls 132 and/or 134, polygonal shapes other than rectangular, non-polygonal-shaped cross-sections, semi-circular cross-sections, and the like.

As shown in FIG. 6A, in some embodiments, when the seal 14 is in an uncompressed or unactivated state, the distance between the first groove side wall 132 and the second groove side wall 134 may be greater than the first dimension D1 (see FIG. 5B) between the outermost portions of the first lateral face 80 and the second lateral face 82 of the annular seal body 74. This may create a gap between the seal 14 and one or more of the first groove side wall 132 or the second groove side wall 134, for example, prior to assembly of a second component (e.g., the fluid end housing 18) relative to a first component (e.g., a cover 36 or a sleeve 38) including the groove 70 or 72 and the seal 14 in the groove 70 or 72.

In some embodiments of the seal 14, for example, as shown in FIG. 5B, the first lateral edge 92 and the sealing edge 88 meet at the first sealing edge intersection 122, and the second lateral edge 94 and the sealing edge 88 meet at the second sealing edge intersection 124. In some such embodiments, the groove edge 86 may at least partially define the groove edge apex 126, and the protrusion 90 may at least partially define the protrusion apex 116. The first sealing edge intersection 122 and the groove edge apex 126, and/or the second sealing edge intersection 124 and the groove edge apex 126, may at least partially define the first radial dimension R1. In some embodiments, the groove edge apex 126 and the protrusion apex 116 may at least partially define a second radial dimension R2. In some embodiments, the first radial dimension R1 may be greater than the second radial dimension R2, such that as a first one of the two components (e.g., an access port 34 or a plunger port 66) compresses the seal 14 at the first sealing edge intersection 122 and the second sealing edge intersection 124, the groove edge apex 126 causes the protrusion 90 to be compressed against the first one of the two components, thereby to preload the seal 14 and enhance the fluid seal between the two components, for example, as shown in FIGS. 6B and 6C.

As shown in FIGS. 6A and 6B, in some embodiments, one or more of the groove face 76, the sealing face 78, the first lateral face 80, or the second lateral face 82 may be positioned to cause the seal 14 to deform in the annular groove of the one of the first component or the second component when the other of the first component or the second component presses against the protrusion 90 in a direction toward the groove face 76, thereby to expand the annular seal body 74 laterally outward from the first lateral face 80 and the second lateral face 82 and preload the seal 14 in the annular groove, thereby to enhance the fluid seal between the first component and the second component, for example, as shown in FIGS. 6B and 6C. In some embodiments, the seal 14 may be activated via installation of the second component relative to the first component, which includes the annular groove receiving the seal 14, for example, as the second component is moved into position relative to the first component. In some embodiments, no additional tool may be necessary to install and activate the seal 14 relative to the first and second components. For example, the seal 14 may be manually (e.g., via hand) placed in the annular groove, and the seal 14 may be compressed and thereby activated, for example, as shown in FIGS. 6A-6C, via the second component, as the second component is moved into an installed position relative to the first component and the seal 14.

In some embodiments, the groove edge 86 and the sealing edge 88 may at least partially define a spring (e.g., a mono-leaf spring approximating a curved cross-section, for example, as shown in FIG. 6A), such that, in an uncompressed state, as a first one of the components compresses the seal 14, the groove face 76 causes the protrusion 90 to be pressed radially outward against the first component, thereby to preload the seal 14 and enhance the fluid seal between the first component and the second component, for example, as shown in FIGS. 6B and 6C.

In some embodiments, the seal cross-section 84 may at least partially define a seal cross-sectional area, and the groove edge 86 may at least partially define a convex radius between the first lateral edge 92 and the second lateral edge 94. The seal cross-sectional area and the convex radius may be selected to: (a) cause the seal 14 to expand laterally outward against side walls of the groove when a first one of the two components compresses the seal 14; and (b) press the protrusion 90 against the first one of the components when the first one of the components compresses the seal 14, thereby to enhance the fluid seal between the first component and the second component, for example, as shown in FIGS. 6B and 6C.

For example, as schematically shown in FIGS. 6B and 6C, the groove face 76, the sealing face 78, the first lateral face 80, and/or the second lateral face 82 may be configured to cause the seal 14 to deform in the annular groove 70 of a first component, for example, a cover 36 as shown (or a sleeve 38) when a second component, for example, an inner cylindrical surface of access port 34 as shown (or a plunger port 66) of the fluid end housing 18, presses against the protrusion 90 in a direction toward the groove face 76, thereby to expand the annular seal body 74 laterally outward from the first lateral face 80 and the second lateral face 82 and preload the seal 14 in the annular groove, thereby to enhance the fluid seal between the first component and the second component.

For example, as schematically depicted in FIG. 6B, as the cover 36 is inserted into the access port 34, the cylindrical inner surface of the access port 34 presses against the sealing face 78 in a direction toward the annular groove 70 of the cover 36, for example, as depicted by arrows C. For example, due to the generally concave profile of the sealing face 78, including the protrusion 90 and the edges of the sealing face 78 adjacent the first lateral face 80 and the second lateral face 82 providing leading annual edges of the sealing face 78 relative to the inner cylindrical surface of the access port 34, the protrusion 90 and the edges of the sealing face 78 adjacent the first lateral face 80 and the second lateral face 82 are compressed and deformed to a relatively greater extent than other portions of the sealing face 78, resulting in relatively greater reactive forces pressing outward toward the inner cylindrical surface of the access port 34, for example, as depicted by the arrows R1. This example activation of the seal 14 may result in enhancing the fluid seal between the cover 36 and access port 34 by creating a relatively tighter abutment of the sealing face 78 against the inner cylindrical surface of the access port 34, thereby reducing the likelihood or preventing fluid and/or particulates being pumped by the pump 10 from passing into the interface between the sealing face 78 and the inner cylindrical surface of the access port 34.

In addition, in some embodiments, as shown in FIG. 6B, the edges of the sealing face 78 adjacent the first lateral face 80 and the second lateral face 82, compressed and deformed to a relatively greater extent than other portions of the sealing face 78, press laterally outward from the first lateral face 80 adjacent the sealing face 78 and the second lateral face 82 adjacent the sealing face 78 of the seal 14, resulting in relatively greater reactive forces pressing outward, respectively, toward the first groove side wall 132 and the second groove side wall 134, for example, as depicted by the arrows R2. This example activation of the seal 14 may result in enhancing the fluid seal between (a) the first lateral face 80 adjacent the sealing face 78 and the first groove side wall 132, and (b) between the second lateral face 82 adjacent the sealing face 78 and the second groove side wall 134, for example, by creating a relatively tighter abutment of the first and second lateral faces 80 and 82 against the respective first and second groove side walls 132 and 134, thereby reducing the likelihood or preventing fluid and/or particulates being pumped by the pump 10 from passing into the interface between the first and second lateral faces 80 and 82 and the respective first and second groove side walls 132 and 134.

In addition, in some embodiments, for example, as shown in FIG. 5C, the groove face 76 may have a relatively greater lateral dimension (e.g., in the direction of the circumferential axis C) than the sealing face 78. In some embodiments, as shown in FIG. 6B, the relatively greater lateral dimension of the groove face 78 may result in the first lateral face 80 adjacent the groove face 76 and the second lateral face 82 adjacent the groove face 76 being compressed and deformed to a relatively greater extent, causing the first lateral face 80 adjacent the groove face 76 and the second lateral face 82 adjacent the groove face 76 to press laterally outward toward and/or into corners of the annular groove 70 between (a) the first groove side wall 132 and the groove bottom 130, and (b) the second groove side wall 134 and the groove bottom 130, for example, as depicted by the arrows R3. This example activation of the seal 14 may result in enhancing the fluid seal between (a) the first lateral face 80 adjacent the groove face 76 and the first groove side wall 132, and (b) the second lateral face 82 adjacent the groove face 76 and the second groove side wall 134, for example, by creating a relatively tighter abutment of the first and second lateral faces 80 and 82 against the respective first and second lateral groove side walls 132 and 134, thereby reducing the likelihood or preventing fluid and/or particulates being pumped by the pump 10 from passing into the interface between the first and second lateral faces 80 and 82 and the respective first and second lateral groove side walls 132 and 134.

In addition, in some embodiments, as shown in FIG. 6B, as the seal 14 is compressed and deformed into the annular groove 70 by the inner cylindrical surface of the access port 34, the convex groove face 76 of the annular seal body 74 is deformed and caused to flatten and substantially follow the profile of the groove bottom 130, thereby causing the groove face 76 of the seal 14 to press against the groove bottom 130, for example, as depicted by the arrow R4. This example activation of the seal 14 may result in enhancing the fluid seal between the seal 14 and the groove bottom 130 by creating a relatively tighter abutment of the groove face 76 against the groove bottom 130, thereby reducing the likelihood or preventing fluid and/or particulates being pumped by the pump 10 from passing into the interface between the groove face 76 and the inner the groove bottom 130.

In some embodiments, the example seal configurations may result in enhancing the fluid seal between the cover 36 (or sleeve 38) and the access port 34 (or plunger port 66), for example during operation of a pump 10 creating cyclic pressure and suction pulses. For example, as a plunger 22 of the pump 10 (see FIG. 2) moves in a first direction to increase the pressure of a fluid in the chamber 24 a high pressure pulse PP (see FIGS. 6B and 6C) forces fluid and/or particulates toward the seal 14 between the outer surface of the cover 36 and the inner surface of the access port 34, for example, as depicted by arrow PP in FIGS. 6B and 6C. In some embodiments, the seal 14 may provide enhanced resistance to the pressure pulse PP. As the plunger 22 of the pump 10 (see FIG. 2) moves in a second direction opposite the first direction a suction pulse SP (see FIGS. 6B and 6C) is created. In some embodiments, the seal 14 may provide enhanced resistance to the suction pulse SP and/or against the cyclic pressure change.

Thus, in some embodiments, the configuration of the seal 14 may result in providing a relatively enhanced fluid seal between pump components, such as the seals 14 and adjacent components, which may result in relatively reduced damage, deformation, wear, and/or leakage during operation of high-power pumps including the seals 14 and components. For example, in some embodiments, the seals 14 and associated components may be configured to reduce or prevent damage, deformation, wear, and/or leakage of the seals 14 and associated components during operation of the high-power pumps. For example, for some types of pumps that may experience relatively large fluctuations in pressure, some embodiments of the seal 14 may reduce or prevent deflection of the seal 14 during pressure fluctuations. This, in turn, may reduce the likelihood or prevent fluid, particles, and/or debris from migrating between the seal 14 and an associated groove in which the seal 14 is at least partially received and/or any related components. This may reduce wear of the seal 14 and/or the associated components, for example, even when the fluid includes caustic materials and/or abrasive particles. As a result, according to some embodiments, the seal 14 may provide relatively reduced wear rates and lengthened service lives of the seal 14 and associated components, as well as decreased downtime, increasing the efficiency of operations using the pump.

As schematically depicted in FIG. 6C, the example first component may be a fluid end housing 18 having an access port 34 or a plunger port 66 with an annular groove 70 or 72 in a substantially cylindrical inner surface of the fluid end housing 18. The example second component may be a cover 36 for closing the access port 34 received in the access port 34 or a sleeve 68 received in the plunger port 66.

In at least some embodiments consistent with FIG. 6C, as the cover 36 is inserted into the access port 34, for example, the cylindrical outer surface of the cover 36 presses against the sealing face 78 in a direction toward the annular groove 70 of the access port 34, for example, as depicted by arrows C. For example, due to the generally concave profile of the sealing face 78, including the protrusion 90 and the edges of the sealing face 78 adjacent the first lateral face 80 and the second lateral face 82 providing leading annular edges of the sealing face 78 relative to the outer cylindrical surface of the cover 36, the protrusion 90 and the edges of the sealing face 78 adjacent the first lateral face 80 and the second lateral face 82 are compressed and deformed to a relatively greater extent than other portions of the sealing face 78, resulting in relatively greater reactive forces pressing outward toward the outer cylindrical surface of the cover 36 or sleeve 68, for example, as depicted by the arrows R1. This example activation of the seal 14 may result in enhancing the fluid seal between the cover 36 and access port 34 by creating a relatively tighter abutment of the sealing face 78 against the outer cylindrical surface of the cover 36, thereby reducing the likelihood or preventing fluid and/or particulates being pumped by the pump 10 from passing into the interface between the sealing face 78 and the outer cylindrical surface of the cover 36.

In addition, in some embodiments, as shown in FIG. 6C, the edges of the sealing face 78 adjacent the first lateral face 80 and the second lateral face 82, compressed and deformed to a relatively greater extent than other portions of the sealing face 78, press laterally outward from the first lateral face 80 adjacent the sealing face 78 and the second lateral face 82 adjacent the sealing face 78 of the seal 14, resulting in relatively greater reactive forces pressing outward, respectively, toward the first groove side wall 132 and the second groove side wall 134, for example, as depicted by the arrows R2. This example activation of the seal 14 may result in enhancing the fluid seal between (a) the first lateral face 80 adjacent the sealing face 78 and the first groove side wall 132, and (b) between the second lateral face 82 adjacent the sealing face 78 and the second groove side wall 134, for example, by creating a relatively tighter abutment of the first and second lateral faces 80 and 82 against the respective first and second groove side walls 132 and 134, thereby reducing the likelihood or preventing fluid and/or particulates being pumped by the pump 10 from passing into the interface between the first and second lateral faces 80 and 82 and the respective first and second groove side walls 132 and 134.

In addition, in some embodiments, for example, as shown in FIG. 5C, the groove face 76 may have a relatively greater lateral dimension (e.g., in the direction of the circumferential axis C) than the sealing groove 78. In some embodiments, as shown in FIG. 6C, the relatively greater lateral dimension of the groove face 78 may result in the first lateral face 80 adjacent the groove face 76 and the second lateral face 82 adjacent the groove face 76 being compressed and deformed to a relatively greater extent, causing the first lateral face 80 adjacent the groove face 76 and the second lateral face 82 adjacent the groove face 76 to press laterally outward toward and/or into corners of the annular groove 70 between (a) the first groove side wall 132 and the groove bottom 130, and (b) the second groove side wall 134 and the groove bottom 130, for example, as depicted by the arrows R3. This example activation of the seal 14 may result in enhancing the fluid seal between (a) the first lateral face 80 adjacent the groove face 76 and the first groove side wall 132, and (b) the second lateral face 82 adjacent the groove face 76 and the second groove side wall 134, for example, by creating a relatively tighter abutment of the first and second lateral faces 80 and 82 against the respective first and second lateral groove side walls 132 and 134, thereby reducing the likelihood or preventing fluid and/or particulates being pumped by the pump 10 from passing into the interface between the first and second lateral faces 80 and 82 and the respective first and second lateral groove side walls 132 and 134.

In addition, in some embodiments, as shown in FIG. 6C, as the seal 14 is compressed and deformed into the annular groove 70 or 72 by the outer cylindrical surface of the cover 36 or sleeve 68, the convex groove face 76 of the annular seal body 74 may be deformed and caused to flatten and substantially follow the profile of the groove bottom 130, thereby causing the groove face 76 of the seal 14 to press against the groove bottom 130, for example, as depicted by the arrow R4. This example activation of the seal 14 may result in enhancing the fluid seal between the seal 14 and the groove bottom 130 by creating a relatively tighter abutment of the groove face 76 against the groove bottom 130, thereby reducing the likelihood or preventing fluid and/or particulates being pumped by the pump 10 from passing into the interface between the groove face 76 and the groove bottom 130.

In some embodiments, the example seal configurations may result in enhancing the fluid seal between the cover 36 (or sleeve 68) and the access port 34 (or plunger port 66), for example, during operation of the pump 10 creating cyclic pressure pulses and suction pulses. For example, as a plunger 22 of the pump 10 (see FIG. 2) moves in a first direction B to increase the pressure of a fluid in the chamber 24 a high pressure pulse PP (see FIG. 6C) forces fluid and/or particulates toward the seal 14 between the outer surface of the cover 36 and the inner surface of the access port 34, for example, as depicted by arrow PP in FIG. 6C. In some embodiments, the seal 14 may provide enhanced resistance to the pressure pulse PP. As the plunger 22 of the pump 10 (see FIG. 2) moves in a second direction A opposite the first direction B, a suction pulse SP is created. In some embodiments, the seal 14 may provide enhanced resistance to the suction pulse SP and/or against the cyclic pressure change. Thus, in some embodiments, the configuration of the seal 14 may result in providing a relatively enhanced fluid seal between pump components, such as the seals 14 and adjacent components, which may result in relatively reduced damage, deformation, wear, and/or leakage during operation of high-power pumps including the seals 14 and components. For example, in some embodiments, the seals 14 and associated components may be configured to reduce or prevent damage, deformation, wear, and/or leakage of the seals 14 and associated components during operation of the high-power pumps.

In some embodiments, a method to enhance a fluid seal between two components of the pump 10, such as, for example, between a cover and an access port or between a sleeve and a cylinder, may include inserting the 14 seal into an annular groove (e.g., an annular groove 70 or 72) of a first component of the pump 10 (e.g., a fluid end housing). The seal 14 may include a groove face 76 and a sealing face 78 opposite the groove face 76. According to some embodiments, the groove face 76, in an undeformed condition, may be substantially convex, and the sealing face 78, in the undeformed condition, may be substantially concave, for example, as shown in FIG. 6A. As shown in FIGS. 6A and 6B, the annular groove may have a groove cross-section 128 at least partially defined by a bottom 130 of the annular groove, a first side wall 132, a second side wall 134 opposite the first side wall 132, and an open portion 135 of the annular groove 70 opposite the bottom 130 and extending between the first side wall 132 and the second side wall 134. Inserting the seal 14 into the annular groove may result in at least a portion of the groove face 76 of the seal 14 contacting the bottom 130 of the annular groove and at least a portion of sealing face 78 of the seal 14 protruding beyond the open portion 135 of the annular groove, for example, as shown in FIG. 6A. The method further may include assembling a second component of the pump 10 relative to the first component of the pump 10 (e.g., a fluid end housing relative to a cover or a sleeve). The method further may include compressing, via the second component, so as to deform the seal 14 when positioned in the annular groove, thereby to cause the groove face 76 to abut and substantially fill the bottom 130 of the annular groove and extend from the first side wall 132 to the second side wall 134, so as to enhance the fluid seal between the first component and the second component, for example, as shown in FIGS. 6B and 6C.

In some embodiments of the method, assembling the two components relative to one another may include assembling the second component of the pump 10 relative to the first component of the pump 10, thereby to press the second component against the sealing face 78 in a direction toward the groove face 76, thereby to substantially flatten the sealing face 78 and preload the seal 14 in the annular groove, thereby to enhance the fluid seal between the first component and the second component. As described herein, in some embodiments, the sealing face 78 may include a protrusion 90, and assembling components may include pressing the protrusion 90 via the second component in a direction toward the groove face 76 and expanding the seal 14 laterally outward to preload the seal 14 in the annular groove, thereby to enhance the fluid seal between the first component and the second component. In some embodiments, as described herein, the first lateral face 80 and the second lateral face 82, in the undeformed condition, may extend obliquely relative to one another. In at last some such embodiments, assembling the two components may include deforming the seal 14 in the annular groove, so that the first lateral face 80 presses against and substantially conforms to the first side wall 132 of the annular groove and the second lateral face 82 presses against and substantially conforms to the second side wall 134 of the annular groove, thereby to enhance the fluid seal between the first component and the second component.

In some embodiments, inserting the seal 14 into the annular groove may include inserting the seal 14 into the annular groove in a substantially cylindrical outer surface of a first one of the two components. In at least some such embodiments, assembling the two components may include sliding a second one of the two components over the substantially cylindrical outer surface of the first one of the components and the seal 14, thereby to deform and compress the seal 14 in the annular groove, thereby activating the seal in the annular groove. In some embodiments, inserting the seal 14 into the annular groove may include inserting the seal 14 into the annular groove in a substantially cylindrical outer surface of one of (a) a cover configured to fit in a port or (b) a sleeve configured to fit into a cylinder. In some embodiments, inserting the seal 14 into the annular groove may include inserting the seal 14 into the annular groove in a substantially cylindrical inner surface of a first one of the two components, for example, as shown in FIG. 6C. In at least some such embodiments, assembling the two components may include sliding the second of the two components into the substantially cylindrical inner surface of the first component, thereby to compress and deform the annular seal in the annular groove. In some embodiments, inserting the seal 14 into the annular groove may include inserting the seal 14 into the annular groove in a substantially cylindrical inner surface of one of (a) a port configured to receive therein a cover or (b) a cylinder configured to receive therein a sleeve.

Figure 7A:
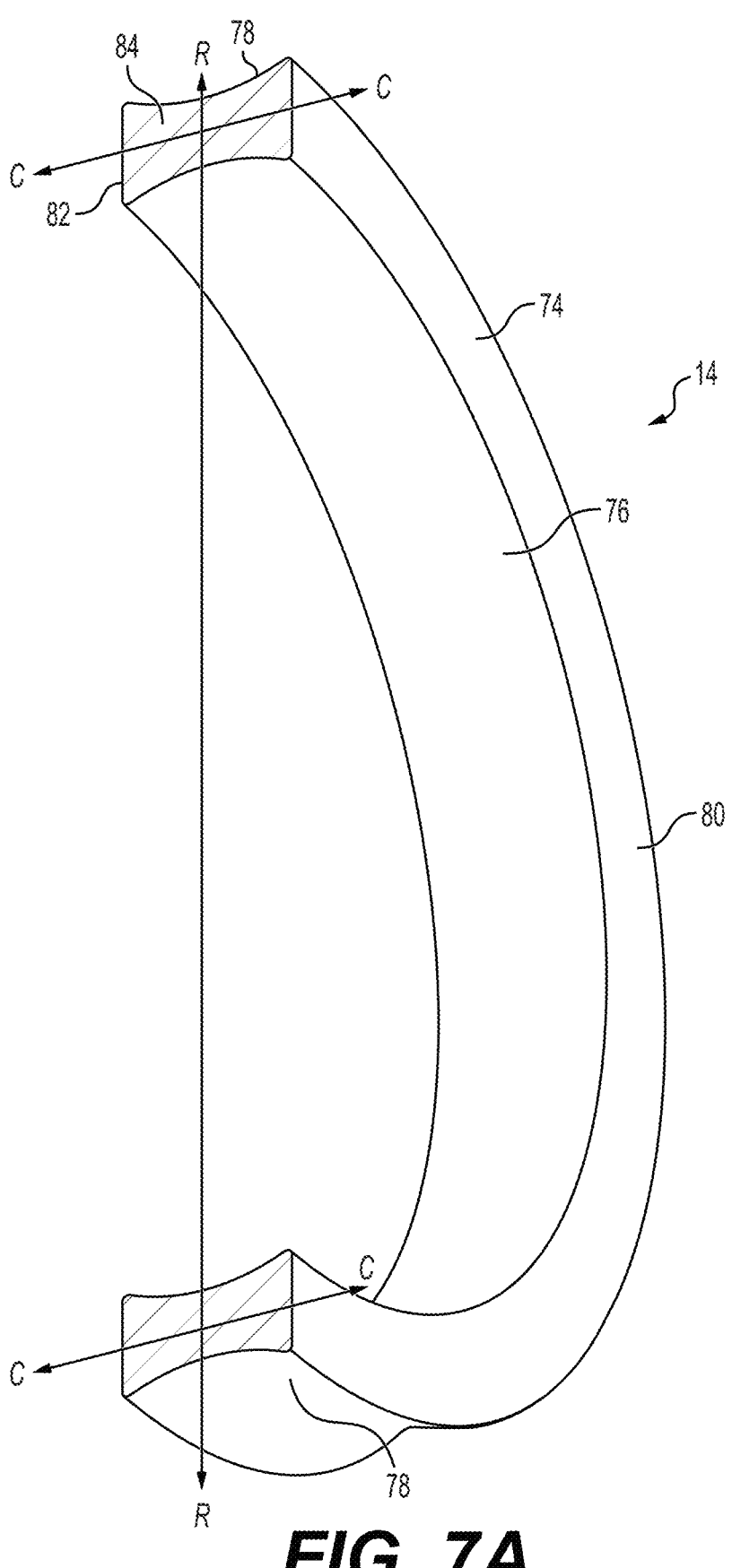
FIG. 7A is a schematic perspective section view of another example seal, according to embodiments of the disclosure.
Figure 7B:
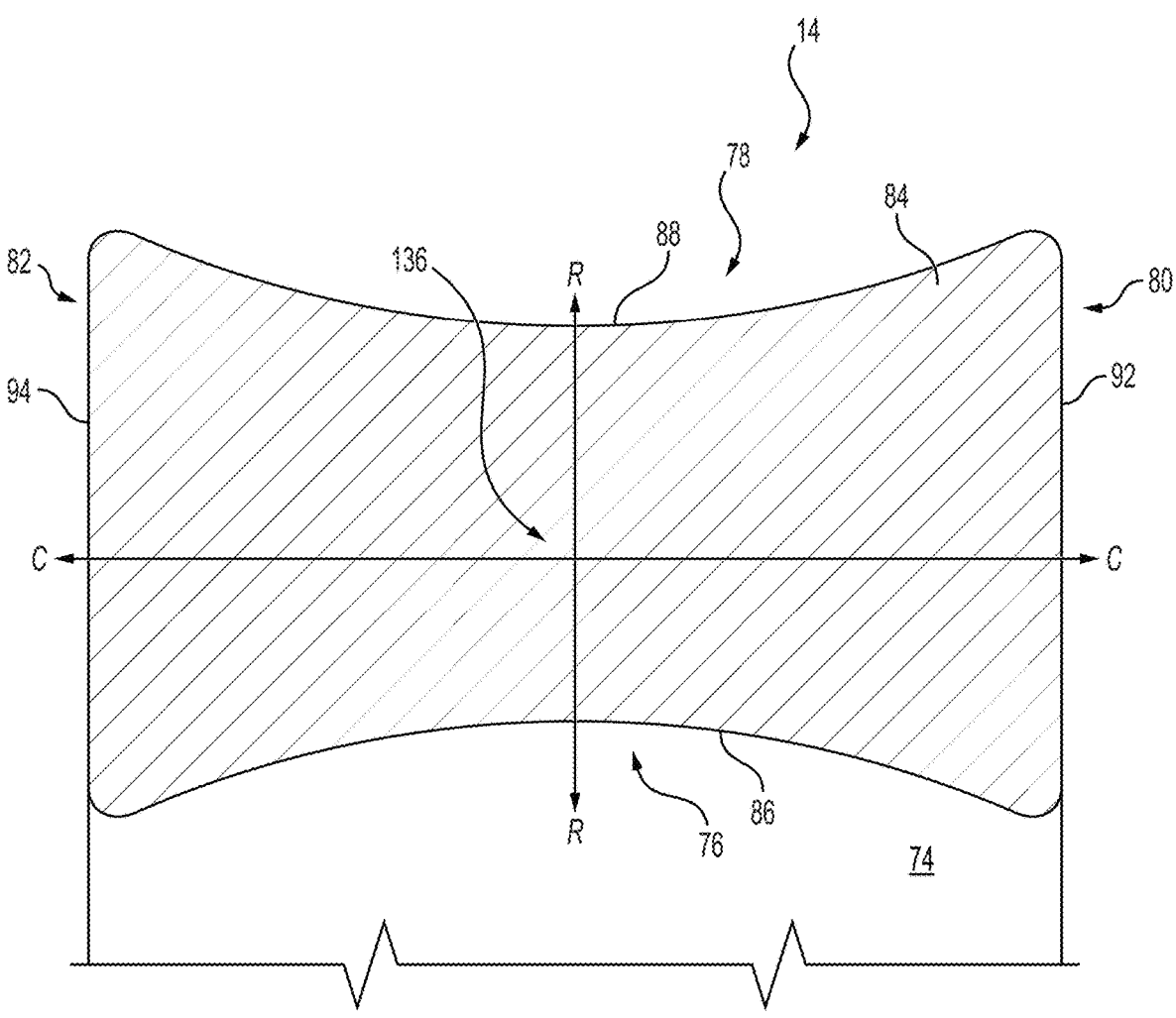
FIG. 7B is a schematic section view of the example seal shown in FIG. 7A in an uncompressed condition, according to embodiments of the disclosure.

FIG. 7A is a schematic perspective section view of another example seal 14 to enhance a fluid seal between an outer surface of a first component having a substantially circular cross-section and an inner surface of a second component, according to embodiments of the disclosure, and FIG. 7B is a schematic section view of the example seal 14 shown in FIG. 7A in an uncompressed condition. As shown in FIGS. 7A and 7B, the annular seal body 74 may have a seal cross-section 84 at least partially defined by a groove face 76, a sealing face 78, a first lateral face 80, and a second lateral face 82. As shown, in some embodiments, the seal cross-section 84 may have a groove edge 86 at least partially defined by the groove face 76, and the groove edge 86 may be at least partially concave. The seal cross-section 84 further may have a sealing edge 88 at least partially defined by the sealing face 80, and the sealing edge 88 may be at least partially concave. The seal cross-section 84 also may have a first lateral edge 92 at least partially defined by the first lateral face 80, and a second lateral edge 94 at least partially defined by the second lateral face 82. The groove edge 86 and the sealing edge 88 may form an area 136 between the first lateral edge 92 and the second lateral edge 94 having a relatively reduced thickness, for example, as compared to the thickness of the annular seal body 74 at the first and second lateral edges 92 and 94. In some embodiments, the groove face 76, the sealing face 78, the first lateral face 80, and/or the second lateral face 82 may be positioned to cause the seal 14 to deform in the groove of the first component or the second component when the other of the first component or the second component presses against the sealing face 78 in a direction toward the groove face 76, thereby to compress and deform the area 136 between the first lateral edge 92 and the second lateral edge 94 and expand the annular seal body 74 laterally outward from the first lateral face 80 and the second lateral face 82, thereby to enhance the fluid seal between the first component and the second component. In some embodiments consistent with FIGS. 7A and 7B, the area 136 may have a reduced thickness relative to other portions of the seal 14, and the area 136 may result in relatively reduced stiffness, which may facilitate a relatively increased level of compression, thereby enhancing the fluid seal between the first component and the second component.

As shown in FIGS. 7A and 7B, in some embodiments, the first lateral edge 92 and/or the second lateral edge 94 may be substantially planar. In some embodiments, the first lateral edge 92 and the second lateral edge 94 may be substantially parallel to one another. As shown, in some embodiments, the first lateral edge 92 and/or the second lateral edge 94 may be substantially parallel to the radial axis R of the seal 14. In some embodiments, the seal cross-section 84 may have bilateral symmetry relative to a radial axis R of the seal 14.

In some embodiments, for example, as shown in FIGS. 7A and 7B, the seal cross-section may have bilateral symmetry relative to the circumferential axis C of the seal 14.

Figure 8A:
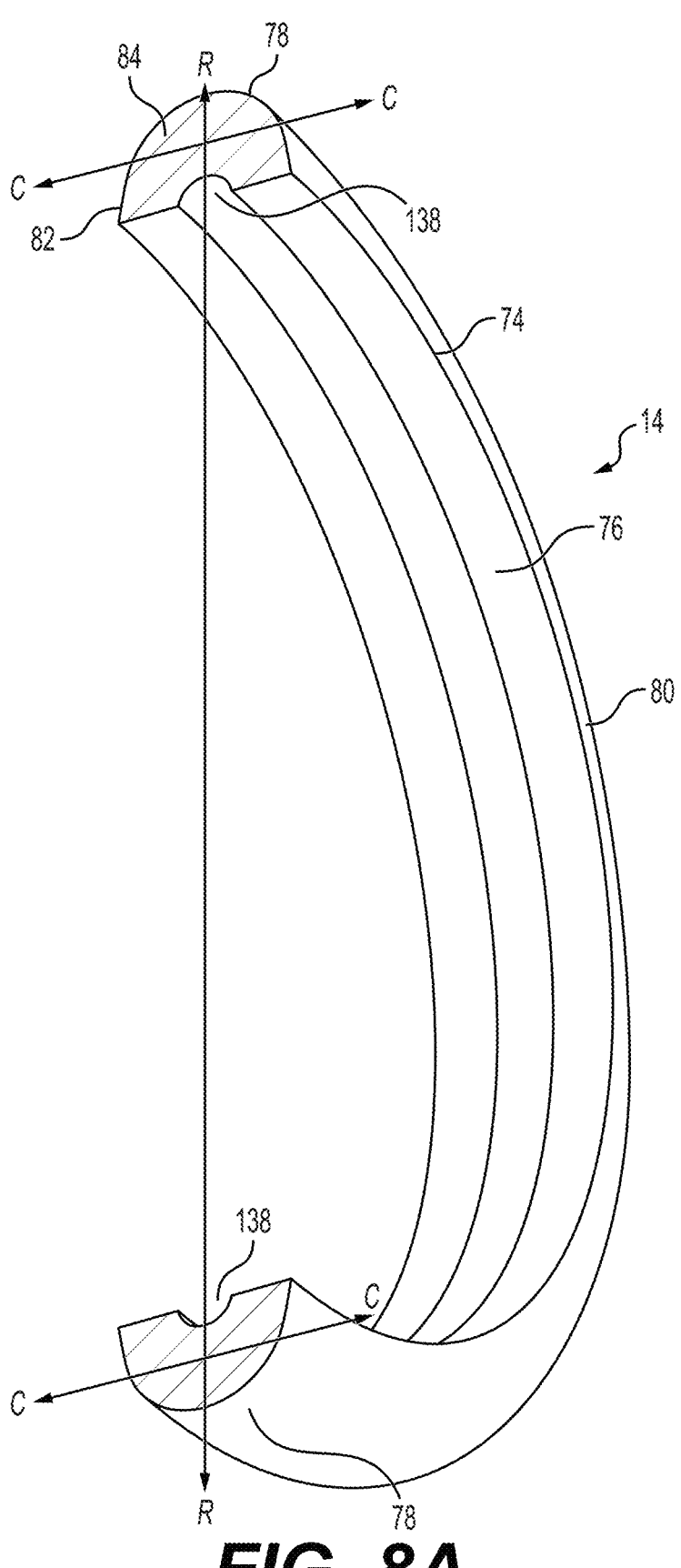
FIG. 8A is a schematic perspective section view of another example seal, according to embodiments of the disclosure.
Figure 8B:
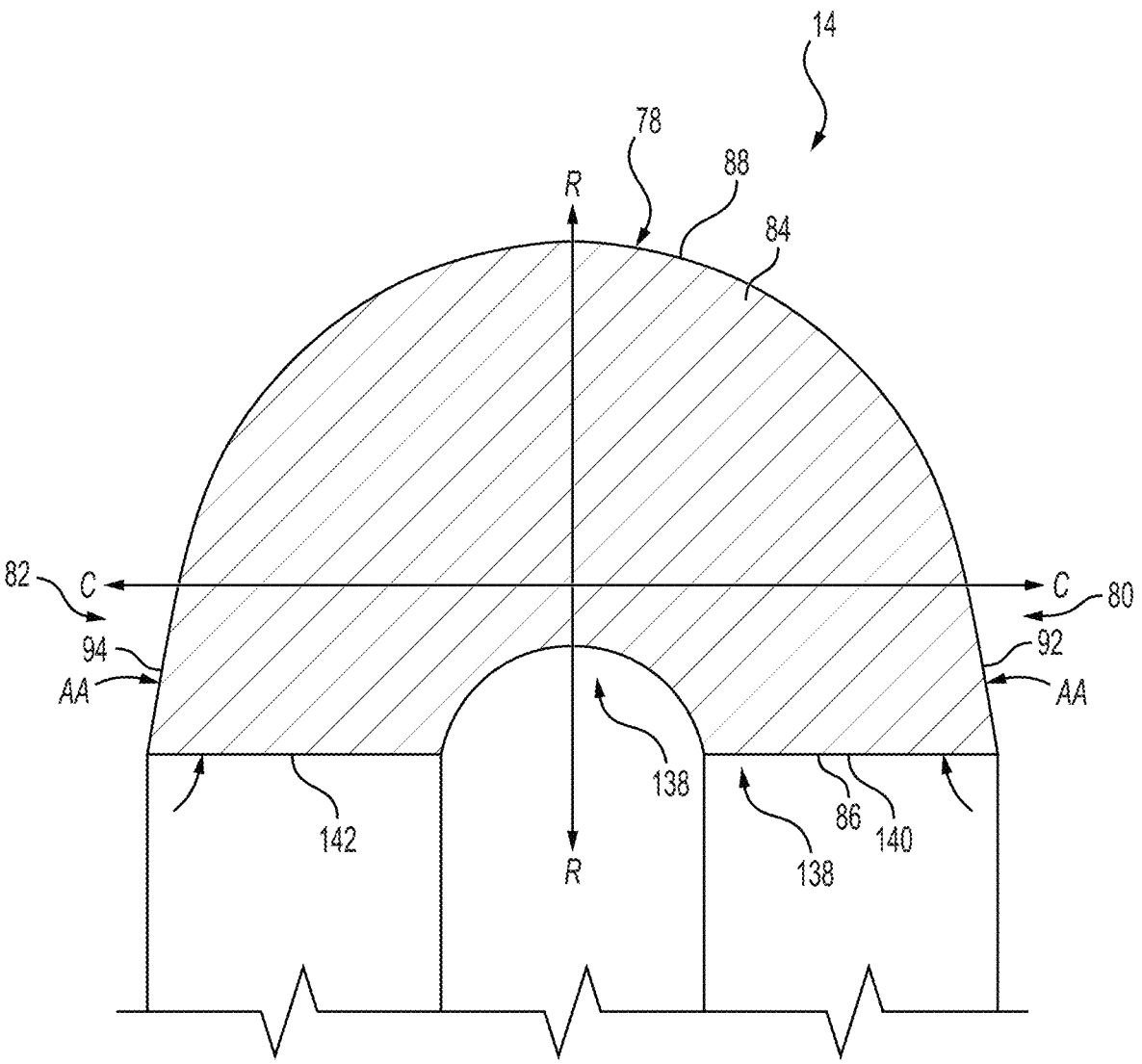
FIG. 8B is a schematic section view of the example seal shown in FIG. 8A in an uncompressed condition, according to embodiments of the disclosure.

FIG. 8A is a schematic perspective section view of another example seal 14 to enhance a fluid seal between an outer surface of a first component having a substantially circular cross-section and an inner surface of a second component, according to embodiments of the disclosure, and FIG. 8B is a schematic section view of the example seal 14 shown in FIG. 8A in an uncompressed condition. As shown in FIGS. 8A and 8B, the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and the groove edge 86 may at least partially define a groove recess 138, for example, as shown in FIGS. 8A and 8B. The seal cross-section 84 further may have a sealing edge 88 at least partially defined by the sealing face 78, and the sealing edge 88 may be at least partially convex. The seal cross-section 84 also may have a first lateral edge 92 at least partially defined by the first lateral face 80, and a second lateral edge 94 at least partially defined by the second lateral face 82. In some embodiments, as shown in FIGS. 8A and 8B, the first lateral edge 92, the sealing edge 88, and the second lateral edge 94 may at least partially define a substantially continuous arc. In some embodiments, the groove face 76, the sealing face 78, the first lateral face 80, or the second lateral face 82 may be positioned to cause the seal 14 to compress and deform in the groove of the first component or the second component when the other of the first component or the second component presses against the sealing face 78 in a direction toward the groove face 76, thereby to push an area 136 of the seal between the first lateral edge 92 and the second lateral edge 94 against the other of the first component or the second component and expand the annular seal body 74 laterally outward from the first lateral face 80 and the second lateral face 82 and press against walls of the groove, thereby to enhance the fluid seal between the first component and the second component.

In some embodiments consistent with FIGS. 8A and 8B, the groove recess 138 may render an area of the seal 14 between the first lateral face 80 and the second lateral face 82 relatively more flexible than other portions of the seal 14. This, in turn, may cause the first and second lateral faces 80 and 82 to expand laterally outward against the groove bottom 130 and/or the groove side walls 132 and 134 (see, e.g., the example annular groove 70 shown in FIGS. 6A-6C). This may result in enhancing the fluid seal between the first component and the second component.

As shown in FIGS. 8A and 8B, in some embodiments, the sealing edge 88 may be substantially semi-circular. In some embodiments, the first lateral edge 92 and/or the second lateral edge 94 may be oblique relative to the groove edge 86. In some embodiments, the first lateral edge 92 and/or the second lateral edge 94 may form an acute angle AA with the groove edge 86. As shown in FIGS. 8A and 8B, in some embodiments, the groove edge 86 may include a first groove edge segment 140 extending between the first lateral edge 92 and the groove recess 138, and/or a second groove edge segment 142 extending between the second lateral edge 94 and the groove recess 138. The first groove edge segment 140 may be substantially straight, and/or the second groove edge segment 142 may be substantially straight. In some embodiments consistent with FIGS. 8A and 8B, the seal cross-section 84 may have bilateral symmetry relative to the radial axis R of the seal 14.

Figure 9A:
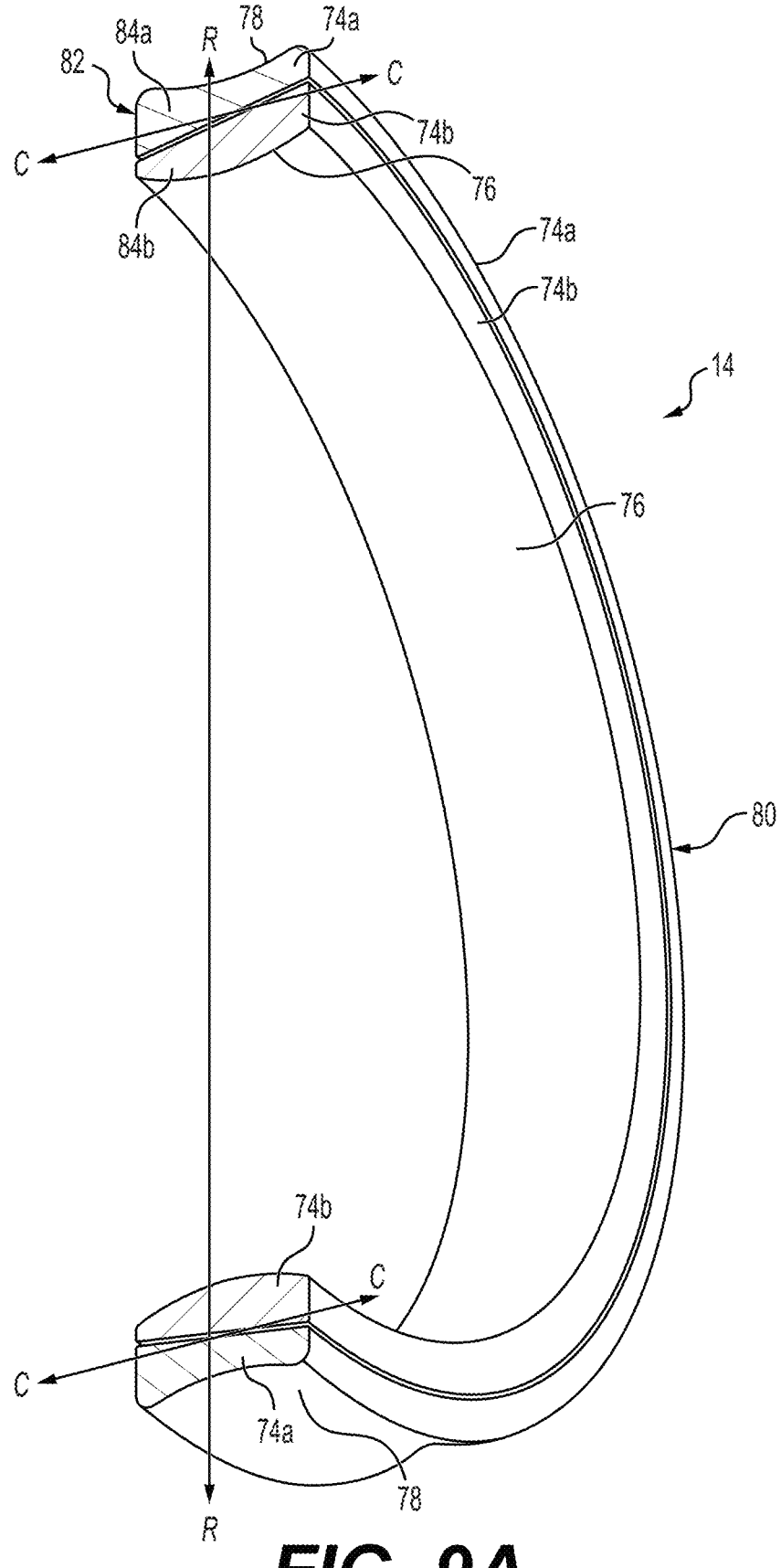
FIG. 9A is a schematic perspective section view of another example seal, according to embodiments of the disclosure.
Figure 9B:
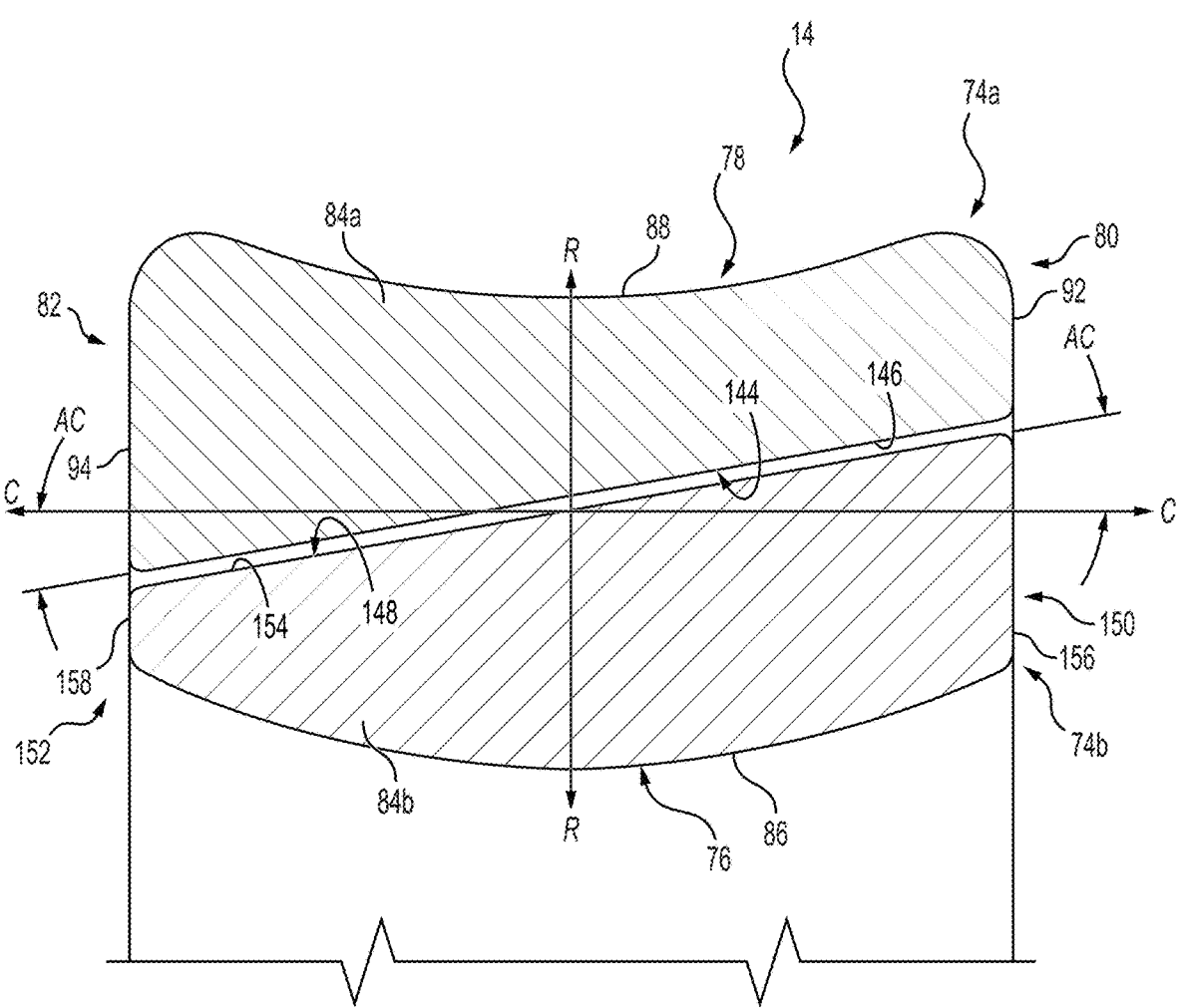
FIG. 9B is a schematic section view of the example seal shown in FIG. 9A in an uncompressed condition, according to embodiments of the disclosure.

FIG. 9A is a schematic perspective section view of another example seal 14 to enhance a fluid seal between an outer surface of a first component having a substantially circular cross-section and an inner surface of a second component, according to embodiments of the disclosure, and FIG. 9B is a schematic section view of the example seal 14 shown in FIG. 9A in an uncompressed condition. As shown in FIGS. 9A and 9B, in some embodiments, the seal 14 may include a first annular seal body 74a and a second annular seal body 74b. The first annular seal body 74a may have a first intermediate face 144 positioned to face toward a groove of the first component or the second component, and a sealing face 78 opposite the first intermediate face 144 and positioned to face away from the first intermediate face 144. The first annular seal body 74a further may have a first lateral face 80 extending between the first intermediate face 144 and the sealing face 78, and a second lateral face 82 opposite the first lateral face 80 and extending between the first intermediate face 144 and the sealing face 78. The first annular seal body 74a may have a first seal cross-section 84a at least partially defined by the first intermediate face 144, the sealing face 78, the first lateral face 80, and the second lateral face 82. The first seal cross-section 84a may have a first intermediate edge 146 at least partially defined by the first intermediate face 144, and the first intermediate edge 146 may, in at least some embodiments, be oblique with respect to the circumferential axis C of the seal 14. The first seal cross-section 84a further may have a sealing edge 88 at least partially defined by the sealing face 78, and the sealing edge 88 may be at least partially concave, for example, as shown in FIGS. 9A and 9B. The first lateral edge 92 may be at least partially defined by the first lateral face 80. The first seal cross-section 84a also may have a second lateral edge 94 at least partially defined by the second lateral face 82, and the second lateral edge 94 may be at least partially concave, for example, as shown in FIGS. 9A and 9B.

As shown in FIGS. 9A and 9B, the second annular seal body 74b may have a groove face 76 positioned to face the groove of the first component or the second component, and a second intermediate face 148 opposite the groove face 76 and positioned to face away from the groove face 76. The second intermediate face 148 may be adjacent the first intermediate face 144. The second annular seal body 74b further may have a third lateral face 150 extending between the groove face 76 and the second intermediate face 148, and the third lateral face 150 may provide an extension of the first lateral face 80 of the first annular seal body 74a. The second annular seal body 74b also may have a fourth lateral face 152 opposite the third lateral face 150 and extending between the groove face 76 and the second intermediate face 148, and the fourth lateral face 152 may provide an extension of the second lateral face 82 of the first annular seal body 74a. The second annular seal body 74b may have a second seal cross-section 84b at least partially defined by the groove face 76, the second intermediate face 148, the third lateral face 150, and the fourth lateral face 152. As shown in FIGS. 9A and 9B, the second seal cross-section 84b may have a groove edge 86 at least partially defined by the groove face 76, and a second intermediate edge 154 at least partially defined by the second intermediate face 148. The second seal cross-section 84b further may have a third lateral edge 156 at least partially defined by the third lateral face 150, and a fourth lateral edge 158 at least partially defined by the fourth lateral face 152. The first annular seal body 74a and/or the second annular seal body 74b may be positioned to cause the seal 14 to compress and deform in the groove of the first component or the second component when the other of the first component or the second component presses against the sealing face 78 of the first annular seal body 74a in a direction toward the groove face 76, thereby to expand the first annular seal body 74a and the second annular seal body 74b outward from: (a) the first lateral face 80 and the third lateral face 150, and (b) the second lateral face 82 and the fourth lateral face 152, thereby to enhance the fluid seal between the first component and the second component.

In some embodiments, as shown in FIGS. 9A and 9B, the first intermediate edge 146 and/or the second intermediate edge 154 may form an acute angle AC with the circumferential axis C of the seal 14. For example, the first intermediate edge 146 and/or the second intermediate edge 154 may form an angle AC with the circumferential axis C of the seal 14 ranging from about 15 degrees to about 75 degrees.

In at least some embodiments consistent with FIGS. 9A and 9B, the first annular seal body 74a may include (or be formed from) a first material, and the second annular seal body 74b may include (or be formed from) a second material, with the first material being different than the second material. In some embodiments, the first material may have a different hardness than the second material. In some embodiments, the first material and the second material may be substantially the same material. The first annular seal body 74a may be connected to the second annular seal body 74b at the first intermediate face 144 and the second intermediate face 148. For example, the first annular seal body 74a and the second annular seal body 74b may be co-extruded, and/or the first annular seal body 74a and the second annular seal body 74b may be adhesively secured to one another.

As shown in FIGS. 9A and 9B, in some embodiments, the groove edge 86 may be substantially convex. In some embodiments, the seal cross-section 84, for example, the combined first seal cross-section 84a and second seal cross-section 84b, may have bilateral symmetry relative to the radial axis R of the seal 14.

In some embodiments consistent with FIGS. 9A and 9B, upon compression into the groove, the first annular seal body 74a and the second annular seal body 74b may interact, for example, along the first intermediate face 144 and the second intermediate face 146, thereby causing (a) the first annular seal body 74a to deform laterally outward at the second lateral face 94 toward the second groove side wall 134 (see, e.g., example annular groove 70 shown in FIGS. 6A-6C), and (b) the first annular seal body 74b to deform laterally outward at the third lateral face 150 toward the first groove side wall 132. This example activation may result in enhancing the fluid seal between the first component and the second component.

Figure 10A:
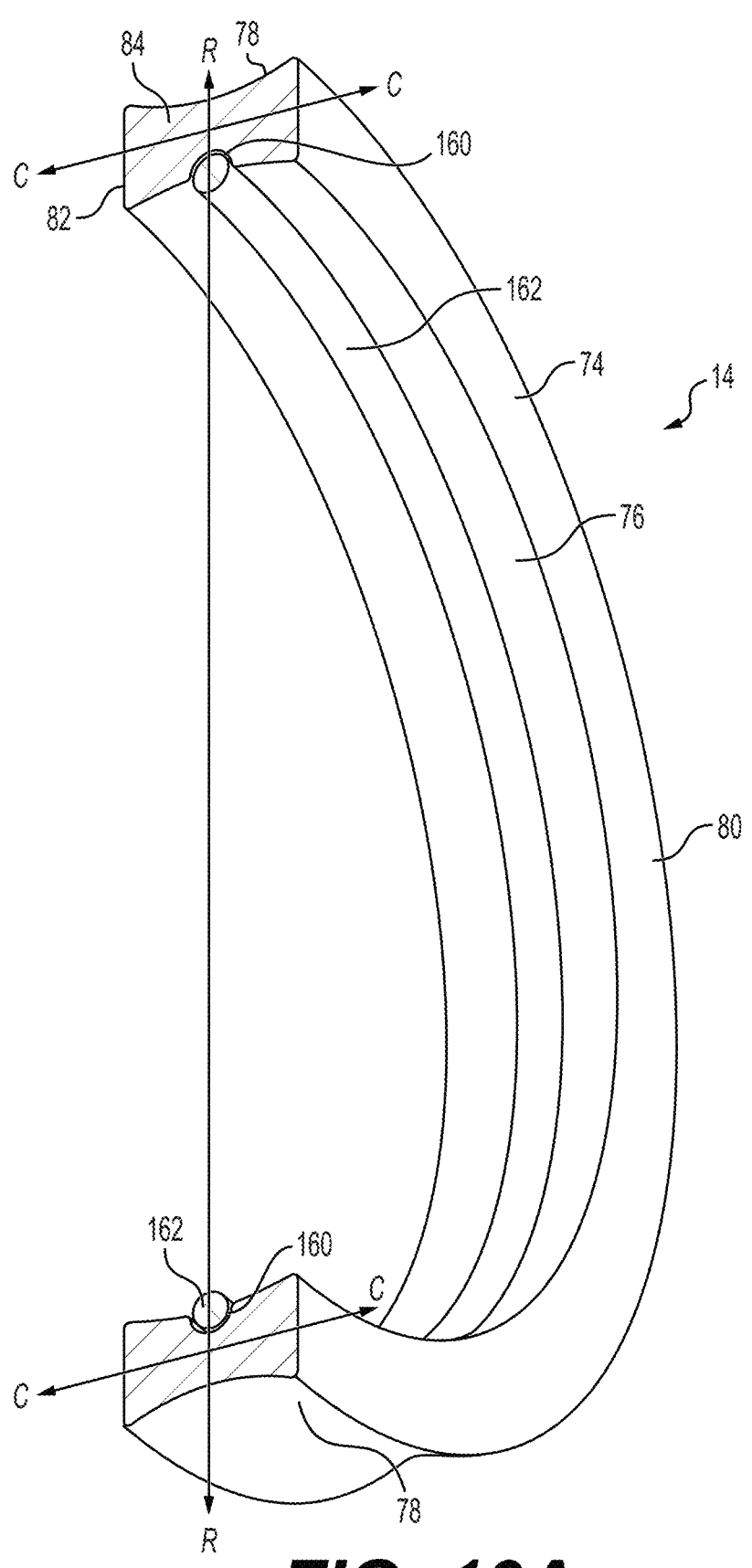
FIG. 10A is a schematic perspective section view of another example seal including an example O-ring, according to embodiments of the disclosure.
Figure 10B:
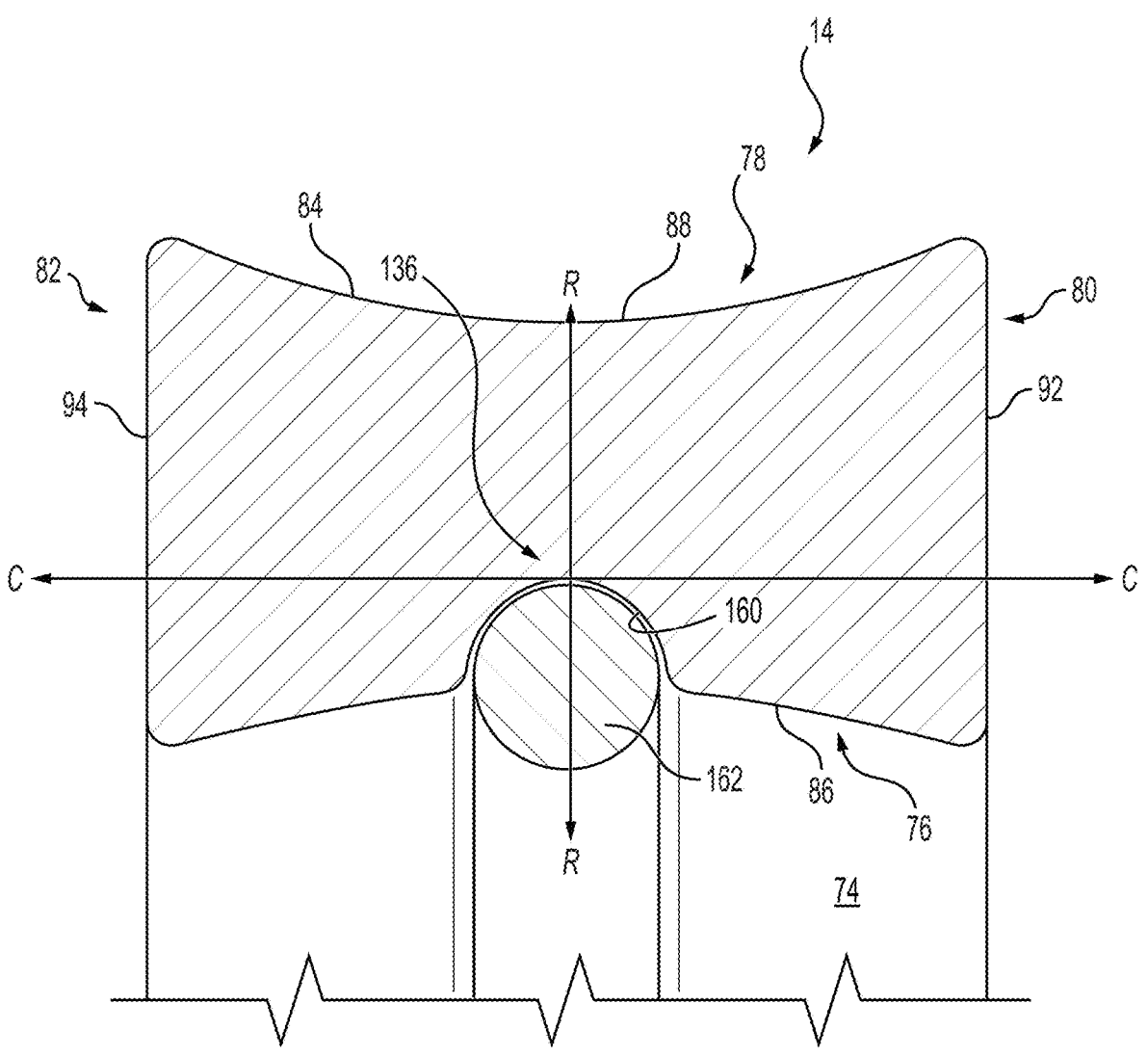
FIG. 10B is a schematic section view of the example seal shown in FIG. 10A in an uncompressed condition, according to embodiments of the disclosure.

FIG. 10A is a schematic perspective section view of another example seal 14 to enhance a fluid seal between an outer surface of a first component having a substantially circular cross-section and an inner surface of a second component, according to embodiments of the disclosure, and FIG. 10B is a schematic section view of the example seal 14 shown in FIG. 10A in an uncompressed condition. As shown in FIGS. 10A and 10B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. The seal cross-section 84 further may have a first lateral edge 92 at least partially defined by the first lateral face 80, and a second lateral edge 94 at least partially defined by the second lateral face 82. As shown in FIGS. 10A and 10B, in some embodiments, the groove edge 86 may at least partially define a groove edge recess 160 between the first lateral edge 92 and the second lateral edge 94. In some embodiments, the seal 14 further may include an O-ring 162 received in the groove edge recess 160 of the groove face 76, for example, as shown. The groove face 76, the O-ring 162, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to expand the annular seal body 74 laterally outward from the first lateral face 80 and the second lateral face 82, thereby to enhance the fluid seal between the first component and the second component.

In some embodiments consistent with FIGS. 10A and 10B, the groove face 76, the O-ring 162, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to press the O-ring 162 against the groove of the first component or the second component, thereby to enhance the fluid seal between the first component and the second component.

As shown in FIGS. 10A and 10B, the groove edge 86 may be at least partially concave. In some embodiments, the sealing edge 88 may be at least partially concave. In some embodiments, a radially inward facing portion of the O-ring 162 may have a relatively smaller radius than the groove face 76 of the annular seal body 74. In some such embodiments, the radially inward facing portion of the O-ring 162 may contact the groove the first component or the second component before the groove face 76 of the annual seal body 74, for example, when the groove is in an outer diameter of a component having a substantially cylindrical outer surface. In some embodiments, a radially outward facing portion of the O-ring 162 may have a relatively larger radius than the groove face 76 of the annular seal body 74. In some such embodiments, the radially outward facing portion of the O-ring 162 may contact the groove the first component or the second component before the groove face 76 of the annual seal body 74, for example, when the groove is in an inner diameter of a component having a substantially cylindrical inner surface.

In some embodiments consistent with FIGS. 10A and 10B, the groove edge 86 and the sealing edge 88 may form an area 136 between the first lateral edge 92 and the second lateral edge 94 having a relatively reduced thickness. In at least some such embodiments, the groove face 76, the O-ring 162, the sealing face 78, the first lateral face 80, and/or the second lateral face 82 may be positioned to cause the seal 14 to deform in the groove of the first component or the second component when the other of the first component or the second component presses against the sealing face 78 in a direction toward the groove face 76, thereby to compress the area 136 between the first lateral edge 92 and the second lateral edge 94.

In some embodiments, the first lateral edge 92 and/or the second lateral edge 94 may be substantially planar, for example, as shown in FIGS. 10A and 10B. In some embodiments, the first lateral edge 92 and the second lateral edge 94 may be substantially parallel to one another. The first lateral edge 92 and/or the second lateral edge 94 may be substantially parallel to the radial axis R of the seal 14. In some embodiments, the seal cross-section 84 and the cross-section of the O-ring 162 may have a combined seal cross-section, and the combined seal cross-section may have bilateral symmetry relative to the radial axis R of the seal 14.

In at least some embodiments consistent with FIGS. 10A and 10B, the presence of the O-ring 162 may result in causing ends of the first lateral face 80 and the second lateral face 82 adjacent the groove face 76 to spread laterally outward toward the first groove side wall 132 and the second groove side wall 134 at the groove bottom 130 when the seal 14 is compressed and deformed by a component into the annular groove 70 (or 72) (see, e.g., example annular groove 70 shown in FIGS. 6A-6C). In addition, the presence of the O-ring 162 at the groove face 76 may result in pressing the O-ring 162 against the groove 130 when the seal 14 is compressed and deformed by the component. These example activations may result in enhancing the fluid seal between the first component and the second component.

Figure 11A:
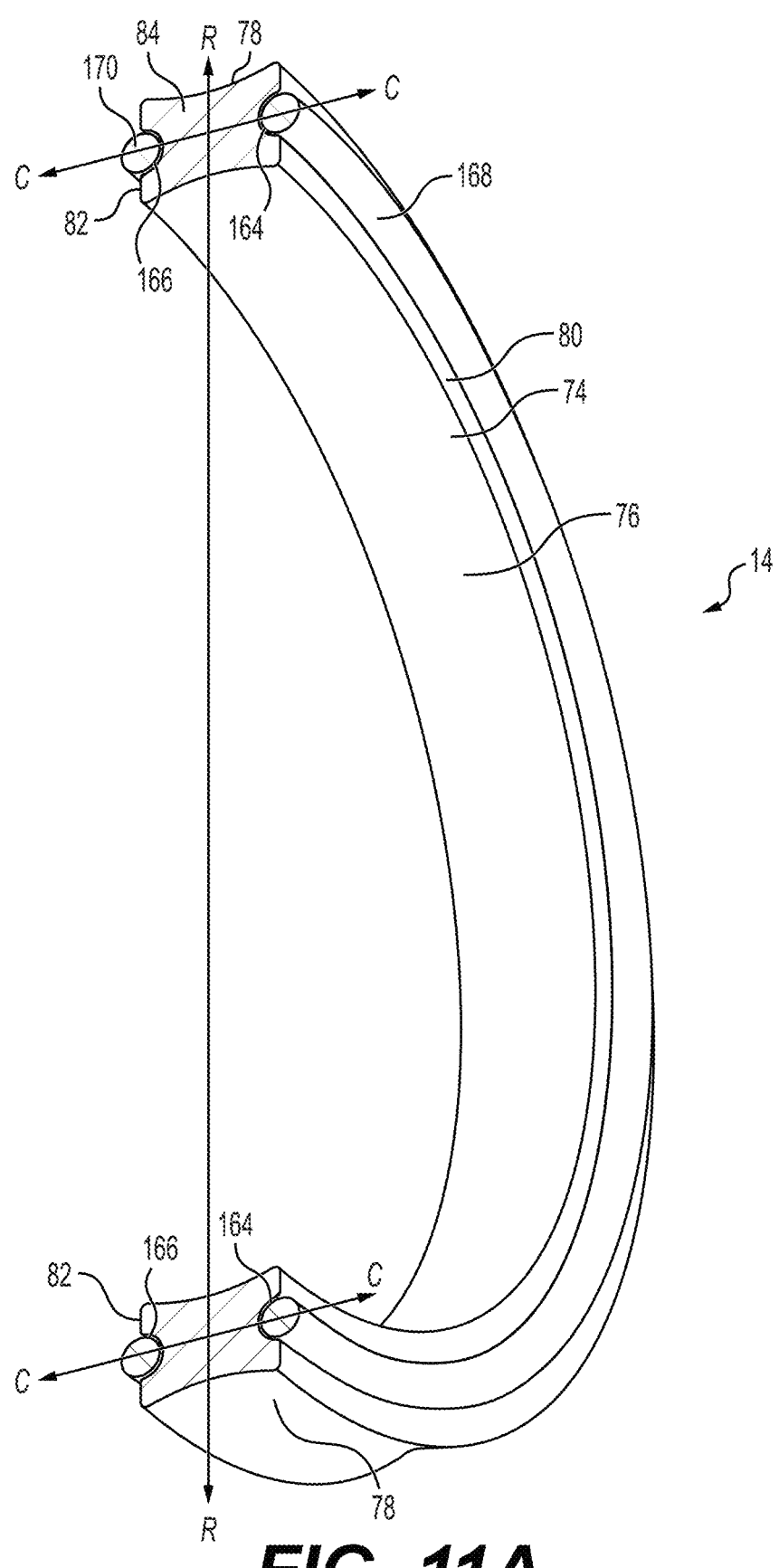
FIG. 11A is a schematic perspective section view of another example seal including example O-rings, according to embodiments of the disclosure.
Figure 11B:
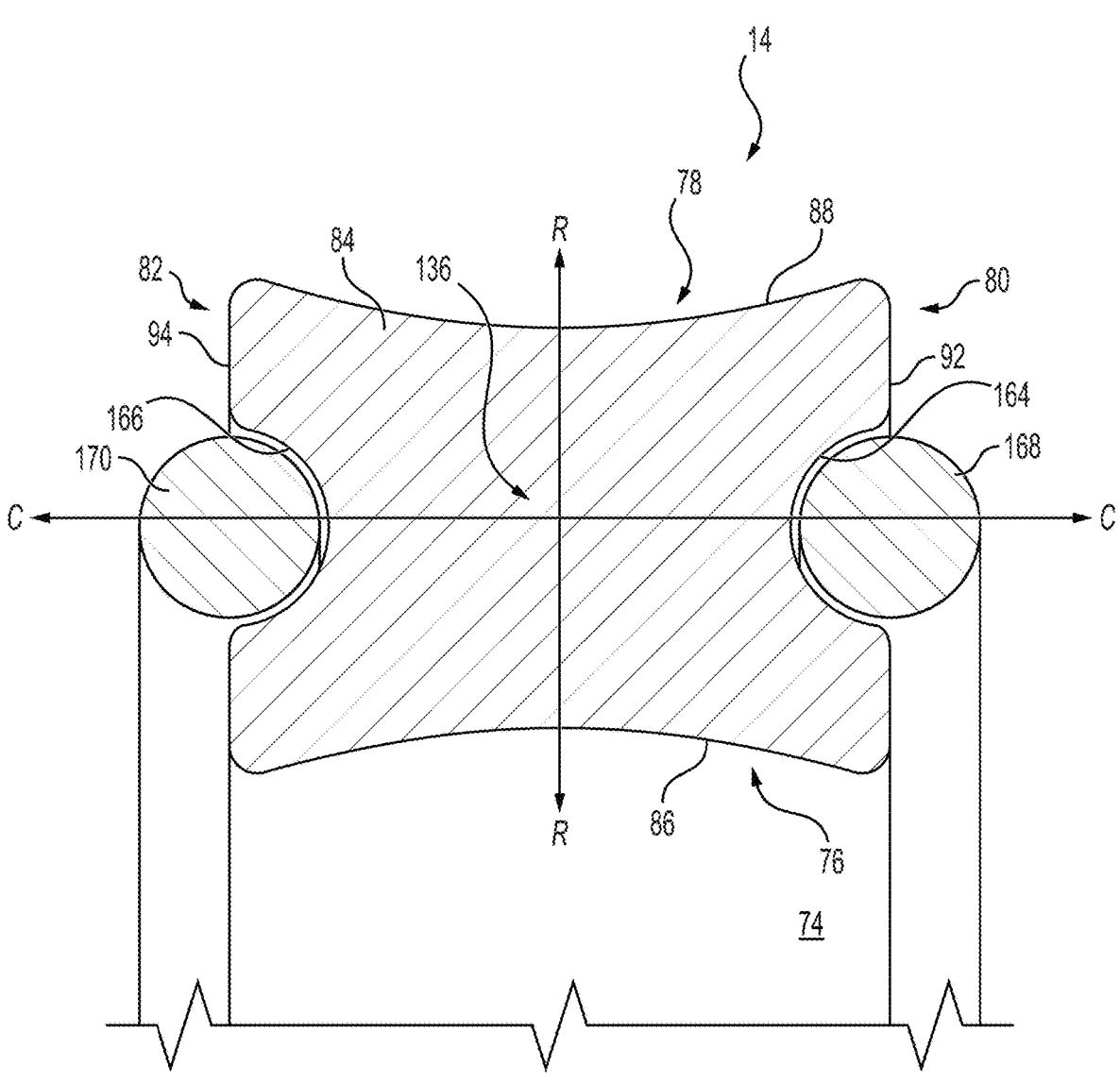
FIG. 11B is a schematic section view of the example seal shown in FIG. 11A in an uncompressed condition, according to embodiments of the disclosure.

FIG. 11A is a schematic perspective section view of another example seal 14 to enhance a fluid seal between an outer surface of a first component having a substantially circular cross-section and an inner surface of a second component, according to embodiments of the disclosure, and FIG. 11B is a schematic section view of the example seal 14 shown in FIG. 11A in an uncompressed condition. As shown in FIGS. 11A and 11B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. The seal cross-section 84 further may have a first lateral edge 92 at least partially defined by the first lateral face 80, and the first lateral edge 92 may at least partially define a first lateral recess 164 between the groove edge 86 and the sealing edge 88. The seal cross-section 84 also may have a second lateral edge 94 at least partially defined by the second lateral face 82, and the second lateral edge 94 may at least partially define a second lateral recess 166 between the groove edge 86 and the sealing edge 88.

In some embodiments, for example, as shown in FIGS. 11A and 11B, the seal 14 further may include a first O-ring 168 at least partially received in the first lateral recess 164 of the first lateral face 80 and a second O-ring 170 at least partially received in the second lateral recess 166 of the second lateral face 82. The groove face 76, the first O-ring 168, the second O-ring 170, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to expand the annular seal body 74 laterally outward from the first lateral face 80 and the second lateral face 82 and press the first O-ring 168 and the second O-ring 170 against walls of the groove, thereby to enhance the fluid seal between the first component and the second component.

In some embodiments consistent with FIGS. 11A and 11B, the groove edge 86 may be at least partially concave.

In some embodiments, the sealing edge 88 may be at least partially concave, for example, as shown in FIGS. 11A and 11B. In some embodiments, the groove edge 86 and the sealing edge 88 may form an area 136 between the first lateral edge 92 and the second lateral edge 94 having a relatively reduced thickness, for example, as compared to the thickness of the seal 14 at the first lateral edge 92 and the second lateral edge 94. In some embodiments, the groove face 76, the first O-ring 168, the second O-ring 170, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to compress the area 136 between the first lateral edge 92 and the second lateral edge 94.

In at least some embodiments consistent with FIGS. 11A and 11B, the presence of the first and second O-rings 168 and 170 may result in causing ends of the first lateral face 80 and the second lateral face 82 adjacent the groove face 76 to be pressed into respective corners of the annular groove 70, for example, where the first groove side wall 132 and the second groove side wall 134 meet the groove bottom 130 when the seal 14 is compressed and deformed by a component into the annular groove 70 (or 72) (see, e.g., the example annular groove 70 shown in FIGS. 6A-6C). In addition, the presence of the first and second O-rings 168 and 170 at the first groove side wall 132 and the second groove side wall 134, respectively, may result in pressing the O-rings 168 and 170 against the respective first groove side wall 132 and second groove side wall 134 when the seal 14 is compressed and deformed by the component. These example activations may result in enhancing the fluid seal between the first component and the second component.

As shown in FIGS. 11A and 11B, in some embodiments, the first O-ring 168 may extend laterally outward beyond the first lateral edge 92 of the annular seal body 74, and/or the second O-ring 170 may extend laterally outward beyond the second lateral edge 94 of the annular seal body 74. In some embodiments, the first lateral edge 92 may be substantially planar on both sides of the first lateral recess 164, and/or the second lateral edge 94 may be substantially planar on both sides of the second lateral recess 166, for example, as shown. In some embodiments, the first lateral edge 92 and the second lateral edge 94 may be substantially parallel to one another. In some embodiments, the first lateral edge 92 and/or the second lateral edge 94 may be substantially parallel to the radial axis R of the seal 14, for example, as shown. In some embodiments, the seal cross-section 84, the cross-section of the first O-ring 168, and cross-section of the second O-ring 170 may have a combined seal cross-section, and the combined seal cross-section may have bilateral symmetry relative to the radial axis R of the seal 14. In some embodiments, for example, as shown in FIGS. 11A and 11B, the combined seal cross-section may have bilateral symmetry relative to the circumferential axis C of the seal 14.

Figure 12A:
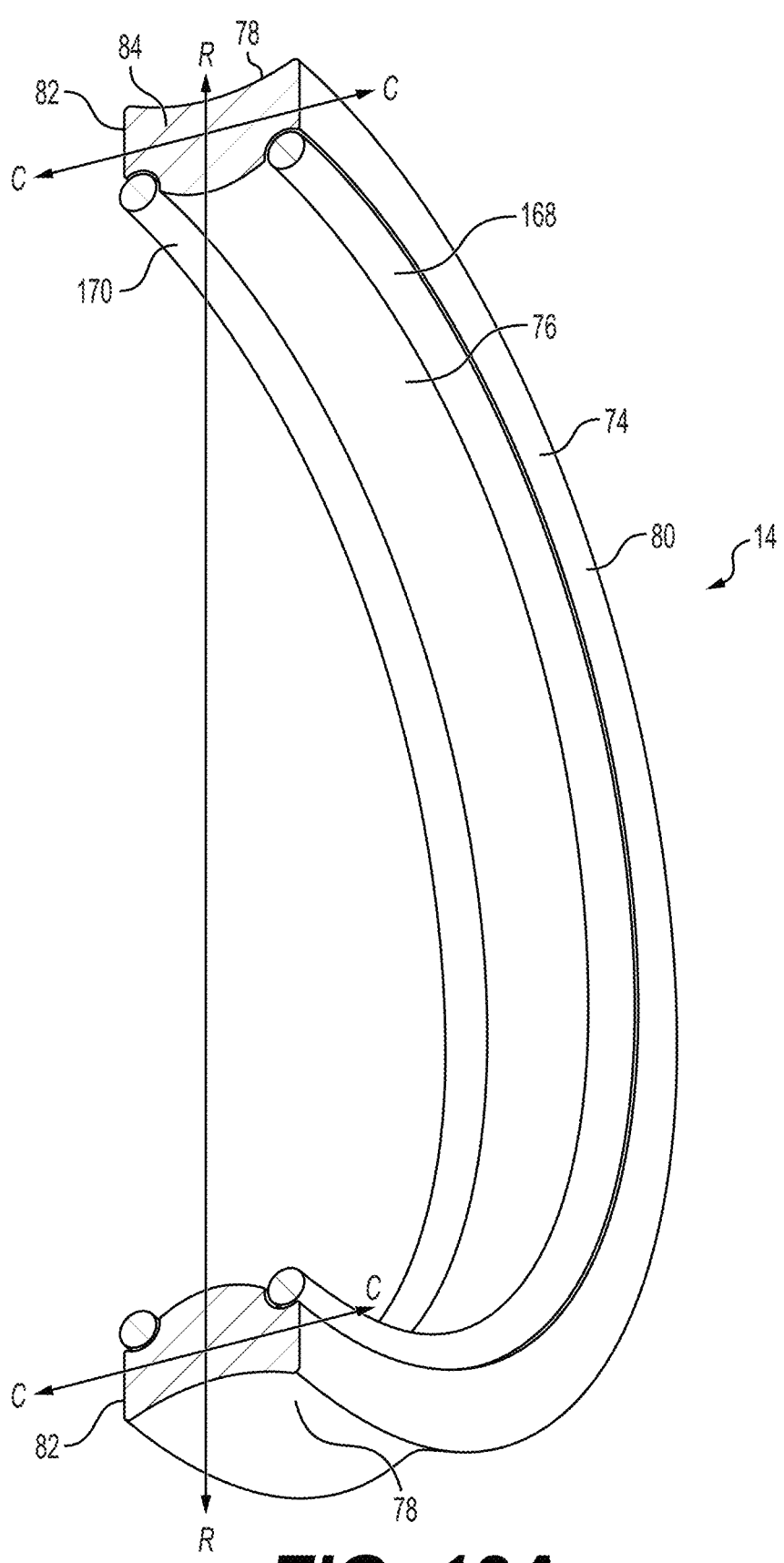
FIG. 12A is a schematic perspective section view of another example seal including example O-rings, according to embodiments of the disclosure.
Figure 12B:
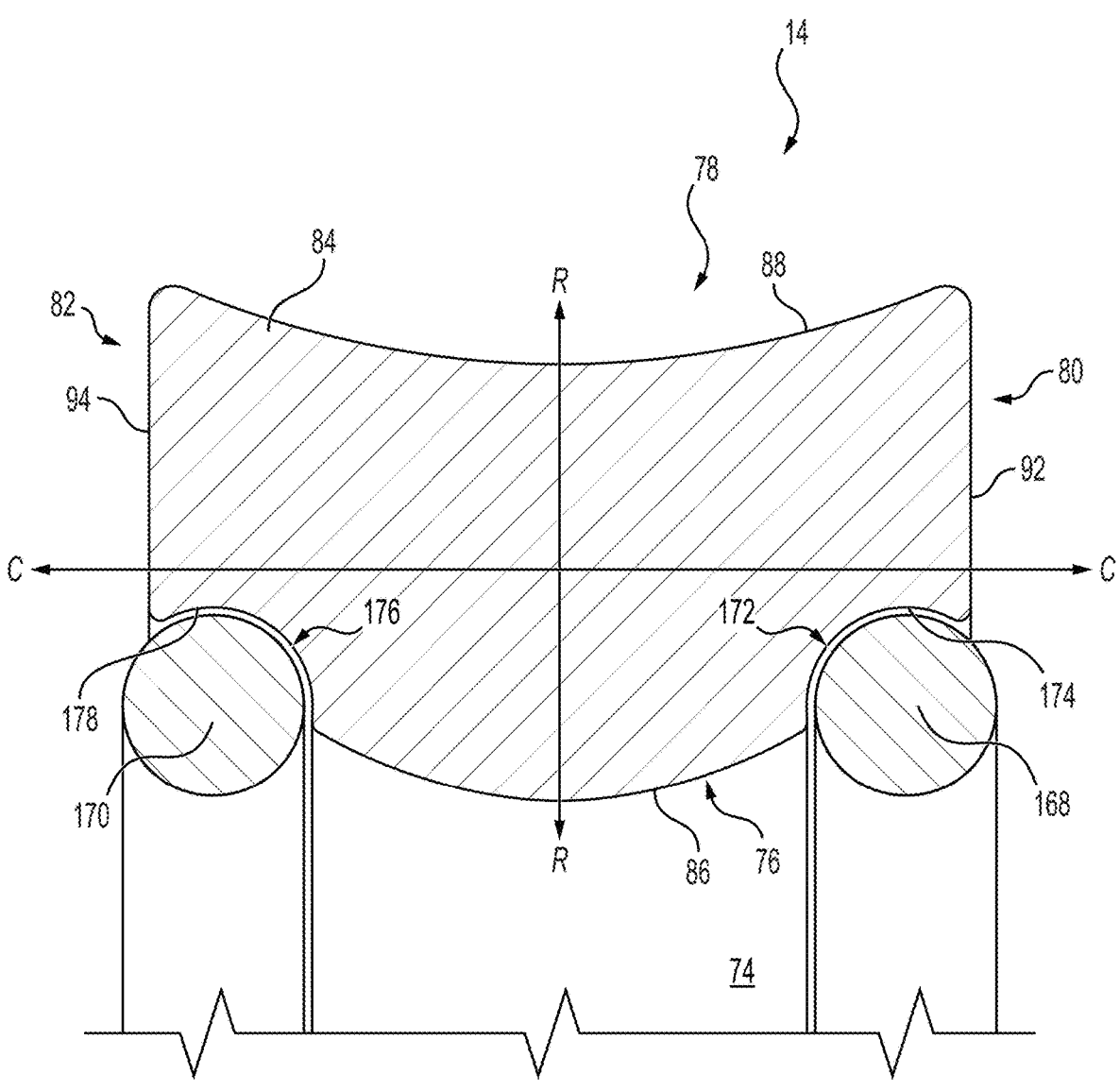
FIG. 12B is a schematic section view of the example seal shown in FIG. 12A in an uncompressed condition, according to embodiments of the disclosure.

FIG. 12A is a schematic perspective section view of another example seal 14 to enhance a fluid seal between an outer surface of a first component having a substantially circular cross-section and an inner surface of a second component, according to embodiments of the disclosure, and FIG. 12B is a schematic section view of the example seal 14 shown in FIG. 12A in an uncompressed condition. As shown in FIGS. 12A and 12B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. The seal cross-section 84 further may have a first lateral edge 92 at least partially defined by the first lateral face 80, and the first lateral edge 92 and the groove edge 86 may meet at a first groove edge intersection 172. The first lateral edge 92 and/or the groove edge 86 may at least partially define a first intersection recess 174 at the first groove edge intersection 172. The seal cross-section 84 also may have a second lateral edge 94 at least partially defined by the second lateral face 82, and the second lateral edge 94 and the groove edge 86 may meet at a second groove edge intersection 176. The second lateral edge 94 and/or the groove edge 86 may at least partially define a second intersection recess 178 at the second groove edge intersection 176. The seal 14 further may include a first O-ring 168 at least partially received in the first intersection recess 174, and a second O-ring 170 at least partially received in the second intersection recess 178. In some embodiments, the groove face 76, the first O-ring 168, the second O-ring 170, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to expand the annular seal body 74 laterally outward from the first lateral face 80 and the second lateral face 82 and press the first O-ring 168 and the second O-ring 170 against walls of the groove, thereby to enhance the fluid seal between the first component and the second component.

In some embodiments, the groove edge 86 may be at least partially convex, for example, as shown in FIGS. 12A and 12B. In some embodiments, the sealing edge 88 may be at least partially concave. In some embodiments, the groove face 76, the first O-ring 168, the second O-ring 170, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to push an area 136 of the seal 14 between the first lateral edge 92 and the second lateral edge 94 against the first component or the second component.

In at least some embodiments consistent with FIGS. 12A and 12B, the presence of the first and second O-rings 168 and 170 at the respective first groove edge intersection 172 and second groove edge intersection 176 may result in causing the first and second O-rings 168 and 170 to be pressed into respective corners of the annular groove 70, where the first groove side wall 132 and the second groove side wall 134 meet the groove bottom 130 when the seal 14 is compressed and deformed by a component into the annular groove 70 (or 72) (see, e.g., the example annular groove 70 shown in FIGS. 6A-6C). In addition, the presence of the first and second O-rings 168 and 170 at the first groove side wall 132 and the second groove side wall 134, respectively, may result in pressing the O-rings 168 and 170 against the respective first groove side wall 132 and second groove side wall 134 when the seal 14 is compressed and deformed by the component. These example activations may result in enhancing the fluid seal between the first component and the second component.

In some embodiments, the first O-ring 168 and/or the second O-ring 170 may extend laterally outward beyond the first lateral edge 92 and/or the second the second lateral edge 94, respectively, for example, in the uncompressed state, as shown in FIGS. 12A and 12B. In some embodiments, the first lateral edge 92 may be substantially planar between the first intersection recess 174 and the sealing edge 88, and/or the second lateral edge 94 may be substantially planar between the second intersection recess 178 and the sealing edge 88.

In some embodiments, a radially inward facing portion of the first O-ring 168 and/or a radially inward facing portion of the second O-ring 170 may have a relatively smaller radius than the groove face 76 of the annular seal body 74. In some such embodiments, the radially inward facing portion of the first O-ring 168 and/or the second O-ring 170 may contact the groove the first component or the second component before the groove face 76 of the annual seal body 74, for example, when the groove is in an outer diameter of a component having a substantially cylindrical outer surface. In some embodiments, a radially outward facing portion of the first O-ring 168 and/or a radially outward facing portion of the second O-ring 170 may have a relatively larger radius than the groove face 76 of the annular seal body 74. In some such embodiments, the radially outward facing portion of the first O-ring 168 and/or the second O-ring 170 may contact the groove the first component or the second component before the groove face 76 of the annual seal body 74, for example, when the groove is in an inner diameter of a component having a substantially cylindrical inner surface.

For at least some embodiments consistent with FIGS. 12A and 12B, the first lateral edge 92 and the second lateral edge 94 may be substantially parallel to one another. In some embodiments, the first lateral edge 92 may be substantially parallel to the radial axis R of the seal 14, and/or the second lateral edge 94 may be substantially parallel to the radial axis R of the seal 14. In some embodiments, the seal cross-section 84, the cross-section of the first O-ring 168, and cross-section of the second O-ring 170 may have a combined seal cross-section, and the combined seal cross-section may have bilateral symmetry relative to the radial axis R of the seal 14.

Figure 13A:
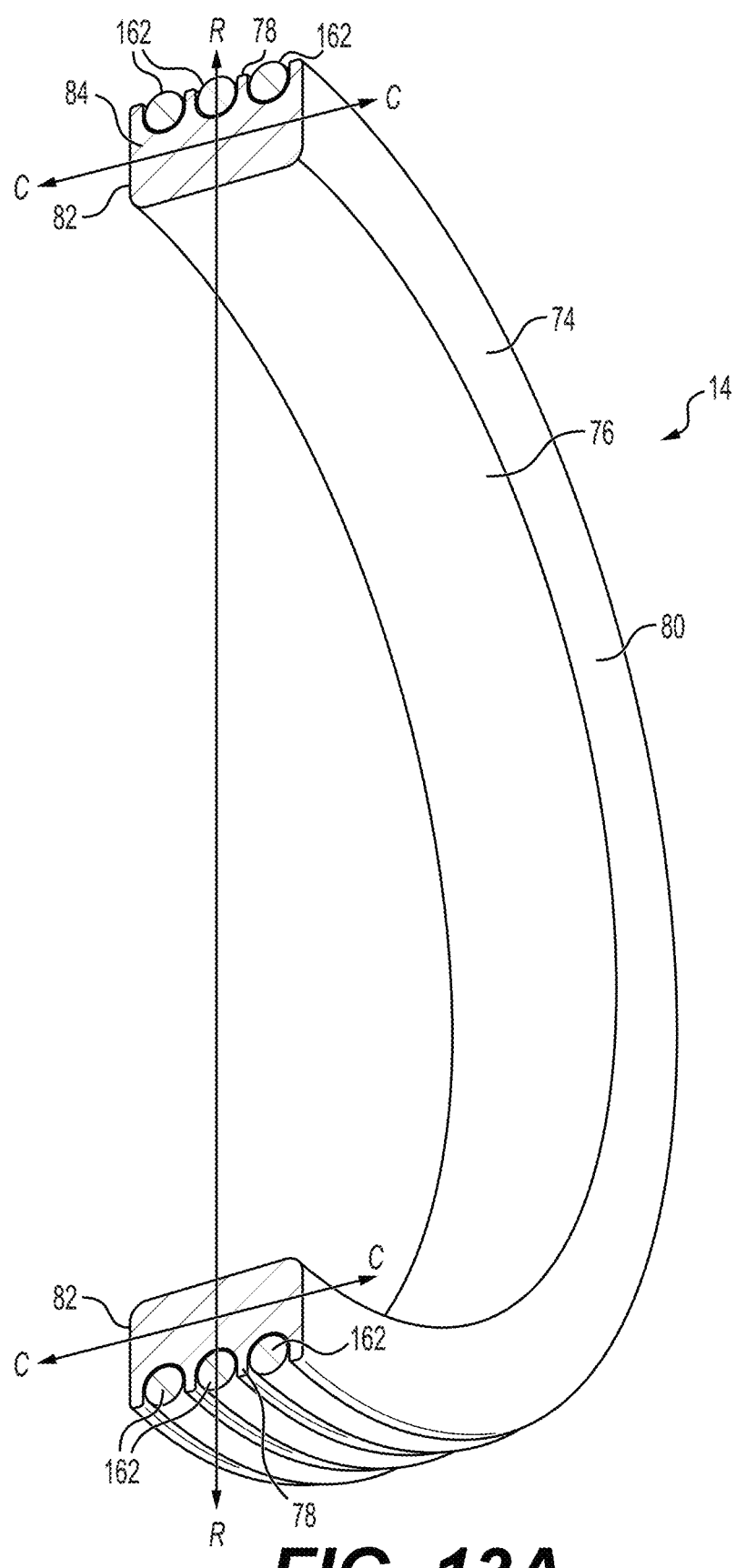
FIG. 13A is a schematic perspective section view of another example seal including example O-rings, according to embodiments of the disclosure.
Figure 13B:
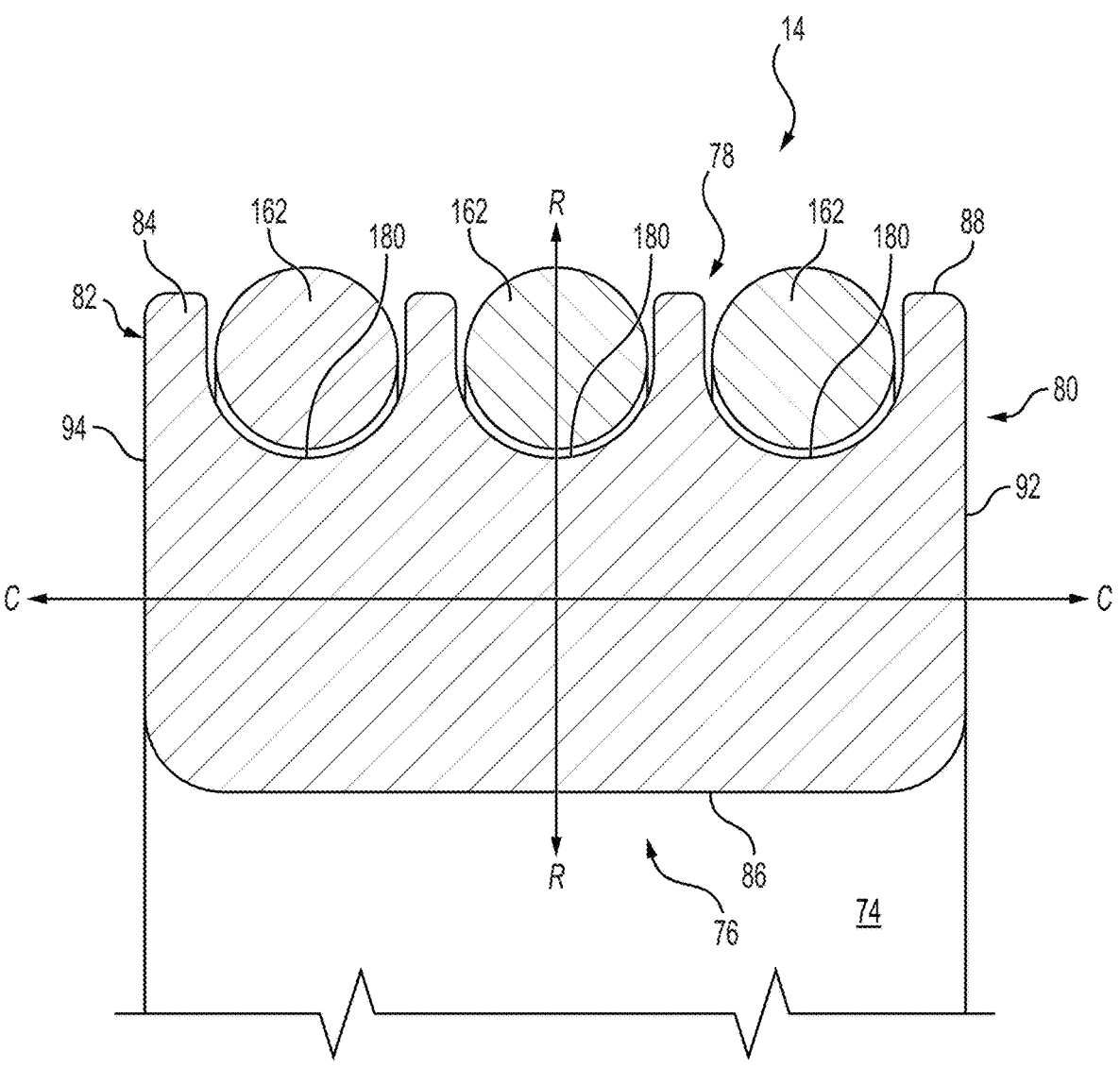
FIG. 13B is a schematic section view of the example seal shown in FIG. 13A in an uncompressed condition, according to embodiments of the disclosure.

FIG. 13A is a schematic perspective section view of another example seal 14 to enhance a fluid seal between an outer surface of a first component having a substantially circular cross-section and an inner surface of a second component, according to embodiments of the disclosure, and FIG. 13B is a schematic section view of the example seal 14 shown in FIG. 13A in an uncompressed condition. As shown in FIGS. 13A and 13B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. The seal cross-section 84 further may have a first lateral edge 92 at least partially defined by the first lateral face 80, and a second lateral edge 94 at least partially defined by the second lateral face 82. As shown in FIGS. 13A and 13B, in some embodiments, the sealing edge 88 may at least partially define a plurality of sealing edge recesses 180 between the first lateral edge 92 and the second lateral edge 94. The seal 14 further may include a plurality of O-rings 162. Each of the plurality of O-rings 162 may be received in one of the plurality of sealing edge recesses 180 of the sealing face 78. In some embodiments consistent with FIGS. 13A and 13B, the groove face 76, the plurality of O-rings 162, the sealing face 78, the first lateral face 80, and/or the second lateral face 82 may be positioned to cause the seal 14 to compress and deform in the groove of the first component or the second component when the other of the first component or the second component presses against the plurality of O-rings 162 in a direction toward the groove face 76, thereby to expand the annular seal body 74 laterally outward from the first lateral face 80 and the second lateral face 82, thereby to enhance the fluid seal between the first component and the second component.

In some embodiments consistent with FIGS. 13A and 13B, the groove face 76, the plurality of O-rings 162, the sealing face 78, the first lateral face 80, and/or the second lateral face 82 may be positioned to cause the seal 14 to compress and deform in the groove of the first component or the second component when the other of the first component or the second component presses against the plurality of O-rings 162 in the direction toward the groove face 76, thereby to press the plurality of O-rings 162 against the other of the first component or the second component, thereby to enhance the fluid seal between the first component and the second component.

For example, in at least some embodiments consistent with FIGS. 13A and 13B, the presence of the O-rings 162 at the sealing face 78 may result in causing ends of the first lateral face 80 and the second lateral face 82 adjacent the sealing face 78 to deform laterally outward against respective portions of the first groove side wall 132 and the second groove side wall 134 adjacent the open portion 135 of the annular groove 70 when the seal 14 is compressed and deformed by a component into the annular groove (see, e.g., example annular groove 70 shown in FIGS. 6A-6C). In addition, the presence of the O-rings 162 at the sealing face 78 may result in pressing the O-rings 162 against the component when the seal 14 is compressed and deformed by the component. These example activations may result in enhancing the fluid seal between the first component and the second component.

In some embodiments, respective radially outward facing portions of the plurality O-rings 162 may have a larger radius than the sealing face 78 of the annular seal body 74. In some such embodiments, the respective radially outward facing portions of the O-rings 162 may contact the other of the first component or the second component before the sealing face 78 of the annual seal body 74, for example, when the groove is in an outer diameter of a component having a substantially cylindrical outer surface. In some embodiments, respective radially inward facing portions of the plurality of O-rings 162 may have a smaller radius than the sealing face 78 of the annular seal body 74. In some such embodiments, the respective radially inward facing portions of the O-rings 162 may contact the other of the first component or the second component before the sealing face 78 of the annual seal body 74, for example, when the groove is in an inner diameter of a component having a substantially cylindrical inner surface.

As shown in FIGS. 13A and 13B, in some embodiments, the first lateral edge 92 and/or the second lateral edge 94 may be substantially planar. In some embodiments, the first lateral edge 92 and second lateral edge 94 may be substantially parallel to one another. As shown in FIGS. 13A and 13B, the first lateral edge 92 and/or the second lateral edge 94 may be substantially parallel to the radial axis R of the seal 14. As shown in FIGS. 13A and 13B, the seal cross-section 84 and the respective cross-sections of the O-rings 162 may have a combined seal cross-section, and the combined seal cross-section may have bilateral symmetry relative to the radial axis R of the seal 14.

Figure 14A:
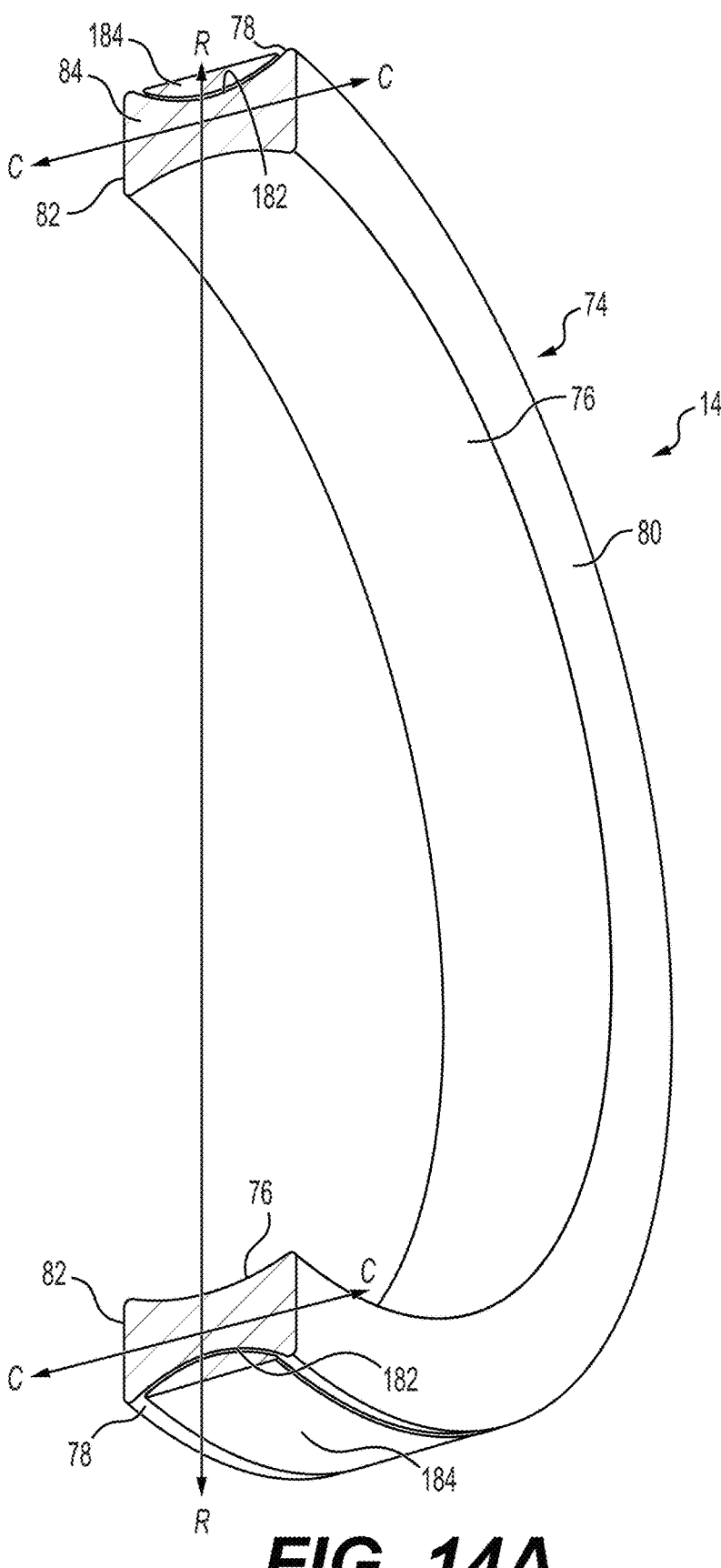
FIG. 14A is a schematic perspective section view of another example seal including an example stiffener, according to embodiments of the disclosure.
Figure 14B:
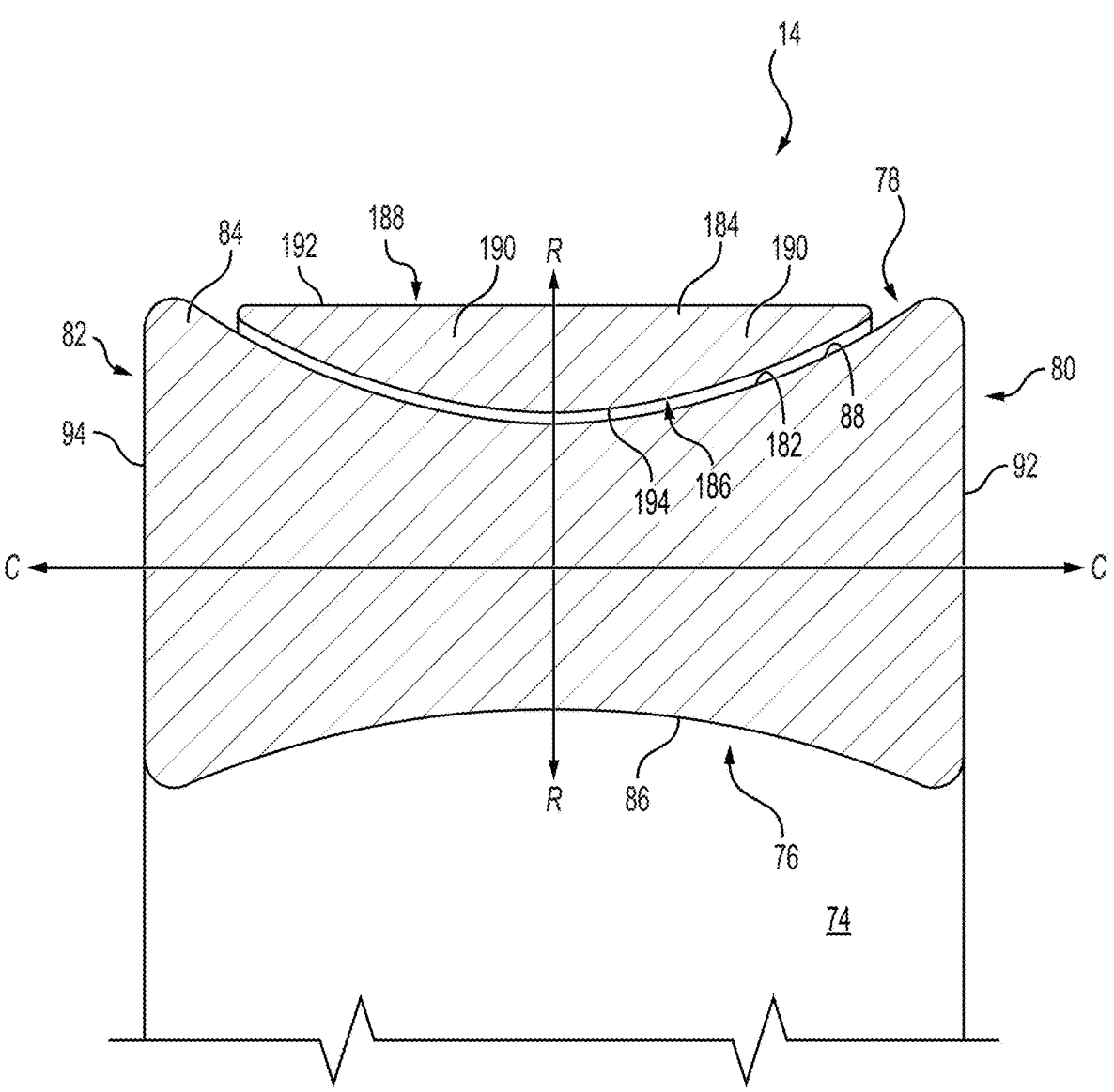
FIG. 14B is a schematic section view of the example seal shown in FIG. 14A in an uncompressed condition, according to embodiments of the disclosure.

FIG. 14A is a schematic perspective section view of another example seal 14 to enhance a fluid seal between an outer surface of a first component having a substantially circular cross-section and an inner surface of a second component, according to embodiments of the disclosure, and FIG. 14B is a schematic section view of the example seal 14 shown in FIG. 14A in an uncompressed condition. As shown in FIGS. 14A and 14B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. As shown in FIGS. 14A and 14B, in some embodiments, the sealing edge 88 may at least partially define a sealing edge recess 182. The seal cross-section 84 further may have a first lateral edge 92 at least partially defined by the first lateral face 80, and a second lateral edge 94 at least partially defined by the second lateral face 82. The seal further may include an annular stiffener 184 at least partially received in the sealing edge recess 182 of the annular seal body 74. The annular stiffener 184 may have a first stiffener face 186 adjacent the sealing face 78 of the annular seal body 74, and a second stiffener face 188 opposite the first stiffener face 186. The annular stiffener 184 further may have a stiffener cross-section 190 at least partially defined by the first stiffener face 186 and the second stiffener face 188. The stiffener cross-section 190 may have a first stiffener edge 192 at least partially defined by the first stiffener face 186, and the first stiffener edge 192 may be at least partially convex, for example, as shown in FIGS. 14A and 14B. The stiffener cross-section 190 further may have a second stiffener edge 194 at least partially defined by the second stiffener face 188.

In at least some embodiments consistent with FIGS. 14A and 14B, the groove face 76, the sealing face 78, the first lateral face 80, the second lateral face 82, the first stiffener face 186, and/or the second stiffener face 188 may be positioned to cause the seal 14 to compress and deform in the groove of the first component or the second component when the other of the first component or the second component presses against outer edges of the sealing face 78 and the second stiffener face 188 in a direction toward the groove face 76, thereby to expand the annular seal body 74 laterally outward from the first lateral face 80 and the second lateral face 82, thereby to enhance the fluid seal between the first component and the second component.

For example, in at least some embodiments consistent with FIGS. 14A and 14B, the presence of the annular stiffener 184 at the sealing face 78 may result in causing ends of the first lateral face 80 and the second lateral face 82 adjacent the sealing face 78 to deform laterally outward against respective portions of the first groove side wall 132 and the second groove side wall 134 adjacent the open portion 135 of the annular groove when the seal 14 is compressed and deformed by a component into the annular groove (see, e.g., the example annular groove 70 shown in FIGS. 6A-6C). These example activations may result in enhancing the fluid seal between the first component and the second component. In addition, the annular stiffener 184 may provide axial stiffness, for example, in the direction of the radial axis R, which may reduce the likelihood or prevent the seal 14 from expanding radially away from the annular groove, thereby securing the seal in the annular groove. In some embodiments, the annular stiffener 184 may reduce or prevent fretting damage resulting from seal compression.

In some embodiments, the annular seal body 74 may include (or be formed from) a first material, and the annular stiffener 184 may include (or be formed from) a second material, with the first material being different than the second material. In some such embodiments, the first material may have a different hardness than the hardness of the second material. For example, the hardness of the second material may be greater than the hardness of the first material. In some embodiments, the first material and the second material may be substantially the same material.

As shown in FIGS. 14A and 14B, in some embodiments, the groove edge 86 may be at least partially concave, and/or the sealing edge 88 may be at least partially concave and may at least partially form the sealing edge recess 182. The first stiffener edge 192 may be at least partially received by the sealing edge 88. In some embodiments, as shown in FIGS. 14A and 14B, the groove edge 86 and the sealing edge 88 may form an area between the first lateral edge 92 and the second lateral edge 94 having a relatively reduced thickness, for example, as compared to the thickness at the first lateral edge 92 and/or the second lateral edge 94.

In some embodiments consistent with FIGS. 14A and 14B, the groove face 76, the sealing face 78, the first lateral face 80, the second lateral face 82, the first stiffener face 186, and/or the second stiffener face 188 may be positioned to cause the seal 14 to compress and deform in the groove of the first component or the second component when the other of the first component or the second component presses against outer edges of the sealing face 78 and the second stiffener face 188 in the direction toward the groove face 76, thereby to compress the area between the first lateral edge 92 and the second lateral edge 94, thereby to enhance the fluid seal between the first component and the second component.

As shown in FIGS. 14A and 14B, the second stiffener edge 194 may be substantially straight. In some embodiments, the first lateral edge 92 and the second lateral edge 94 may be substantially parallel to one another. In at least some embodiments consistent with FIGS. 14A and 14B, the first lateral edge 92 and/or the second lateral edge 94 may be substantially parallel to the radial axis R of the seal 14. In some embodiments, the seal cross-section 84 and the stiffener cross-section 190 may have a combined seal cross-section, and the combined seal cross-section may have bilateral symmetry with respect to the radial axis R of the seal 14.

Figure 15A:
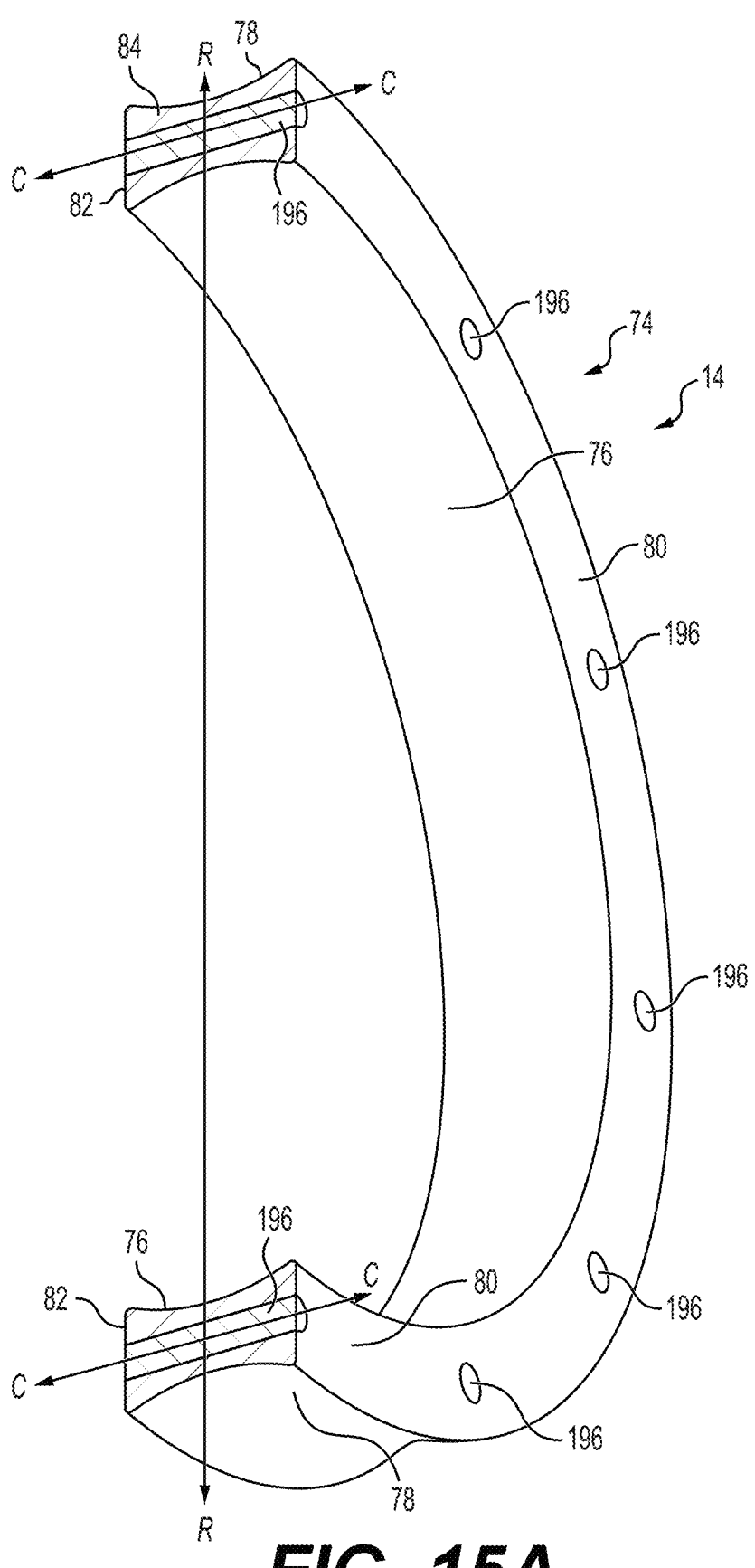
FIG. 15A is a schematic perspective section view of another example seal including example stiffeners, according to embodiments of the disclosure.
Figure 15B:
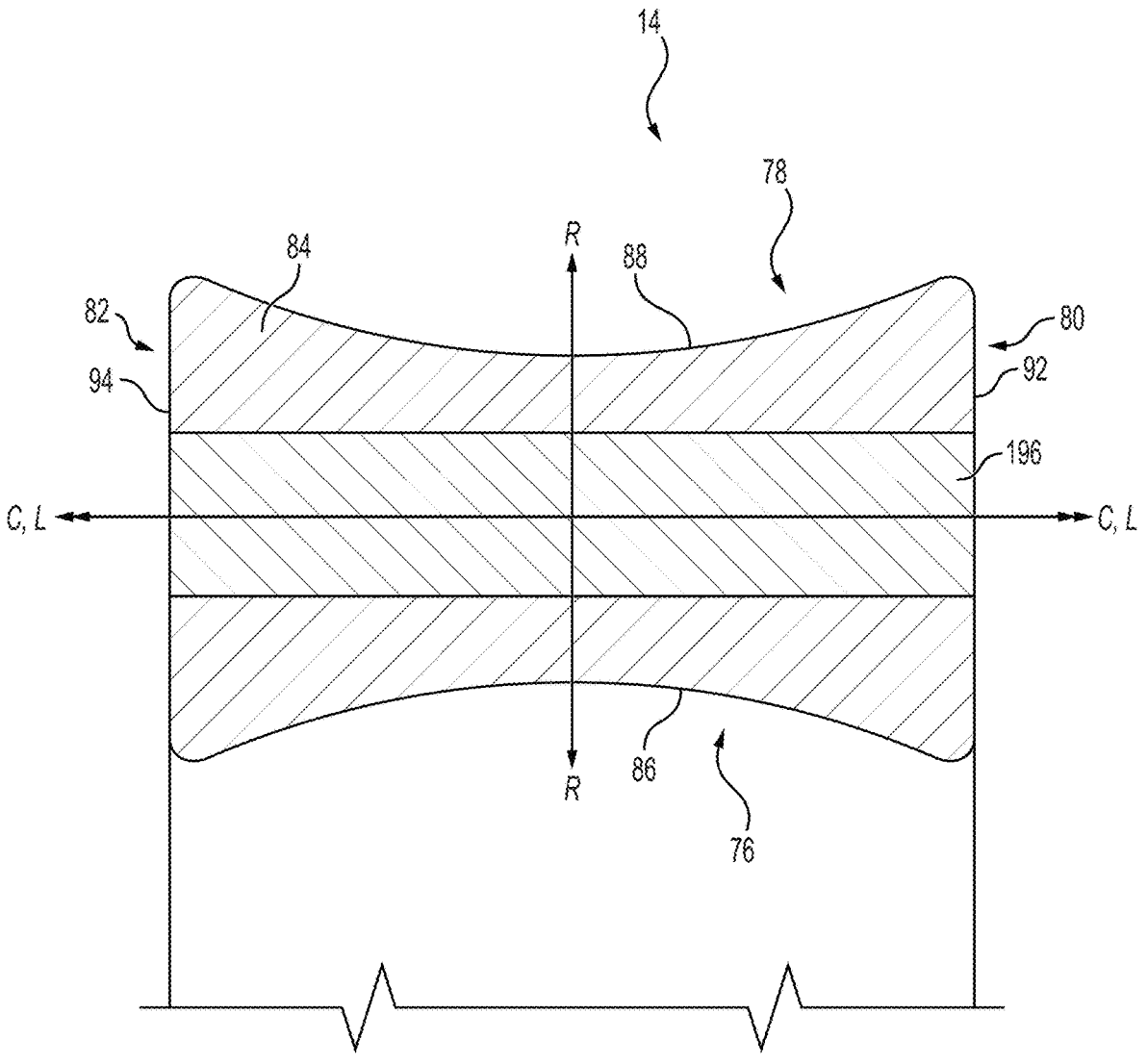
FIG. 15B is a schematic section view of the example seal shown in FIG. 15A in an uncompressed condition, according to embodiments of the disclosure.

FIG. 15A is a schematic perspective section view of another example seal 14 to enhance a fluid seal between an outer surface of a first component having a substantially circular cross-section and an inner surface of a second component, according to embodiments of the disclosure, and FIG. 15B is a schematic section view of the example seal 14 shown in FIG. 15A in an uncompressed condition. As shown in FIGS. 15A and 15B, the seal 14 may include an annular seal body 74, and the annular seal body 74 may have a seal cross-section 84 at least partially defined by a groove face 76, a sealing face 78, a first lateral face 80, and a second lateral face 82. The seal cross-section 84, in some embodiments, may have a groove edge 86 at least partially defined by the groove face 76, and a sealing edge 88 at least partially defined by the sealing face 78. The seal cross-section 84 further may have a first lateral edge 92 at least partially defined by the first lateral face 80, and a second lateral edge 94 at least partially defined by the second lateral face 82. The seal 14 further may include a plurality of stiffeners 196 extending between the first lateral face 80 and the second lateral face 82 of the annular seal body 74. In some embodiments, the plurality of stiffeners 196 may be circumferentially spaced around the annular seal body 74, for example, as shown in FIG. 15A. The groove face 76, the sealing face 78, the first lateral face 801, the second lateral face 82, and/or one or more of the plurality of stiffeners 196 may be positioned to cause the seal 14 to compress and deform in the groove of the first component or the second component when the other of the first component or the second component presses against the sealing face 78 in a direction toward the groove face 76, thereby to expand the annular seal body 74 laterally outward from the first lateral face 80 and the second lateral face 82, thereby to enhance the fluid seal between the first component and the second component.

For example, in at least some embodiments consistent with FIGS. 15A and 15B, the presence of the plurality of stiffeners 196 may result in causing ends of the first lateral face 80 and the second lateral face 82 adjacent the groove face 76 and/or the ends of the first lateral face 80 and the second lateral face 82 adjacent the sealing face 78 to deform laterally outward against respective portions of the first groove side wall 132 and the second groove side wall 134, for example, adjacent the groove bottom 130 and/or adjacent open portion 135, respectively, of the annular groove when the seal 14 is compressed and deformed by a component into the annular groove (see, e.g., example annular groove 70 shown in FIGS. 6A-6C). These example activations may result in enhancing the fluid seal between the first component and the second component. In addition, the plurality of stiffeners 196 may provide stiffness, for example, in a direction parallel to the circumferential axis C, which may assist with securing the seal 14 the annular groove. In some embodiments, the plurality of stiffeners 196 may reduce or prevent fretting damage resulting from seal compression.

In at least some embodiments consistent with FIGS. 15A and 15B, one or more of the plurality of stiffeners 196 may be substantially cylindrical. In some embodiments, one or more of the plurality of stiffeners 196 may have a longitudinal axis L, and the longitudinal axis L of each of the one or more stiffeners 196 may extend in a direction substantially perpendicular to the radial axis R of the annular seal body 74 and/or substantially parallel to the circumferential axis C.

In some embodiments, the annular seal body 74 may include (or be formed from) a first material, and the one or more annular stiffeners may include (or be formed from) a second material, with the first material being different than the second material. In some embodiments, the first material may have a different hardness than the hardness of the second material. For example, the hardness of the second material may be relatively greater than the hardness of the first material. In some embodiments, the first material and the second material may be substantially the same material.

As shown in FIGS. 15A and 15B, the groove edge 86 may be at least partially concave, and/or the sealing edge 88 may be at least partially concave. In some embodiments consistent with FIGS. 15A and 15B, the groove edge 86 and/or the sealing edge 88 may form an area between the first lateral edge 92 and the second lateral edge 94 having a relatively reduced thickness, for example, as compared to the thickness at the first lateral edge 92 and/or the second lateral edge 94. In some embodiments consistent with FIGS. 15A and 15B, the groove face 76, the sealing face 78, the first lateral face 80, the second lateral face 82, and/or one or more of the plurality of stiffeners 196 may be positioned to cause the seal 14 to compress and deform in the groove of the first component or the second component when the other of the first component or the second component presses against outer edges of the sealing face 78 in the direction toward the groove face 76, thereby to compress the area between the first lateral edge 92 and the second lateral edge 94.

In some embodiments, as shown in FIGS. 15A and 15B, the first lateral edge 92 and the second lateral edge 94 may be substantially parallel to one another. In some embodiments, the first lateral edge 92 and/or the second lateral edge 94 may be substantially parallel to a radial axis R of the seal 14. As shown in FIGS. 15A and 15B, the seal cross-section 84 may have bilateral symmetry relative to the radial axis R of the seal 14, and/or the seal cross-section 84 may have bilateral symmetry relative to the circumferential axis C of the seal 14.

Figure 16A:
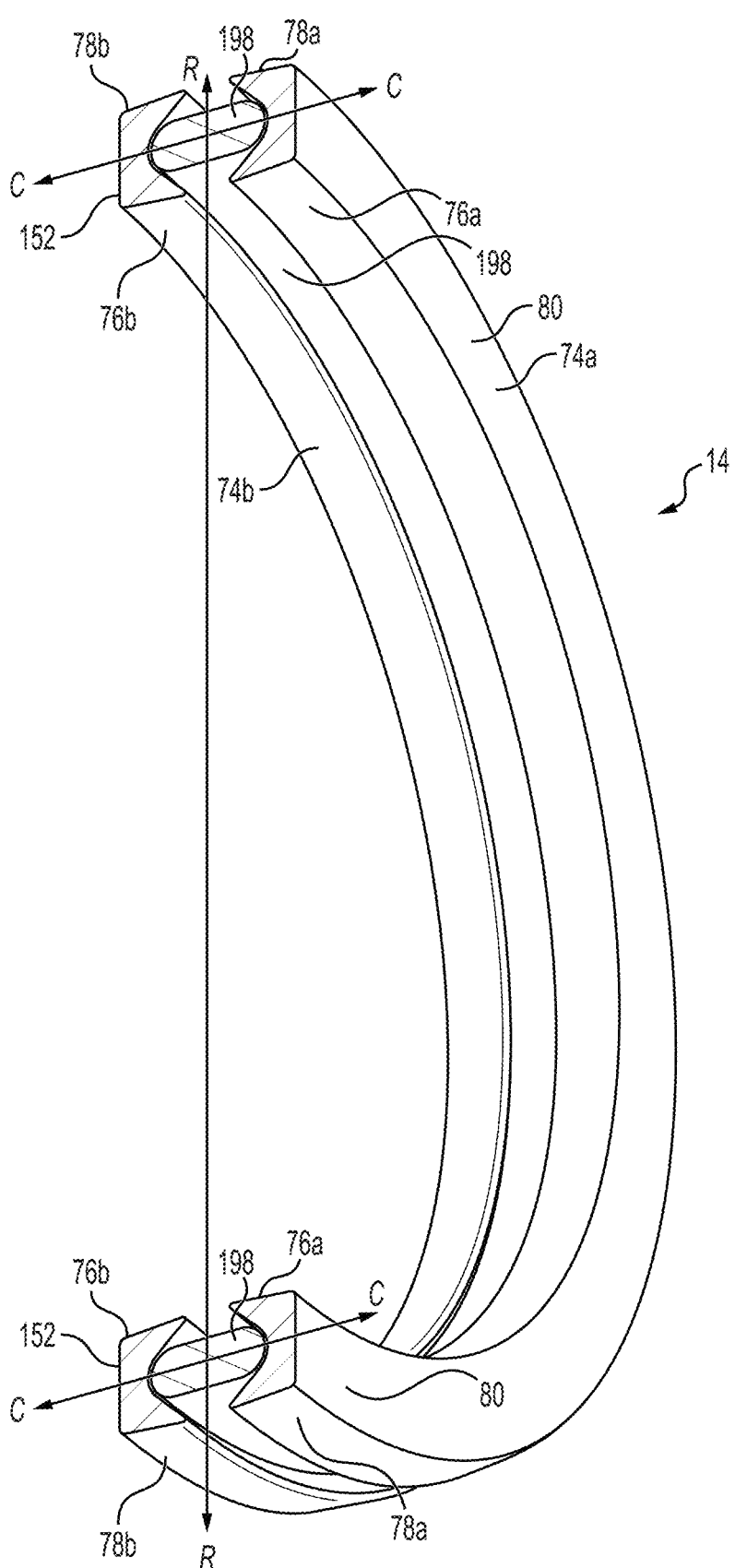
FIG. 16A is a schematic perspective section view of another example seal including an example stiffener, according to embodiments of the disclosure.
Figure 16B:
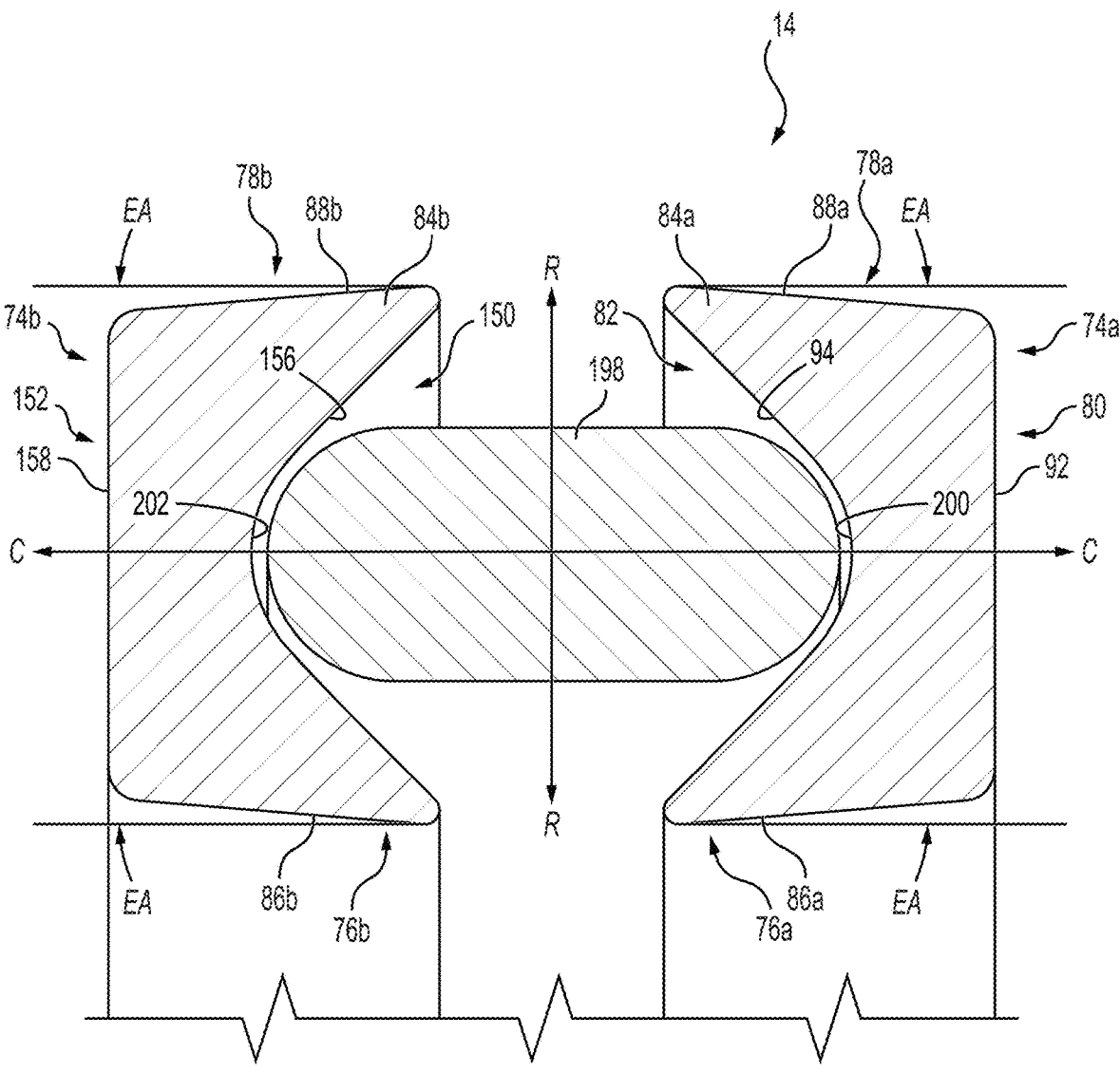
FIG. 16B is a schematic section view of the example seal shown in FIG. 16A in an uncompressed condition, according to embodiments of the disclosure.

FIG. 16A is a schematic perspective section view of another example seal 14 to enhance a fluid seal between an outer surface of a first component having a substantially circular cross-section and an inner surface of a second component, according to embodiments of the disclosure, and FIG. 16B is a schematic section view of the example seal 14 shown in FIG. 16A in an uncompressed condition. As shown in FIGS. 16A and 16B, the seal 14 may include a first annular seal body 74a, a second annular seal body 74b, and an annular stiffener 198 between the first annular seal body 74a and the second annular seal body 74b. The annular first seal body 74a may have a first seal cross-section 84a at least partially defined by a first groove face 76a, a first sealing face 78a, a first lateral face 80, and a second lateral face 82. The first seal cross-section 84a, in some embodiments, may have a first groove edge 86a at least partially defined by the first groove face 76a, and a first sealing edge 88a at least partially defined by the first sealing face 78a. The first seal cross-section 84a further may have a first lateral edge 92 at least partially defined by the first lateral face 80, and a second lateral edge 94 at least partially defined by the second lateral face 82.

As shown in FIGS. 16A and 16B, in some embodiments, the second annular seal body 74b may have a second groove face 76b positioned to face the groove of the first component or the second component, and a second sealing face 78b opposite the second groove face 76b and positioned to face away from the second groove face 76b. The second annular seal body 74b further may have a third lateral face 150 extending between the second groove face 76b and the second sealing face 78b, and a fourth lateral face 152 opposite the third lateral face 150 and extending between the second groove face 76b and the second sealing face 78b. The second annular seal body 74b may have a second seal cross-section 84b at least partially defined by the second groove face 76b, the second sealing face 78b, the third lateral face 150, and the fourth lateral face 152. The second seal cross-section 84 may have a second groove edge 86b at least partially defined by the second groove face 76b, and a second sealing edge 88b at least partially defined by the second sealing face 78b. The second seal cross-section 84b also may have a third lateral edge 156 at least partially defined by the third lateral face 150 and facing toward the second lateral edge 94, and a fourth lateral edge 158 at least partially defined by the fourth lateral face 152.

In some embodiments, as shown in FIGS. 16A and 16B, the annular stiffener 198 may extend between the second lateral face 82 and the third lateral face 150. The first annular seal body 74a, the second annular seal body 74b, and/or the annular stiffener 198 may be positioned to cause the seal 14 to deform in the groove of the first component or the second component when the other of the first component or the second component presses against the first sealing face 78*a* and the second sealing face 78*b* in a direction toward the first groove face 76*a* and the second groove face 76*b*, thereby to expand the first annular seal body 74*a* laterally outward from the first lateral face 80 and the second annular seal body 74*b* outward from the fourth lateral face 152, thereby to enhance the fluid seal between the first component and the second component.

As shown in FIGS. 16A and 16B, the second lateral edge 94 may be at least partially concave and may form a second lateral edge recess 200, and/or the third lateral edge 156 may be at least partially concave and may form a third lateral edge recess 202. In some embodiments, the annular stiffener 198 may be at least partially received in the second lateral edge recess 200 and/or the third lateral edge recess 202, for example, as shown. As shown in FIGS. 16A and 16B, in some embodiments, the annular stiffener 198 may have a substantially oval-shaped cross-section.

In at least some embodiments consistent with FIGS. 16A and 16B, the first groove edge 86*a*, the first sealing edge 88*a*, the second groove edge 86*b*, and/or the second sealing edge 88*b* may extend obliquely with respect to the circumferential axis C of the seal 14. The first groove edge 86*a*, the first sealing edge 88*a*, the second groove edge 86*b*, and/or the second sealing edge 88*b* may extend in a direction forming an acute angle EA with respect to the circumferential axis C of the seal 14.

In some embodiments, the first groove edge 86*a* and the first sealing edge 88*a* may diverge from one another as the first groove edge 86*a* and the first sealing edge 88*a* extend from the first lateral edge 92 toward the second annular sealing body 74*b*, for example, as shown. In some embodiments, the second groove edge 86*b* and the second sealing edge 88*b* may diverge from one another as the second groove edge 86*b* and the second sealing edge 88*b* extend from the fourth lateral edge 158 toward the first annular sealing body 74*a*.

In at least some embodiments consistent with FIGS. 16A and 16B, as a component compresses and deforms the seal 14 into the annular groove, the annular stiffener 198 may act as a spacer substantially maintaining separation between the first annular seal body 74*a* and the second annular seal body 74*b*. This, in turn, may result in causing the first annular seal body 74*a* and the second annular seal body 74*b* to deform and expand laterally outward from the first lateral face 80 of the first annular seal body 74*a* and the fourth lateral face 152 of the second annular seal body 74*b* as the component compresses and deforms the first annular seal body 74*a* and the second annular seal body 74*b*. This deformation may result in causing that first annular seal body 74*a* and the second annular seal body 74*b* to substantially fill the annular groove where the first groove side wall 132 meets the groove bottom 130 and where the second groove side wall 134 meets the groove bottom 130 (see, e.g., the example annular groove 70 shown in FIGS. 6A-6C). In addition, as the component compresses and deforms the first annular seal body 74*a* and the second annular seal body 74*b*, the first annular seal body 74*a* and the second annular seal body 74*b* may deform and expand laterally outward from the first lateral face 80 of the first annular seal body 74*a* and the fourth lateral face 152 of the second annular seal body 74*b* adjacent the open portion 135 of the annular groove. These example activations may result in enhancing the fluid seal between the first component and the second component.

In some embodiments consistent with FIGS. 16A and 16B, the first annular seal body 74*a* and/or the second annular seal body 74*b* may include (or be formed from) a first material, and the annular stiffener 198 may include (or be formed from) a second material, with the first material being different than the second material. In some embodiments, the first material may have a different hardness than the hardness of the second material. For example, the hardness of the second material may be greater than the hardness of the first material. In some embodiments, the first material and the second material may be substantially the same material.

As shown in FIGS. 16A and 16B, the first lateral edge 92 and the fourth lateral edge 158 may be substantially parallel to one another. In some embodiments, the first lateral edge 92 and/or the fourth lateral edge 158 may be substantially parallel to the radial axis R of the seal 14. As shown in FIGS. 16A and 16B, the first seal cross-section 84*a*, the second seal cross-section 84*b*, and the stiffener cross-section 190 may have a combined seal cross-section having bilateral symmetry relative to the radial axis R of the seal 14 and/or the circumferential axis C of the seal 14.

Figure 17A:
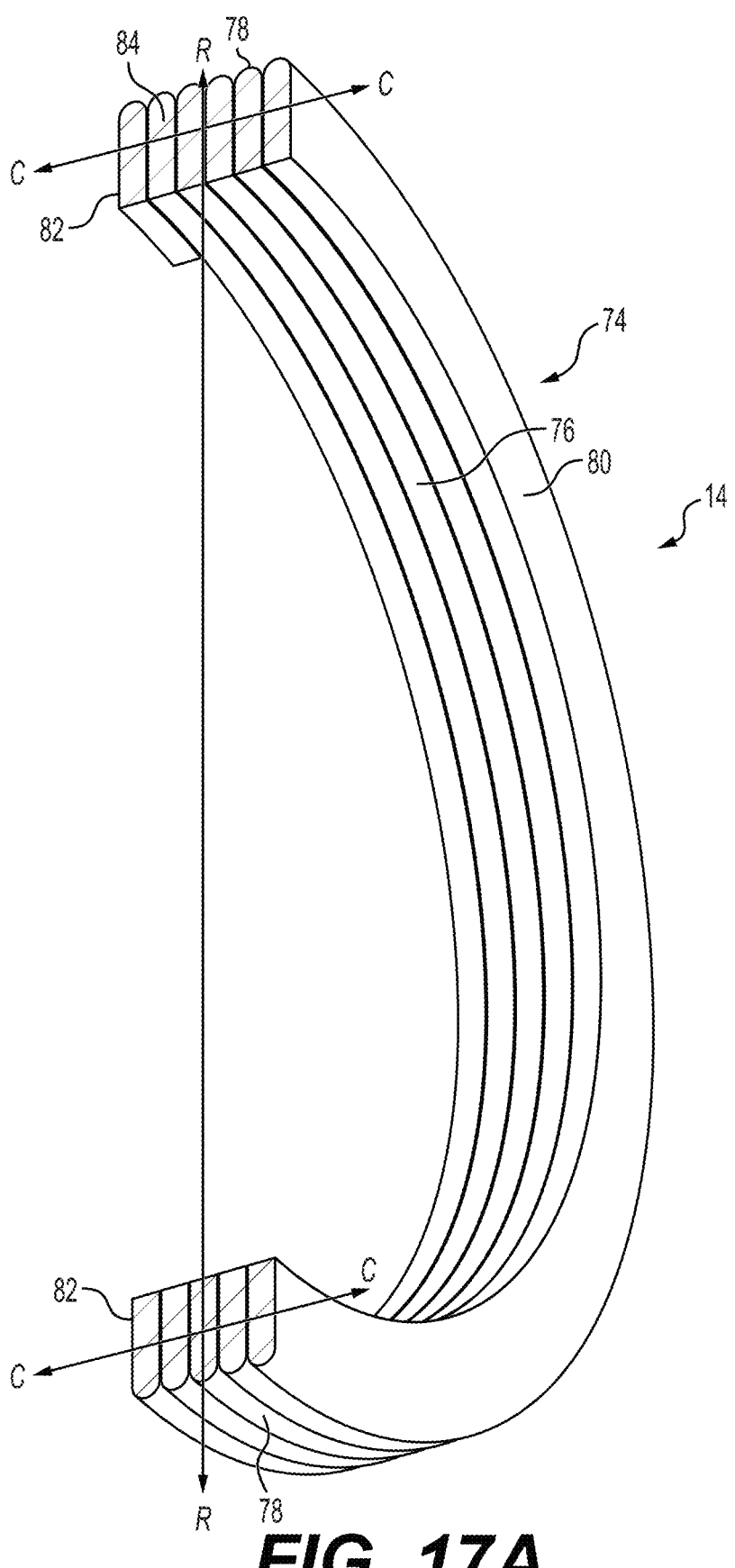
FIG. 17A is a schematic perspective section view of another example seal including an example helically-wound material coil, according to embodiments of the disclosure.
Figure 17B:
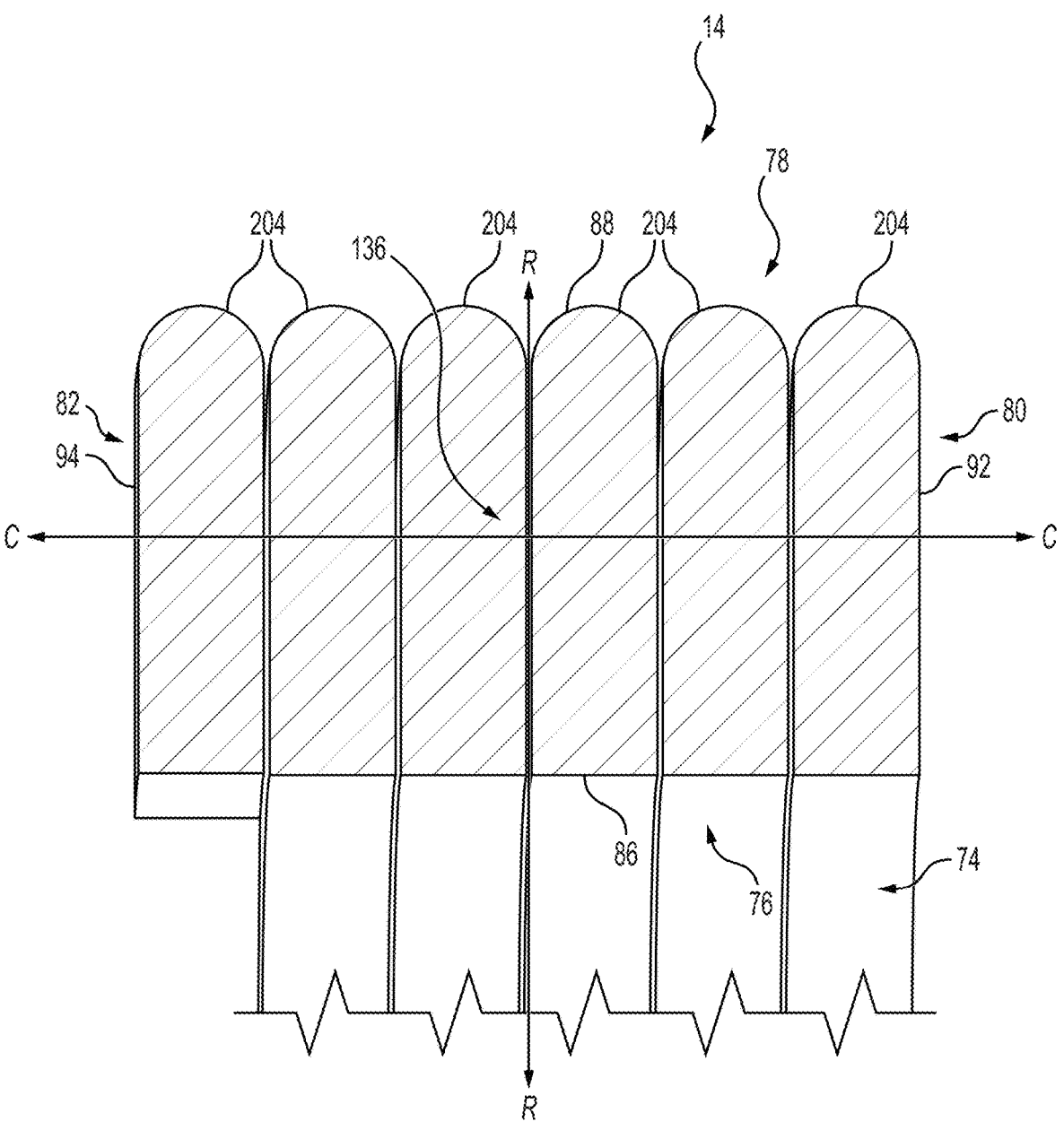
FIG. 17B is a schematic section view of the example seal shown in FIG. 17A in an uncompressed condition, according to embodiments of the disclosure.

FIG. 17A is a schematic perspective section view of another example seal 14 to enhance a fluid seal between an outer surface of a first component having a substantially circular cross-section and an inner surface of a second component, according to embodiments of the disclosure, and FIG. 17B is a schematic section view of the example seal 14 shown in FIG. 17A in an uncompressed condition. As shown in FIGS. 17A and 17B, in some embodiments, the seal 14 may include an annular seal body 74 including a helically-wound material coil. The annular seal body 74 may have a seal cross-section 84 at least partially defined by a groove face 76, a sealing face 78, a first lateral face 80, and a second lateral face 82. As shown, in some embodiments, the seal cross-section 84 may have a groove edge 86 at least partially defined by the groove face 76. The seal cross-section further may have a sealing edge 88 at least partially defined by the sealing face 78. The seal cross-section 84 also may have a first lateral edge 92 at least partially defined by the first lateral face 80, and a second lateral edge 94 at least partially defined by the second lateral face 82. In some embodiments, the groove face 76, sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to expand the annular seal body 74 laterally outward from the first lateral face 80 and the second lateral face 82 and press against walls of the groove, thereby to enhance the fluid seal between the first component and the second component.

As shown in FIGS. 17A and 17B, the groove edge 86 may at least partially define a substantially flat surface positioned to face the groove of the first component or the second component. As shown, the sealing edge 88 may include a plurality of adjacent convex edge segments 204. In some embodiments consistent with FIGS. 17A and 17B, the groove face 76, the sealing face 78, the first lateral face 80, and/or the second lateral face 82 may be positioned to cause the seal 14 to compress and deform in the groove of the first component or the second component when the other of the first component or the second component presses against the sealing face 78 in a direction toward the groove face 76, thereby to push an area of the seal between the first lateral edge 92 and the second lateral edge 94 against the other of the first component or the second component, thereby to enhance the fluid seal between the first component and the second component.

For example, in at least some embodiments consistent with FIGS. 17A and 17B, as a component compresses and deforms the seal 14 into the annular groove, multiple sealing points against the surface of the component may be provided by the one or more coils of the material coil. In some embodiments, the material coil may be formed from (or include) a material having a relatively higher stiffness as compared to other embodiments of the seal 14 described herein. This may result in the seal 14 having a more precise fit in the annular groove, for example, such that the seal 14 more completely fills the annular groove and/or resists deformation that might lead to relatively faster degradation of the seal 14 and a reduced service life. This may provide a combination of (a) a relatively enhanced fluid seal between the first component and the second component and (b) a relatively longer service life.

As shown in FIGS. 17A and 17B, the first lateral edge 92 and second lateral edge 94 may be substantially parallel to one another. In some embodiments, the first lateral edge 92 and/or the second lateral edge 94 may be substantially parallel to the radial axis R of the seal 14. In some embodiments, the seal cross-section may have bilateral symmetry relative to the radial axis R of the seal 14, for example, as shown.

Figure 18A:
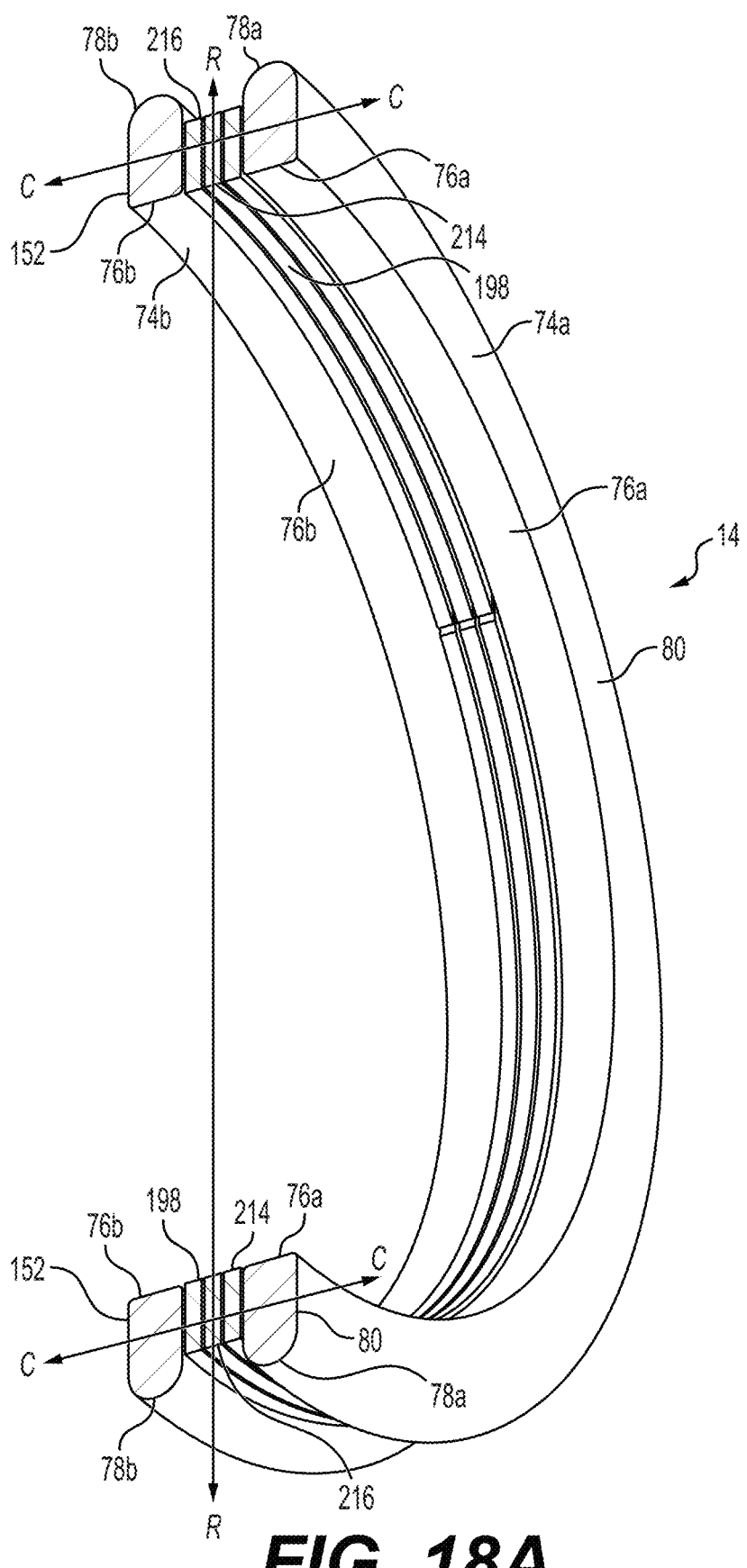
FIG. 18A is a schematic perspective section view of another example seal including an example helically-wound material coil, according to embodiments of the disclosure.
Figure 18B:
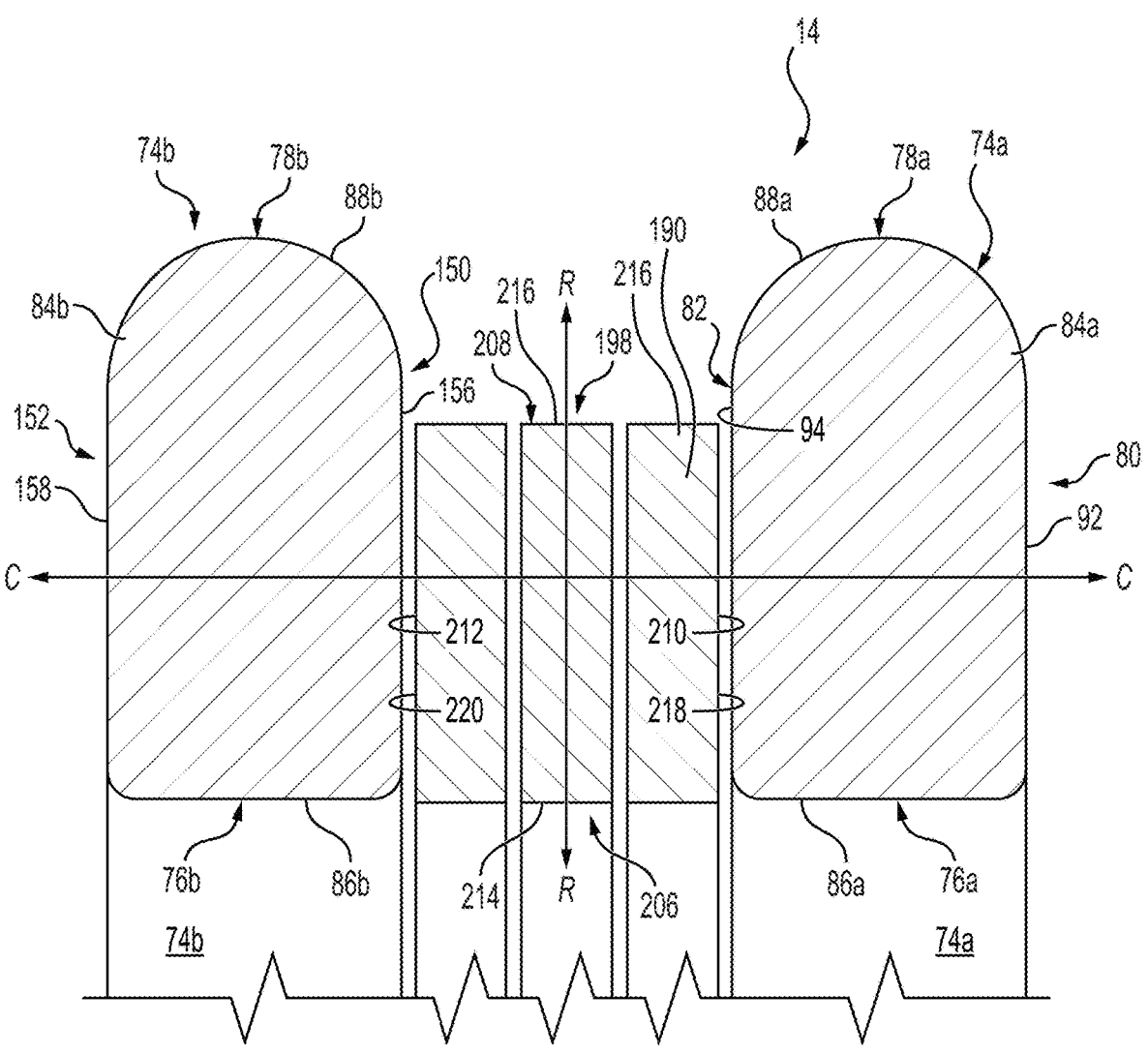
FIG. 18B is a schematic section view of the example seal shown in FIG. 18A in an uncompressed condition, according to embodiments of the disclosure.

FIG. 18A is a schematic perspective section view of another example seal 14 to enhance a fluid seal between an outer surface of a first component having a substantially circular cross-section and an inner surface of a second component, according to embodiments of the disclosure, and FIG. 18B is a schematic section view of the example seal 14 shown in FIG. 18A in an uncompressed condition. As shown in FIGS. 18A and 18B, the seal 14 may include a first annular seal body 74a, a second annular seal body 74b, and an annular stiffener 198 between the first annular seal body 74a and the second annular seal body 74b. The annular first seal body 74a may have a first seal cross-section 84a at least partially defined by a first groove face 76a, a first sealing face 78a, a first lateral face 80, and a second lateral face 82. The first seal cross-section 84a, in some embodiments, may have a first groove edge 86a at least partially defined by the first groove face 76a, and a first sealing edge 88a at least partially defined by the first sealing face 78a. The first seal cross-section 84a further may have a first lateral edge 92 at least partially defined by the first lateral face 80, and a second lateral edge 94 at least partially defined by the second lateral face 82.

As shown in FIGS. 18A and 18B, in some embodiments, the second annular seal body 74b may have a second groove face 76b positioned to face the groove of the first component or the second component, and a second sealing face 78b opposite the second groove face 76b and positioned to face away from the second groove face 76b. The second annular seal body 74b further may have a third lateral face 150 extending between the second groove face 76b and the second sealing face 78b, and a fourth lateral face 152 opposite the third lateral face 150 and extending between the second groove face 76b and the second sealing face 78b. The second annular seal body 74b may have a second seal cross-section 84b at least partially defined by the second groove face 76b, the second sealing face 78b, the third lateral face 150, and the fourth lateral face 152. The second seal cross-section 84b may have a second groove edge 86b at least partially defined by the second groove face 76b, and a second sealing edge 88b at least partially defined by the second sealing face 78b. The second seal cross-section 84b also may have a third lateral edge 156 at least partially defined by the third lateral face 150 and facing toward the second lateral edge 94, and a fourth lateral edge 158 at least partially defined by the fourth lateral face 152.

In some embodiments, as shown in FIGS. 18A and 18B, the annular stiffener 198 may extend between the second lateral face 82 and the third lateral face 150. In some embodiments, as shown, the annular stiffener 198 may include a helically-wound material coil. The annular stiffener 198 may at least partially define a stiffener groove face 206 positioned to face the groove of the first component or the second component, and a stiffener sealing face 208 opposite the stiffener groove face 206 and positioned to face away from the stiffener groove face 206. The annular stiffener 198 further may at least partially define a first lateral stiffener face 210 extending between the stiffener groove face 206 and the stiffener sealing face 208. The first lateral stiffener face 210 may be adjacent the second lateral face 82 of the first annular seal body 74a. The annular stiffener 198 also may at least partially define a second lateral stiffener face 212 opposite the first lateral stiffener face 210 and extending between the stiffener groove face 206 and the stiffener sealing face 208. The second lateral stiffener face 212 may be adjacent the third lateral face 150 of the second annular seal body 74b. The annular stiffener 198 may have a stiffener cross-section 190 at least partially defined by the stiffener groove face 206, the stiffener sealing face 208, the first lateral stiffener face 210, and the second lateral stiffener face 212. The stiffener cross-section 190 may have a stiffener groove edge 214 at least partially defined by the stiffener groove face 206, and a stiffener sealing edge 216 at least partially defined by the stiffener sealing face 208. The stiffener cross-section 190 further may have a first lateral stiffener edge 218 at least partially defined by the first lateral stiffener face 210, and a second lateral stiffener edge 220 at least partially defined by the second lateral stiffener face 212. In some embodiments, the first annular seal body 74a, the second annular seal body 74b, and/or the annular stiffener 198 may be positioned to cause the seal 14 to compress and deform in the groove of the first component or the second component when the other of the first component or the second component presses against the first sealing face 78a and the second sealing face 78b in a direction toward the first groove face 76a and the second groove face 76b, thereby to expand the first annular seal body 74a laterally outward from the first lateral face 92 and the second annular seal body 74b outward from the fourth lateral face 152, thereby to enhance the fluid seal between the first component and the second component.

For example, in at least some embodiments consistent with FIGS. 18A and 18B, as a component compresses the seal 14 into the annular groove, the annular stiffener 198 may act as a spacer substantially maintaining separation between the first annular seal body 74a and the second annular seal body 74b. This, in turn, may result in causing the first annular seal body 74a and the second annular seal body 74b deform and expand laterally outward from the first lateral face 80 of the first annular seal body 74a and the fourth lateral face 152 of the second annular seal body 74b as the component compresses and deforms the first annular seal body 74a and the second annular seal body 74b. This deformation may result in causing that first annular seal body 74a and the second annular seal body 74b to substantially fill the annular groove where the first groove side wall 132 meets the groove bottom 130 and where the second groove side wall 134 meets the groove bottom 130 (see, e.g., the example annular groove 70 shown in FIGS. 6A-6C). In addition, as the component compresses and deforms the first annular seal body 74a and the second annular seal body 74b, the first annular seal body 74*a* and the second annular seal body 74*b* may deform and expand laterally outward from the first lateral face 80 of the first annular seal body 74*a* and from the fourth lateral face 152 of the second annular seal body 74*b* adjacent the open portion 135 of the annular groove. These example activations may result in enhancing the fluid seal between the first component and the second component.

As shown in FIGS. 18A and 18B, the first sealing edge 88*a* and/or the second sealing edge 88*b* may be at least partially convex. In some embodiments, the stiffener groove edge 214 may at least partially define a substantially flat surface positioned to face the groove of the first component or the second component. In some embodiments, the first sealing face 78*a* and/or the second sealing face 78*b* may have a respective radius larger than a radius of the stiffener sealing face 208 of the annular stiffener 198. In some such embodiments, the first sealing face 78*a* and/or the second sealing face 78*b* may contact the other of the first component or the second component before the stiffener sealing face 208 of the annular stiffener 198, for example, when the groove is in an outer diameter of a component having a substantially cylindrical outer surface. In some embodiments, the first sealing face 78*a* and/or the second sealing face 78*b* may have a respective radius smaller than the radius of the stiffener sealing face 208 of the annular stiffener 198. In some such embodiments, the first sealing face 78*a* and/or the second sealing face 78*b* may contact the other of the first component or the second component before the stiffener sealing face 208 of the annular stiffener 198, for example, when the groove is in an inner diameter of a component having a substantially cylindrical inner surface.

As shown in FIGS. 18A and 18B, in some embodiments, the first groove face 76*a*, the second groove face 76*b*, and/or the stiffener groove face 206 may have substantially equal radii. In some embodiments, the first annular seal body 74*a* and the second annular seal body 74*b* may include (or be formed from) a first material, and the annular stiffener 198 may include (or be formed from) a second material, with the first material being different than the second material. The first material may have a different hardness than the hardness of the second material. For example, the hardness of the second material may be greater than the hardness of the first material. In some embodiments, the first material and the second material may be substantially the same material.

As shown in FIGS. 18A and 18B, the first lateral edge 92 and fourth lateral edge 158 may be substantially parallel to one another. In some embodiments, the second lateral edge 92 and third lateral edge 156 may be substantially parallel to one another. The first lateral edge 92 and/or the fourth lateral edge 158 may be substantially parallel to the radial axis R of the seal 14. In some embodiments, the second lateral edge 92 and/or the third lateral edge 156 may be substantially parallel to the radial axis R of the seal 14. In some embodiments, for example, as shown in FIGS. 18A and 18B, the first seal cross section 84*a*, the second seal cross-section 84*b*, and the stiffener cross-section 190 may have a combined seal cross-section, and the combined seal cross-section may have bilateral symmetry relative to the radial axis R of the seal 14.

Having now described some illustrative embodiments of the disclosure, it should be apparent to those skilled in the art that the foregoing is merely illustrative and not limiting, having been presented by way of example only. Numerous modifications and other embodiments are within the scope of one of ordinary skill in the art and are contemplated as falling within the scope of the disclosure. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems, methods, and/or aspects or techniques of the disclosure are used. Those skilled in the art should also recognize or be able to ascertain, using no more than routine experimentation, equivalents to the specific embodiments of the disclosure. It is, therefore, to be understood that the embodiments described herein are presented by way of example only and that, within the scope of any appended claims and equivalents thereto, the disclosure may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further may be made thereto without departing from the spirit and scope of the present disclosure as set forth in the appended claims.

What is claimed is:

1. A seal to enhance a fluid seal between an outer surface of a first component having a substantially circular cross-section and an inner surface of a second component, the seal comprising:

an annular seal body having:

(a) a groove face positioned to face a groove of one of the first component or the second component;

(b) a sealing face opposite the groove face and positioned to face away from the groove face;

(c) a first lateral face extending between the groove face and the sealing face; and (d) a second lateral face opposite the first lateral face and extending between the groove face and the sealing face;

the annular seal body also having a seal cross-section at least partially defined by the groove face, the sealing face, the first lateral face, and the second lateral face, the seal cross-section having:

(i) a groove edge at least partially defined by the groove face, the groove edge being at least partially convex and at least partially defining a groove edge radius;

(ii) a sealing edge at least partially defined by the sealing face, the sealing edge being at least partially concave and having a protrusion between the first lateral face and the second lateral face;

(iii) a first lateral edge at least partially defined by the first lateral face; and (iv) a second lateral edge at least partially defined by the second lateral face, the first lateral edge and second lateral edge being oblique with respect to one another, the first lateral edge and the sealing edge defining a sealing edge intersection, the groove edge defining a groove edge apex, the protrusion defining a protrusion apex, the sealing edge intersection and a groove edge apex defining a first radial dimension less than the groove edge radius, and the groove edge apex and a protrusion apex defining a second radial dimension less than the first radial dimension, and one or more of the groove face, the sealing face, the first lateral face, or the second lateral face being positioned to cause the seal to deform in the groove of the one of the first component or the second component when the other of the first component or the second component presses against the protrusion in a direction toward the groove face, thereby to expand the annular seal body laterally outward from the first lateral face and the second lateral face, thereby to enhance the fluid seal between the first component and the second component when positioned in an annular groove of a high-power pump.

2. The seal of claim 1, wherein:

the seal cross-section at least partially defines a radial axis extending between the groove edge and the sealing edge and a circumferential axis extending between the first lateral edge and the second lateral edge, the radial axis and the circumferential axis being substantially perpendicular relative to one another, and one or more of the first lateral edge or the second lateral edge extends obliquely with respect to the radial axis, such that the first lateral edge and the second lateral edge are closer to one another at the groove edge.

3. The seal of claim 2, wherein the seal cross-section has bilateral symmetry with respect to the radial axis.

4. The seal of claim 1, wherein the groove edge radius at least partially extends between the first lateral edge and the second lateral edge.

5. The seal of claim 1, wherein a ratio of the groove edge radius to the first radial dimension ranges from about 3:1 to about 1.1:1.

6. The seal of claim 1, wherein the seal cross-section defines one or more of (a) a first rounded transition between the groove edge and the first lateral edge or (b) and a second rounded transition between the groove edge and the second lateral edge.

7. The seal of claim 1, wherein the first lateral edge at least partially defines:

a groove end portion adjacent the groove edge, and a sealing end portion adjacent the sealing edge, the groove end portion and the sealing end portion being non-colinear.

8. The seal of claim 7, wherein the seal cross-section at least partially defines a radial axis extending between the groove edge and the sealing edge and a circumferential axis extending between the first lateral edge and the second lateral edge, wherein the radial axis and the circumferential axis being substantially perpendicular relative to one another, and wherein the groove end portion and the sealing end portion extend obliquely with respect to the radial axis.

9. The seal of claim 7, wherein:

the seal cross-section at least partially defines a radial axis extending between the groove edge and the sealing edge and a circumferential axis extending between the first lateral edge and the second lateral edge, the radial axis and the circumferential axis being substantially perpendicular relative to one another;

the groove end portion extends in a first direction defining a first angle with the radial axis; and the sealing end portion extends in a second direction defining a second angle with the radial axis, the second angle being different than the first angle.

10. The seal of claim 9, wherein the first angle is less than the second angle.

11. The seal of claim 10, wherein the first angle ranges from about 1 degree to about 10 degrees, and the second angle ranges from about 5 degrees to about 25 degrees.

12. The seal of claim 1, wherein the second lateral edge at least partially defines:

a groove end portion adjacent the groove edge, and a sealing end portion adjacent the sealing edge, and wherein the groove end portion and the sealing end portion being non-colinear.

13. The seal of claim 12, wherein the seal cross-section at least partially defines a radial axis extending between the groove edge and the sealing edge and a circumferential axis extending between the first lateral edge and the second lateral edge, the radial axis and the circumferential axis are substantially perpendicular relative to one another, and wherein the groove end portion and the sealing end portion extend obliquely with respect to the radial axis.

14. The seal of claim 12, wherein:

the seal cross-section at least partially defines a radial axis extending between the groove edge and the sealing edge and a circumferential axis extending between the first lateral edge and the second lateral edge, the radial axis and the circumferential axis being substantially perpendicular relative to one another, the groove end portion extends in a first direction defining a first angle with the radial axis; and the sealing end portion extends in a second direction defining a second angle with the radial axis, the second angle being different than the first angle.

15. The seal of claim 14, wherein the first angle is less than the second angle.

16. The seal of claim 15, wherein the first angle ranges from about 1 degree to about 10 degrees, and the second angle ranges from about 5 degrees to about 25 degrees.

17. The seal of claim 1, wherein:

the first lateral edge at least partially defines:

a first groove end portion adjacent the groove edge, and a first sealing end portion adjacent the sealing edge, and wherein the second lateral edge at least partially defines:

a second groove end portion adjacent the groove edge; and a second sealing end portion adjacent the sealing edge; wherein the first groove end portion and the first sealing end portion are non-colinear; and the second groove end portion and the second sealing end portion are non-colinear.

18. The seal of claim 1, wherein the sealing edge at least partially defines:

a first lateral sealing edge portion adjacent the first lateral edge, and a first intermediate sealing edge portion adjacent the protrusion, and wherein the first lateral sealing edge portion and the first intermediate sealing edge portion being non-colinear.

19. The seal of claim 18, wherein:

the seal cross-section at least partially defines a radial axis extending between the groove edge and the sealing edge and a circumferential axis extending between the first lateral edge and the second lateral edge, the radial axis and the circumferential axis being perpendicular relative to one another, and wherein the first lateral sealing edge portion is substantially parallel to the circumferential axis.

20. The seal of claim 19, wherein the first intermediate sealing edge portion defines an angle ranging from about 1 degree to about 20 degrees with respect to the circumferential axis.

21. The seal of claim 1, wherein the sealing edge and the protrusion face radially outward, and wherein the groove edge faces radially inward.

22. The seal of claim 1, wherein the sealing edge and the protrusion face radially inward, and the groove edge faces radially outward.

23. A high-power pump comprising:

(a) a power end;

(b) a fluid end connected to the power end, the fluid end including a fluid end housing at least partially defining an access port;

(c) a cover received in the access port; and (d) a seal positioned between the cover and the access port to provide a fluid seal between the cover and the fluid end housing, the seal comprising:

an annular seal body having:

(1) a groove face positioned to face an annular groove of one of the cover or the fluid end housing, (2) a sealing face opposite the groove face, (3) a first lateral face extending between the groove face and the sealing face, and (4) a second lateral face opposite the first lateral face and extending between the groove face and the sealing face;

the annular seal body also having a seal cross-section at least partially defined by the groove face, the sealing face, the first lateral face, and the second lateral face, the seal cross-section having:

(i) a groove edge at least partially defined by the groove face, the groove edge being at least partially convex, (ii) a sealing edge at least partially defined by the sealing face, the sealing edge being at least partially concave and having a protrusion between the first lateral face and the second lateral face, (iii) a first lateral edge at least partially defined by the first lateral face; and (iv) a second lateral edge at least partially defined by the second lateral face, the first lateral edge and the second lateral edge being oblique with respect to one another, the first lateral edge and the sealing edge defining a sealing edge intersection, the groove edge defining a groove edge apex, the protrusion defining a protrusion apex, the sealing edge intersection and a groove edge apex defining a first radial dimension, and the groove edge apex and a protrusion apex defining a second radial dimension less than the first radial dimension, and one or more of the groove face, the sealing face, the first lateral face, or the second lateral face being positioned to cause the seal to deform in the groove of the one of the fluid end housing or the cover as the fluid end presses against the protrusion in a direction toward the groove face, thereby to expand the annular seal body laterally outward from the first lateral face and the second lateral face, thereby to enhance the fluid seal between the cover and the fluid end housing.

24. The high-power pump of claim 23, wherein the cover defines the annular groove, and the seal is positioned in the annular groove with the groove face of the seal facing the annular groove.

25. The high-power pump of claim 23, wherein the fluid end housing defines the annular groove, and the seal is positioned in the annular groove with the groove face of the seal facing the annular groove.

26. A seal to enhance a fluid seal between an outer surface of a first component having a substantially circular cross-section and an inner surface of a second component, the seal comprising:

an annular seal body having:

(a) a groove face positioned to face a groove of one of the first component or the second component;

(b) a sealing face opposite the groove face and positioned to face away from the groove face;

(c) a first lateral face extending between the groove face and the sealing face; and (d) a second lateral face opposite the first lateral face and extending between the groove face and the sealing face;

the annular seal body also having a seal cross-section at least partially defined by the groove face, the sealing face, the first lateral face, and the second lateral face, the seal cross-section having:

(i) a groove edge at least partially defined by the groove face, the groove edge being at least partially convex and at least partially defining a groove edge radius;

(ii) a sealing edge at least partially defined by the sealing face, the sealing edge being at least partially concave and having a protrusion between the first lateral face and the second lateral face, (iii) a first lateral edge at least partially defined by the first lateral face;

(iv) a second lateral edge at least partially defined by the second lateral face, the first lateral edge and the second lateral edge being oblique with respect to one another, and (v) one of more of (1) a first rounded transition between the groove edge and the first lateral edge or (2) and a second rounded transition between the groove edge and the second lateral edge, the first lateral edge and the sealing edge defining a sealing edge intersection, the groove edge defining a groove edge apex, the protrusion defining a protrusion apex, the sealing edge intersection and a groove edge apex defining a first radial dimension less than the groove edge radius, and the groove edge apex and a protrusion apex defining a second radial dimension less than the first radial dimension, and one or more of the groove face, the sealing face, the first lateral face, or the second lateral face being positioned to cause the seal to deform in the groove of the one of the first component or the second component when the other of the first component or the second component presses against the protrusion in a direction toward the groove face, thereby to expand the annular seal body laterally outward from the first lateral face and the second lateral face, thereby to enhance the fluid seal between the first component and the second component when positioned in an annular groove of a high-power pump.

27. The seal of claim 26, wherein the seal cross-section at least partially defines a radial axis extending between the groove edge and the sealing edge, and the seal cross-section has bilateral symmetry with respect to the radial axis.

28. The seal of claim 26, wherein the groove edge radius at least partially extends between the first lateral edge and the second lateral edge.

29. The seal of claim 26, wherein a ratio of the groove edge radius to the first radial dimension ranges from about 3:1 to about 1.1:1.

30. The seal of claim 26, wherein one or more of (a) the first lateral edge is substantially straight between the first rounded transition and the sealing edge or (b) the second lateral edge is substantially straight between the second rounded transition and the sealing edge.

\* \* \* \* \*